(12) United States Patent
Yeo et al.

(10) Patent No.: US 11,902,076 B2
(45) Date of Patent: Feb. 13, 2024

(54) METHOD AND APPARATUS FOR CELL INITIAL ACCESS AND PAGING IN WIRELESS CELLULAR COMMUNICATION SYSTEM

(71) Applicant: Samsung Electronics Co., Ltd., Suwon-si (KR)

(72) Inventors: Jeongho Yeo, Hwaseong-si (KR); Youngbum Kim, Seoul (KR); Donghan Kim, Osan-si (KR); Yongjun Kwak, Yongin-si (KR); Taehyoung Kim, Seoul (KR); Juho Lee, Suwon-si (KR); Younsun Kim, Seongnam-si (KR); Seunghoon Choi, Seongnam-si (KR); Sungjin Park, Incheon (KR); Jinyoung Oh, Seoul (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 17/409,546

(22) Filed: Aug. 23, 2021

(65) Prior Publication Data

US 2021/0392028 A1 Dec. 16, 2021

Related U.S. Application Data

(63) Continuation of application No. 16/684,563, filed on Nov. 14, 2019, now Pat. No. 11,102,047, which is a (Continued)

(30) Foreign Application Priority Data

Aug. 22, 2016 (KR) .................. 10-2016-0106427
Sep. 29, 2016 (KR) .................. 10-2016-0125809

(51) Int. Cl.
*H04L 27/26* (2006.01)
*H04L 1/00* (2006.01)
(Continued)

(52) U.S. Cl.
CPC .......... *H04L 27/2666* (2013.01); *H04L 1/004* (2013.01); *H04L 1/0009* (2013.01);
(Continued)

(58) Field of Classification Search
CPC ... H04L 27/2666; H04L 1/0009; H04L 1/004; H04L 1/0041; H04L 1/0061;
(Continued)

(56) References Cited

U.S. PATENT DOCUMENTS 9,131,404 B2 * 9/2015 Siomina ................. H04B 7/024
10,491,447 B2 11/2019 Yeo et al.
(Continued)

FOREIGN PATENT DOCUMENTS

CN 102273272 A 12/2011
CN 103384978 A 11/2013
(Continued)

OTHER PUBLICATIONS

International Search Report dated Nov. 22, 2017 in connection with International Patent Application No. PCT/KR2017/009170, 3 pages.
(Continued)

*Primary Examiner* — Yu-Wen Chang

(57) ABSTRACT

The present disclosure relates to a communication technique of fusing a 5G communication system for supporting higher data transmission rate beyond a 4G system with an IoT technology and a system thereof. The system may be used for an intelligent service (for example, smart home, smart building, smart city, smart car or connected car, health care, digital education, retail business, security and safety related service, or the like) based on the 5G communication tech-
(Continued)

nology and the IoT related technology. The present disclosure discloses a method and apparatus for inserting an index into a code block as a unit in which a channel code is executed and transmitting the same.

20 Claims, 52 Drawing Sheets

Related U.S. Application Data continuation of application No. 15/683,687, filed on Aug. 22, 2017, now Pat. No. 10,491,447.

(51) Int. Cl.

| | | |
|---|---|---|
| *H04W 72/044* | (2023.01) | |
| *H04L 5/02* | (2006.01) | |
| *H04L 5/00* | (2006.01) | |
| *H04W 74/00* | (2009.01) | |
| *H04W 72/23* | (2023.01) | |
| *H04W 72/54* | (2023.01) | |
| *H04W 76/15* | (2018.01) | |
| *H04W 68/02* | (2009.01) | |
| *H04W 74/08* | (2009.01) | |
| *H04W 84/18* | (2009.01) | |
| *H04W 84/10* | (2009.01) | |
| *H04L 1/1867* | (2023.01) | |
| *H04L 1/20* | (2006.01) | |
| *H04W 4/70* | (2018.01) | |

(52) U.S. Cl.
CPC .......... *H04L 1/0041* (2013.01); *H04L 1/0061* (2013.01); *H04L 1/0078* (2013.01); *H04L 5/0035* (2013.01); *H04L 5/0042* (2013.01); *H04L 5/0044* (2013.01); *H04L 5/0057* (2013.01); *H04L 5/0092* (2013.01); *H04L 5/0094* (2013.01); *H04L 5/026* (2013.01); *H04L 27/2656* (2013.01); *H04L 27/2657* (2013.01); *H04L 27/2662* (2013.01); *H04W 68/02* (2013.01); *H04W 72/0466* (2013.01); *H04W 72/23* (2023.01); *H04W 72/54* (2023.01); *H04W 74/006* (2013.01); *H04W 74/008* (2013.01); *H04W 74/0833* (2013.01); *H04W 76/15* (2018.02); *H04L 1/0026* (2013.01); *H04L 1/1887* (2013.01); *H04L 1/20* (2013.01); *H04L 5/0053* (2013.01); *H04W 4/70* (2018.02); *H04W 84/10* (2013.01); *H04W 84/18* (2013.01)

(58) Field of Classification Search
CPC ... H04L 1/0078; H04L 5/0035; H04L 5/0042; H04L 5/0044; H04L 5/0057; H04L 5/0092; H04L 5/0094; H04L 5/026; H04L 27/2656; H04L 27/2657; H04L 27/2662; H04L 1/0026; H04L 1/1887; H04L 1/20; H04L 5/0053; H04W 68/02; H04W 72/0466; H04W 72/23; H04W 72/54; H04W 74/006; H04W 74/008; H04W 74/0833; H04W 76/15; H04W 4/70; H04W 84/10; H04W 84/18

See application file for complete search history.

(56) References Cited

U.S. PATENT DOCUMENTS

| | | | |
|---|---|---|---|
| 10,499,369 B2 | 12/2019 | Ryu et al. | |
| 10,499,371 B2 | 12/2019 | Xue et al. | |
| 2008/0205351 A1 | 8/2008 | Lindoff et al. | |
| 2010/0113041 A1 | 5/2010 | Bienas et al. | |
| 2011/0243090 A1 | 10/2011 | Grovlen et al. | |
| 2011/0250892 A1 | 10/2011 | Gupta et al. | |
| 2012/0202478 A1 | 8/2012 | Van Lieshout et al. | |
| 2012/0327800 A1* | 12/2012 | Kim ...................... H04J 11/005 370/252 |
| 2012/0327895 A1 | 12/2012 | Wallen et al. | |
| 2013/0083749 A1 | 4/2013 | Xu et al. | |
| 2013/0083753 A1 | 4/2013 | Lee et al. | |
| 2013/0242730 A1 | 9/2013 | Pelletier et al. | |
| 2013/0267246 A1* | 10/2013 | Wang ................... H04W 24/00 455/456.1 |
| 2014/0010183 A1 | 1/2014 | McNamara et al. | |
| 2014/0010189 A1* | 1/2014 | Tian ...................... H04W 24/10 370/329 |
| 2014/0185495 A1 | 7/2014 | Kuchibhotla et al. | |
| 2014/0185530 A1 | 7/2014 | Kuchibhotla et al. | |
| 2014/0302865 A1* | 10/2014 | Bai ....................... H04W 24/10 455/452.1 |
| 2014/0341192 A1* | 11/2014 | Venkob ............. H04W 52/0216 370/336 |
| 2015/0085795 A1 | 3/2015 | Papasakellariou et al. | |
| 2015/0289267 A1* | 10/2015 | Axmon ............. H04W 72/1268 370/329 |
| 2015/0341814 A1* | 11/2015 | Yu ........................ H04J 11/0023 370/252 |
| 2015/0341908 A1 | 11/2015 | Wang et al. | |
| 2016/0218786 A1 | 7/2016 | Mizusawa | |
| 2016/0227425 A1* | 8/2016 | Kim ...................... H04L 5/0073 |
| 2017/0311326 A1 | 10/2017 | Wong et al. | |
| 2018/0020462 A1 | 1/2018 | Xiong et al. | |
| 2018/0035421 A1 | 2/2018 | Lin et al. | |
| 2018/0035469 A1 | 2/2018 | Chen et al. | |
| 2018/0049047 A1 | 2/2018 | Lin et al. | |
| 2018/0049169 A1 | 2/2018 | Lin et al. | |
| 2018/0054292 A1 | 2/2018 | Yang et al. | |
| 2018/0184390 A1 | 6/2018 | Wu et al. | |
| 2018/0376439 A1 | 12/2018 | Urabayashi | |
| 2019/0037606 A1 | 1/2019 | Takeda et al. | |
| 2019/0044639 A1 | 2/2019 | Ouchi et al. | |
| 2019/0044782 A1 | 2/2019 | Zeng et al. | |
| 2019/0059075 A1 | 2/2019 | Hayashi et al. | |
| 2019/0081842 A1 | 3/2019 | Kim et al. | |
| 2019/0116007 A1 | 4/2019 | Yi et al. | |
| 2019/0149384 A1 | 5/2019 | Kim et al. | |
| 2019/0174437 A1 | 6/2019 | Lyu et al. | |
| 2019/0174462 A1 | 6/2019 | Harada et al. | |
| 2020/0084081 A1 | 3/2020 | Yeo et al. | |
| 2020/0099499 A1 | 3/2020 | Yeo et al. | |
| 2020/0100217 A1 | 3/2020 | Ryu et al. | |
| 2020/0314908 A1 | 10/2020 | Hwang et al. | |

FOREIGN PATENT DOCUMENTS

| | | | |
|---|---|---|---|
| CN | 103517211 A | 1/2014 | |
| CN | 103621147 A | 3/2014 | |
| CN | 103906139 A | 7/2014 | |
| CN | 105557049 A | 5/2016 | |
| CN | 105580306 A | 5/2016 | |
| KR | 10-2014-0071480 A | 6/2014 | |
| WO | 2016/006984 A1 | 1/2016 | |
| WO | WO-2016015249 A1 * | 2/2016 | ............ H04W 24/00 |
| WO | 2016/040290 A1 | 3/2016 | |
| WO | 2016-130175 A1 | 8/2016 | |

OTHER PUBLICATIONS

MediaTek Inc., "Discussion on initial access for NR", 3GPP TSG RAN WG1 Meeting #86, Aug. 22-26, 2016, 3 pages, R1-167542.
ASUSTeK, "Impact of multiplexing multiple numerologies on initial access", 3GPP TSG RAN WG1 Meeting #86, 3 pages, R1-167673.
Huawei, HiSilicon, "Discussion on UE behavior on mixed numerology carrier", 3GPP TSG RAN WG1 Meeting #86bis, 4 pages, R1-1609425.

(56) References Cited

OTHER PUBLICATIONS

Supplementary European Search Report dated Jul. 4, 2019 in connection with European Patent Application No. 17 84 3934, 5 pages.
Non-final Office Action dated Oct. 5, 2020 in connection with U.S. Appl. No. 16/694,932, 12 pages.
Giordani et al., "Comparative Analysis of Initial Access Techniques in 5G mmWave Cellular Networks", Apr. 30, 2016, 6 pages.
Chen et al., "5G Confronted and C-RAN Macro Micro Collaboration Based Minimalist Data Carrier Design, Macro-Assisted Ultra-Lean Data Carrier and Architectural Design", ZTE Technology Journal, vol. 20, No. 2, Apr. 30, 2014, 5 pages.
Ericsson, "NB-IoT—System level evaluation and comparison—inband", 3GPP TSG-RAN WG1 #83, Nov. 15-22, 2015, R1-157596, 7 pages.
Office Action dated Apr. 6, 2021 in connection with Chinese Patent Application No. 201780051662.3, 15 pages.
Office Action dated Feb. 18, 2020 in connection with U.S. Appl. No. 16/694,932, 26 pages.
Office Action dated Jun. 9, 2020 in connection with United States U.S. Appl. No. 16/694,932, 24 pages.
Notice of Allowance dated Feb. 24, 2021 in connection with U.S. Appl. No. 16/694,932, 43 pages.
Examination report dated Dec. 5, 2022, in connection with Indian Application No. 202148055182, 6 pages.
Decision of Patent dated Feb. 13, 2023, in connection with Korean Application No. 10-2016-0125809, 9 pages.
Huawei, et al., "A common synchronization signal for a NR carrier supporting different numerologies," R1-167217, 3GPP TSG RAN WG1 Meeting #86, Gothenburg, Sweden, Aug. 22-26, 2016, 7 pages.
Panasonic, "Use of multiple numerologies in NR," R1-167439, 3GPP TSG RAN WG1 Meeting #86, Gothenburg, Sweden, Aug. 22-26, 2016, 9 pages.
Decision of Patent dated Jul. 6, 2023, in connection with Korean Patent Application No. 10-2016-0125809, 10 pages.
The First Office Action dated Aug. 11, 2023, in connection with Chinese Patent Application No. 202110980170.0, 12 pages.
The First Office Action dated Aug. 25, 2023, in connection with Chinese Patent Application No. 202110980184.2, 14 pages.
Hearing Notice dated Nov. 6, 2023, in connection with Indian Patent Application No. 201947006659, 2 pages.

\* cited by examiner

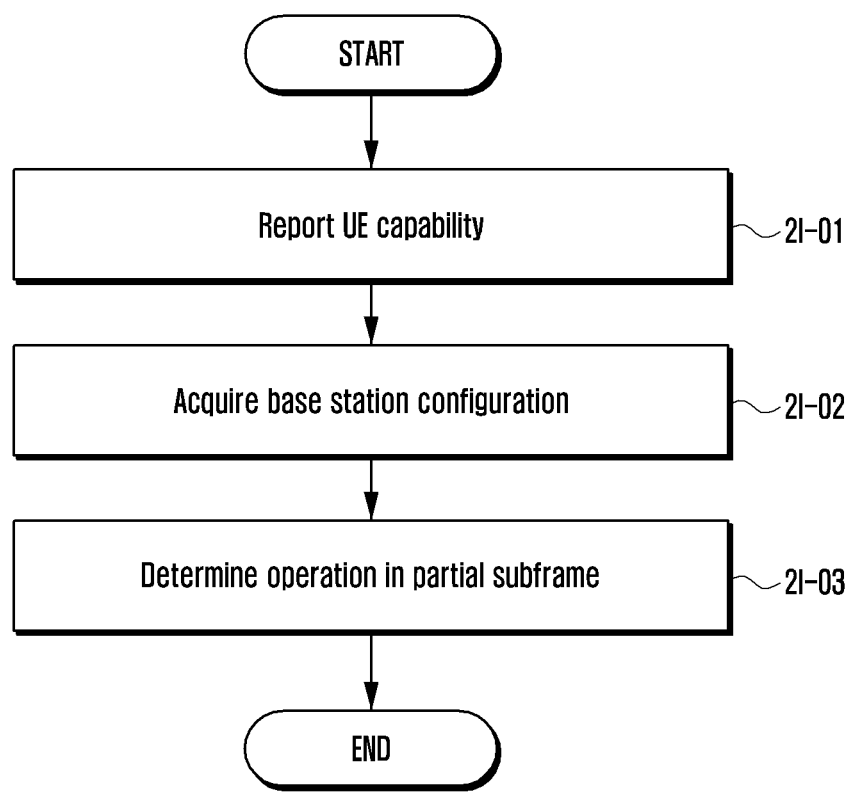

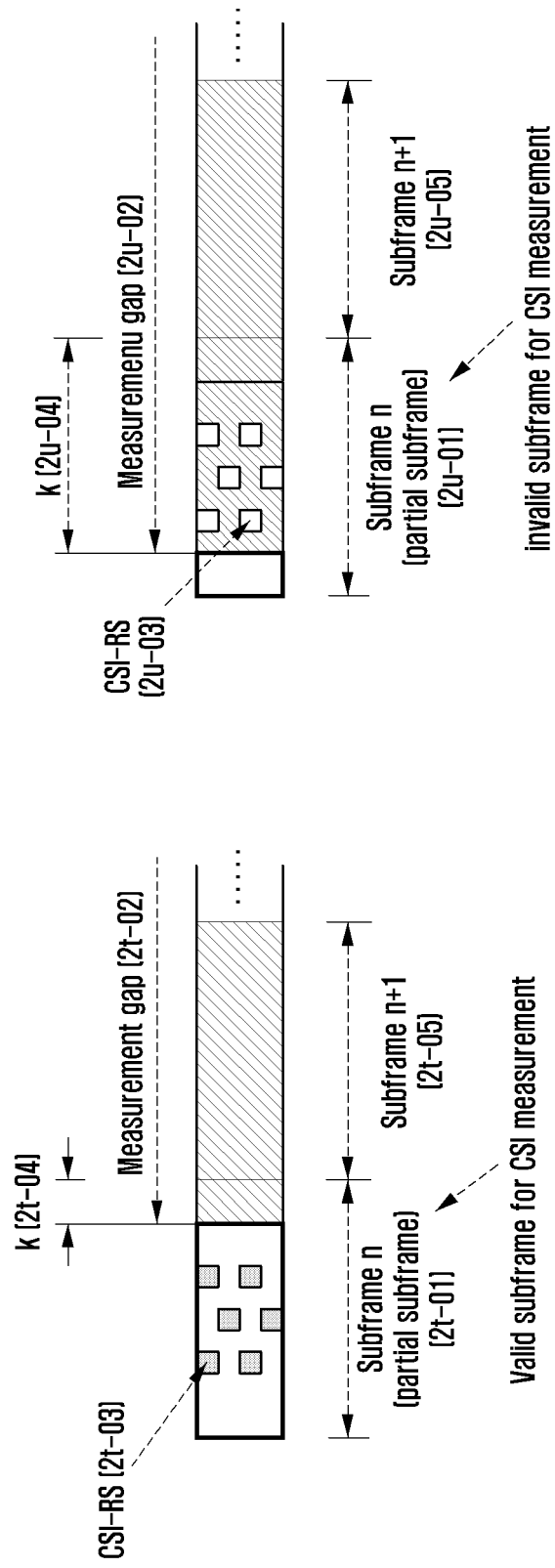

(a)

(b)

METHOD AND APPARATUS FOR CELL INITIAL ACCESS AND PAGING IN WIRELESS CELLULAR COMMUNICATION SYSTEM

CROSS-REFERENCE TO RELATED APPLICATIONS

The present application is a continuation of U.S. patent application Ser. No. 16/684,563 filed on Nov. 14, 2019, which is a continuation of U.S. patent application Ser. No. 15/683,687 filed on Aug. 22, 2017, now U.S. Pat. No. 10,491,447 issued on Nov. 26, 2019, which is based on and claims priority under 35 U.S.C. § 119 to Korean Patent Application No. 10-2016-0106427 filed on Aug. 22, 2016 and Korean Patent Application No. 10-2016-0125809 filed on Sep. 29, 2016, the disclosures of which are herein incorporated by reference in their entirety.

BACKGROUND

1. Field

Various embodiments of the present disclosure relate to a wireless communication system, and more particularly, to a method and apparatus for inserting an index into a code block as a unit in which a channel code is performed and transmitting the same.

2. Description of Related Art

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been used. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as beamforming, MIMO, and the array antenna. The application of the cloud radio access network (cloud RAN) as the big data processing technology described above may also be considered as an example of the fusing of the 5G communication technology with the IoT technology.

Meanwhile, recently, there is a need for a method and apparatus for inserting an index into a code block as a unit in which a channel code is executed and transmitting the same, in accordance with the development of a next generation mobile communication system.

SUMMARY

To address the above-discussed deficiencies, a primary object of the present is directed to a method of inserting a code block (CB) index, a method of operating a system by applying a CB index to retransmission, and the like. In a wireless communication system, in particular, the existing LTE system, a data transmission is performed in a transport block (TB) unit. The TB is divided into a plurality of code blocks (CB), and channel coding is performed in a CB unit. The retransmission after an initial transmission is performed in a TB unit, and the TBs need to be retransmitted even when only one CB fails to decode. Therefore, it may be a case in which the retransmission needs to be made in a CB unit. For the case, there is a need for a method of inserting and operating a CB index notifying a CB of the order of CBs.

Another object of the present disclosure is directed to provision of a transmitting and receiving of a terminal in a mobile communication system. The 5th generation wireless cellular communication system (hereinafter, referred to as 5G communication system) should be able to provide various services having different transmission/reception techniques and transmission/reception parameters in one system in order to satisfy various requirements and services of users and aims to be designed so that services to be added in future in consideration of forward compatibility will not be restricted by the design of the existing system. As an example of a method for supporting various services, the 5G communication system should be able to operate more efficiently in various frequency bands than the existing communication system. That is, the 5G communication system should be able to operate efficiently even in a frequency band of 70 GHz or more as well as in a frequency band of 1 GHz or less. In the frequency band of 1 GHz or less, the 5G communication system has an advantage of securing a wide coverage but has a disadvantage in that it is difficult to secure a wide frequency band. On the other hand, in the high frequency band of 70 GHz or more, the 5G communication system is easy to secure a wide frequency band and therefore is suitable for superhigh speed data transmission, but has a disadvantage of a narrow coverage.

Another object of the present disclosure is directed to provision of various services having different transmission/reception techniques and transmission/reception parameters in one system in order to satisfy various requirements and services of users in the 5th generation wireless cellular communication system (hereinafter, referred to as 5G communication system) and to realize a design so that services to be added in future in consideration of forward compatibility are not restricted by the current system. As an example of a method for supporting various services in the 5G communication system, the present disclosure can consider a system for supporting a plurality of numerologies or subcarrier spacing in one system.

Meanwhile, in the wireless communication system, a terminal performs the following initial connection step for the purpose of establishing a radio link with a base station. First, synchronization with a cell in a network is acquired, and a master information block (MIB) is acquired by physical broadcast channel (PBCH) decoding. The MIB contains the most basic information for connection to the system. Based on the information, a physical downlink control channel (PDCCH) and a physical downlink shared channel (PDSCH) are decoded to obtain a system information block (SIB). Thereafter, it exchanges identity with the base station through a random access step and then performs an initial connection to a network through steps such as registration and authentication. At this time, since the 5G communication system supports various numerologies, for example, various parameters for the subcarrier spacing, the numerologies for the physical layer channel in which each information is transmitted in the initial connection step may be different from each other. However, since the terminal cannot know the subcarrier spacing used by the system during the initial connection process, the initial connection may not be efficiently performed.

In addition, a terminal in an RRC_IDLE state undergoes a paging process to start data transmission/reception. In order to observe the paging information, the terminal wakes up for a little while at a predetermined time interval to observe control signaling. For the terminal in the RRC_IDLE state, the network knows a location of the terminal in a tracking area (TA) unit, not in a cell unit, in which the TA is defined by grouping several neighboring eNBs. The paging message may be transmitted across a plurality of cells within the TA. The paging message is transmitted through the PDSCH, and scheduling information on the PDSCH can be acquired from the PDCCH configured as P-RNTI. In this case, if various numerologies are used in the 5G communication system, each cell can transmit the paging message through a physical layer channel set at different subcarrier spacings. In particular, if an initial connection to a certain cell is performed and then a reselection to another cell is performed, the corresponding cell does not have any information on the terminal in the RRC_IDLE state, such that an operation procedure for efficiently transmitting the paging message is used.

Therefore, the present disclosure proposes an effective method and operation procedure for cell initial connection and paging suitable for the 5G communication system. The cell initial connection and paging method proposed by the present disclosure can support the efficient services for various numerologies to more flexibly operate the 5G communication system capable of simultaneously providing different requirements.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a method of a terminal comprising: receiving a transport block including a plurality of code blocks from a base station; and receiving information indicating a code block which the terminal fails to decode among a plurality of code blocks and a code block whose decoding fails from the base station.

Various embodiments of the present disclosure are directed to the provision of a terminal comprising: a transceiver transmitting and receiving a signal; and a controller configured to receive a transport block including a plurality of code blocks from a base station and receive information indicating a code block which the terminal fails to decode among a plurality of code blocks and a code block whose decoding fails from the base station.

Various embodiments of the present disclosure are directed to the provision of a method of a base station comprising: transmitting a transport block including a plurality of code blocks to a terminal; and transmitting information indicating a code block which the terminal fails to decode among a plurality of code blocks and a code block whose decoding fails to the terminal.

Various embodiments of the present disclosure are directed to the provision of a base station comprising: a transceiver transmitting and receiving a signal; and a controller configured to transmit a transport block including a plurality of code blocks to a terminal and receive information indicating a code block which the terminal fails to decode among a plurality of code blocks and a code block whose decoding fails to the terminal.

Various embodiments of the present disclosure are directed to the provision of a method of a terminal comprising: identifying a partial subframe on which a part of symbols included in a subframe overlaps with a measurement gap configured for a terminal and communicating with a base station on the partial subframe.

Various embodiments of the present disclosure are directed to the provision of a terminal comprising: a transceiver transmitting and receiving a signal; and a controller configured to identify a partial subframe on which a part of symbols included in a subframe overlaps with a measurement gap configured for a terminal and communicate with a base station on the partial subframe.

Various embodiments of the present disclosure are directed to the provision of a method of a base station comprising: identifying a partial subframe on which a part of symbols included in a subframe overlaps with a measurement gap configured for a terminal and communicating with a terminal on the partial subframe.

Various embodiments of the present disclosure are directed to the provision of a base station comprising: a transceiver transmitting and receiving a signal; and a controller configured to identify a partial subframe on which a part of symbols included in a subframe overlaps with a measurement gap configured for a terminal and communicate with a terminal on the partial subframe.

Various embodiments of the present disclosure are directed to the provision of a method of a terminal, comprising: receiving a control channel associated with a transmission of system information from a base station; receiving a data channel to which the system information is transmitted based on the received control channel; and acquiring the system information using numerology associated with the control channel among a plurality of numerologies that the terminal supports.

Various embodiments of the present disclosure are directed to the provision of a terminal, comprising: a transceiver transmitting and receiving a signal; and a controller configured to receive a control channel associated with a transmission of system information from a base station, receiving a data channel to which the system information is transmitted based on the received control channel and acquire the system information using numerology associated with the control channel among a plurality of numerologies that the terminal supports.

Various embodiments of the present disclosure are directed to the provision of a method of a base station, comprising: transmitting a control channel associated with system information of the base station to a terminal; and transmitting a data channel to which the system information is transmitted to the terminal, in which the data channel to which the system information is transmitted may be transmitted using numerology associated with the control channel among a plurality of numerologies that the base station supports.

Various embodiments of the present disclosure are directed to the provision of a base station in a wireless communication system, comprising: a transceiver transmitting and receiving a signal; and a controller configured to transmit a control channel associated with system information of the base station to a terminal and transmit a data channel to which the system information is transmitted to the terminal, in which the data channel to which the system information is transmitted may be transmitted using numerology associated with the control channel among a plurality of numerologies that the base station supports.

According to an embodiment of the present disclosure, the operation method of inserting and transmitting a CB index can be provided to make the transmission of the base station and the terminal efficient, thereby reducing the unnecessary data transmission. As a result, the method capable of saving resources for retransmission using the scheme of transmitting a part of initial transmission upon retransmission can be provided.

According to another embodiment of the present disclosure, the transmission/reception method of a terminal is defined in a mobile communication system, thereby efficiently utilizing the radio resources and reducing the transmission delay.

In addition, according to still another embodiment of the present disclosure, the efficient cell initial connection and paging method is provided in the 5G communication system supporting various numerologies, thereby efficiently operating the 5G wireless communication system simultaneously supporting various services having different requirements.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1O illustrates a diagram of an internal structure of a terminal according to embodiments of the present disclosure;

FIG. 2L illustrates a diagram of an operation method of a terminal and a base station according to embodiments of the present disclosure;

FIG. 2O illustrates a diagram of flexible HARQ timing in the NR system;

FIGS. 2T and 2U illustrate diagrams of a method of measuring, by a terminal, channel status information (CSI) in a partial subframe;

DETAILED DESCRIPTION

Figure 1A:
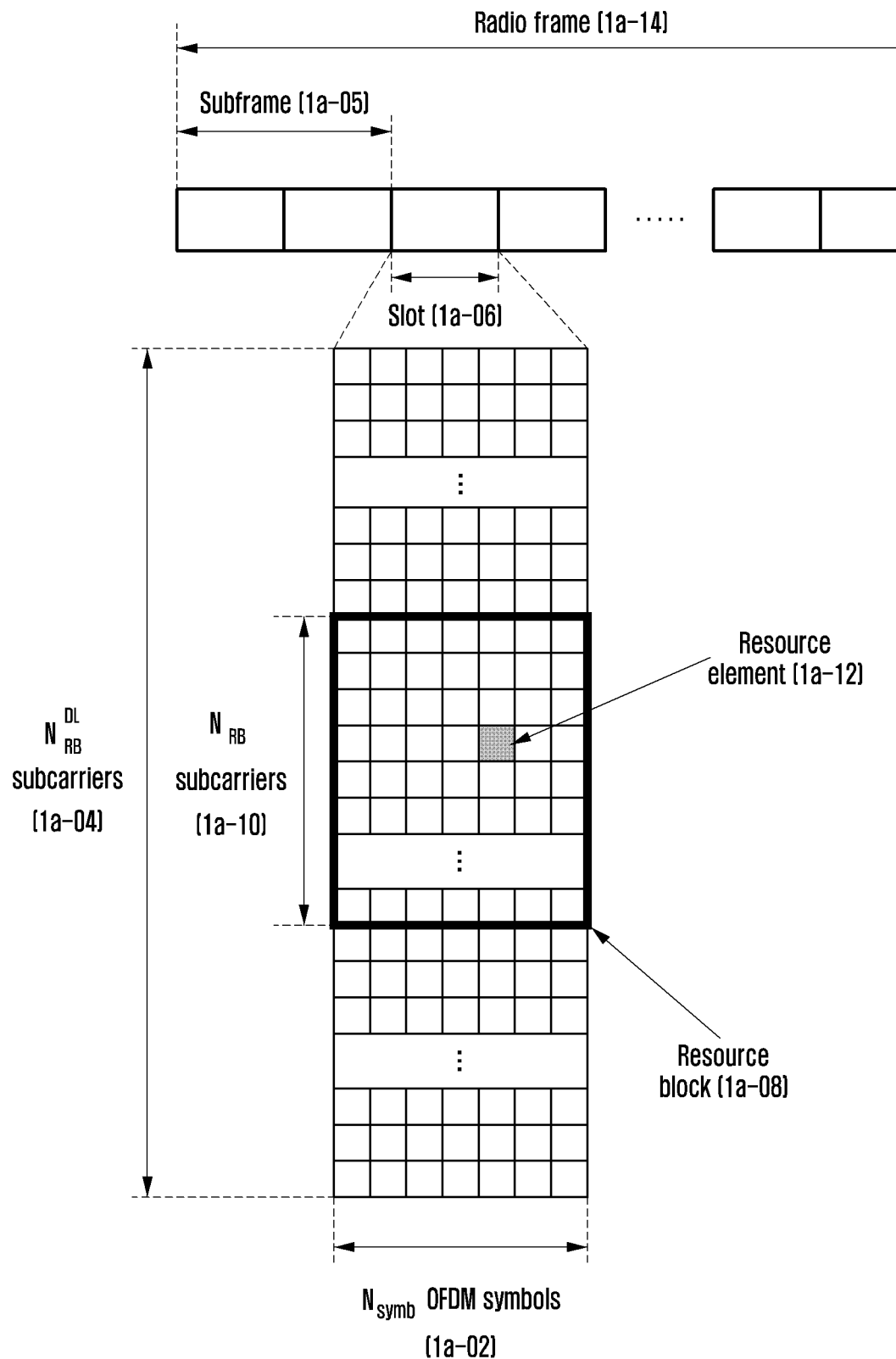
FIG. 1A illustrates a diagram of a transport structure of a time-frequency domain of the LTE or LTE-A system.

FIGS. 1A through 3R, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings. When it is decided that a detailed description for the known function or configuration related to the present disclosure may obscure the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc., has also emerged. To implement the IoT, technology elements, such as a sensing technology, wired and wireless communication and network infrastructure, a service interface technology, and a security technology, have been used. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, technologies such as the sensor network, the machine to machine (M2M), and the machine type communication (MTC), have been implemented by techniques such as the beamforming, the MIMO, and the array antenna that are the 5G communication technologies. The application of the cloud radio access network (cloud RAN) as the big data processing technology described above may also be considered as an example of the fusing of the 5G technology with the IoT technology.

Meanwhile, a new radio access technology (NR) which is a new 5G communication system is designed to freely multiplex various services in time and frequency resources. Accordingly, waveform/numerology, a reference signal and the like may be dynamically or freely allocated according to a need of the corresponding services. In order to provide an optimal service to a terminal in wireless communication, it is important to transmit optimized data based on a quality of channels and a measurement of an interference amount. As a result, it is essential to accurately measure a channel status. However, unlike the 4G communication in which channel and interference characteristics are not greatly changed depending on frequency resources, the 5G channel has channel and interference characteristics greatly changed depending on services, and as a result, there is a need to support a subset of frequency resource group (FRG) that can measure the channel and interference characteristics separately. Meanwhile, in the NR system, a kind of supported services may be classified into categories such as enhanced mobile broadband (eMBB), massive machine type communications (mMTC), ultra-reliable and low-latency communications (URLLC) or the like. The eMBB may be considered as a service aiming at a high speed transmission of high-capacity data, the mMTC may be considered as a service aiming at terminal power minimization and an access of multiple terminals, and the URLLC may be considered as a service aiming at high reliability and low latency. Different requirements may be applied depending on a type of services applied to the terminal As described above, a plurality of services can be provided to a user in the communication system, and a method capable of providing each service within the same time interval in accordance with characteristics to provide a plurality of services to users and an apparatus using the same are used.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the 'unit' performs any roles. However, the meaning of the 'unit' is not limited to software or hardware. The 'unit' may be configured to be in a storage medium that may be addressed and may also be configured to reproduce one or more processor. Accordingly, for example, the 'unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card. Further, in some embodiments, '~unit' may include one or more processors.

A wireless communication system has been developed from a wireless communication system providing a voice centered service in the early stage toward broadband wireless communication systems providing high-speed, high-quality packet data services, such as communication standards of high speed packet access (HSPA) and long term evolution (LTE) or evolved universal terrestrial radio access (E-UTRA) of the 3GPP, high rate packet data (HRPD) and ultra mobile broadband (UMB) of 3GPP2, 802.16e of IEEE or the like. In addition, the 5G or new radio (NR) communication standards are being produced as the 5G wireless communication system.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS) transmits data or a control signal to a base station (eNodeB or base station (BS)) and the down link refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

If a decoding failure occurs upon initial transmission, the LTE system has adopted a hybrid automatic repeat request (HARQ) scheme of retransmitting the corresponding data in a physical layer. If a receiver does not accurately decode data, the HARQ scheme enables a receiver to transmit information (negative acknowledgement (NACK)) notifying the decoding failure to a transmitter so that the transmitter can retransmit the corresponding data in the physical layer. The receiver combines the data retransmitted by the transmitter with the data that are not decoded previously, thereby increasing reception performance of the data. Further, if the receiver accurately decodes the data, information (acknowledgement (ACK)) notifying a decoding success is transmitted to the transmitter so that the transmitter may transmit new data.

FIG. 1A illustrates a diagram of a basic structure of a time-frequency domain that is a radio resource region in which data or a control channel is transmitted in a downlink, in the LTE system.

In FIG. 1A, a horizontal axis represents a time domain and a vertical axis represents a frequency domain. A minimum transmission unit in the time domain is an OFDM symbol, in which one slot 1a-06 is configured by collecting $N_{symb}$ OFDM symbols 1a-02 and one subframe 1a-05 is configured by collecting two slots. A length of the slot is 0.5 milliseconds (ms) and a length of the subframe is 1.0 ms. Further, a radio frame 1a-14 is a time domain unit which includes 10 subframes. A minimum transmission unit in the frequency domain is a subcarrier, in which the whole system transmission bandwidth includes a total of $N_{BW}$ subcarriers 1a-04.

A basic unit of resources in the time-frequency domain is a resource element (RE) 1a-12 and may be represented by an OFDM symbol index and a subcarrier index. A resource block (RB) (or a physical resource block (PRB)) 1a-08 is defined by the $N_{symb}$ continued OFDM symbols 1a-02 in the time domain and $N_{RB}$ continued subcarriers 1a-10 in the frequency domain. Therefore, one RB 1a-08 includes $N_{symb} \times N_{RB}$ REs 1a-12. Generally, a minimum transmission unit of the data is the RB unit. In the LTE system, generally, $N_{symb}=7$ and $N_{RB}=12$, and $N_{BW}$ and $N_{RB}$ are proportional to a bandwidth of the system transmission band, but other values may be used in systems other than the LTE system. A data rate is increased in proportion to the number of RBs scheduled for the terminal. The LTE system is operated by defining six transmission bandwidths. In an FDD system operated by dividing the downlink and the uplink based on a frequency, a downlink transmission bandwidth and an uplink transmission bandwidth may be different from each other. A channel bandwidth represents an RF bandwidth corresponding to the system transmission bandwidth. The following Table 1a-01 shows a correspondence relationship between the system transmission bandwidth and a channel bandwidth that are defined in the LTE system. For example, the LTE system having the channel bandwidth of 10 MHz is configured of a transmission bandwidth including 50 RBS.

TABLE 1a-01

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information may be transmitted within first N OFDM symbols within the subframe. Generally, N={1, 2, 3}. Therefore, the N value may variably apply to each subframe depending on the amount of control information to be transmitted to the current subframe. The transmitted control information may include a control channel transmission section indicator representing over how many OFDM symbols the control information is transmitted, scheduling information on downlink data or uplink data, information on HARQ ACK/NACK.

In the LTE system, the scheduling information on the downlink data or the uplink data is transmitted from a base station to a terminal through downlink control information (DCI). The DCI is defined depending on various formats. Depending on each format, it may be represented whether the DCI is scheduling information (uplink (UL) grant) on the uplink data or scheduling information (downlink (DL) grant) on the downlink data, whether the DCI is compact DCI having small-sized control information, whether to apply spatial multiplexing using a multiple antenna, whether the DCI is DCI for a power control, or the like. For example, DCI format 1 that is the scheduling control information (DL grant) on the downlink data may include at least one of the following control information.

Resource allocation type 0/1 flag: It is indicated whether a resource allocation scheme is type 0 or type 1. The type 0 applies a bitmap scheme to allocate a resource in a resource block group (RBG) unit. In the LTE system, a basic unit of the scheduling is the resource block (RB) represented by a time-frequency domain resource and the RBG includes a plurality of RBs and thus becomes a basic unit of the scheduling in the type 0 scheme. The type 1 allocates a specific RB within the RBG.

Resource block assignment: The RB allocated to the data transmission is indicated. The represented resource is determined depending on the system bandwidth and the resource allocation scheme.

Modulation and coding scheme (MCS): The modulation scheme used for the data transmission and a size of a transport block that is data to be transmitted are indicated.

HARQ process number: An HARQ process number is indicated.

New data indicator: An HARQ initial transmission or retransmission is indicated.

Redundancy version: An HARQ redundancy version is indicated.

Transmit power control (TPC) command for physical uplink control channel (PUCCH): A transmit power control command for the PUCCH that is an uplink control channel is indicated.

The DCI is subjected to a channel coding and modulation process and then may be transmitted on a physical downlink control channel (PDCCH) (or control information, which is interchangeably used below) or an enhanced PDCCH (EPDCCH) (or enhanced control information, which is interchangeably used below).

Generally, the DCI is independently scrambled with a specific radio network temporary identifier (RNTI) (or a terminal identifier) for each terminal to be added with a cyclic redundant check (CRC), subjected to channel coding, and then configured of independent PDCCH to be transmitted. In the time domain, the PDCCH is transmitted while being mapped during the control channel transmission section. A mapping location in the frequency domain of the PDCCH may be determined by identifiers (IDs) of each terminal and transmitted over the entire system transmission bandwidth.

The downlink data may be transmitted on a physical downlink shared channel (PDSCH) that is a physical channel for downlink data transmission. The PDSCH may be transmitted after the control channel transmission section, and the scheduling information on the specific mapping location in the frequency domain, the modulation scheme, or the like may be determined based on the DCI transmitted through the PDCCH.

By the MCS among the control information configuring the DCI, the base station notifies the modulation scheme applied to the PDSCH to be transmitted to the terminal and a data size (transport block size (TBS)) to be transmitted. The MCS may include 5 bits or bits larger or smaller than that. The TBS corresponds to a size before channel coding for error correction is applied to data (transport block (TB)) to be transmitted by a base station.

The modulation scheme supported in the LTE system is quadrature phase shift keying (QPSK), 16 quadrature amplitude modulation (16 QAM), and 64QAM, in which each modulation order $Q_m$ corresponds to 2, 4, and 6. That is, in the case of the QPSK modulation, 2 bits per symbol may be transmitted, in the case of the 16QAM modulation, 4 bits per symbol may be transmitted, and in the case of the 64QAM modulation, 6 bits per symbol may be transmitted. Further, the modulation scheme above 256 QAM may be used depending on the system modification.

Figure 1B:
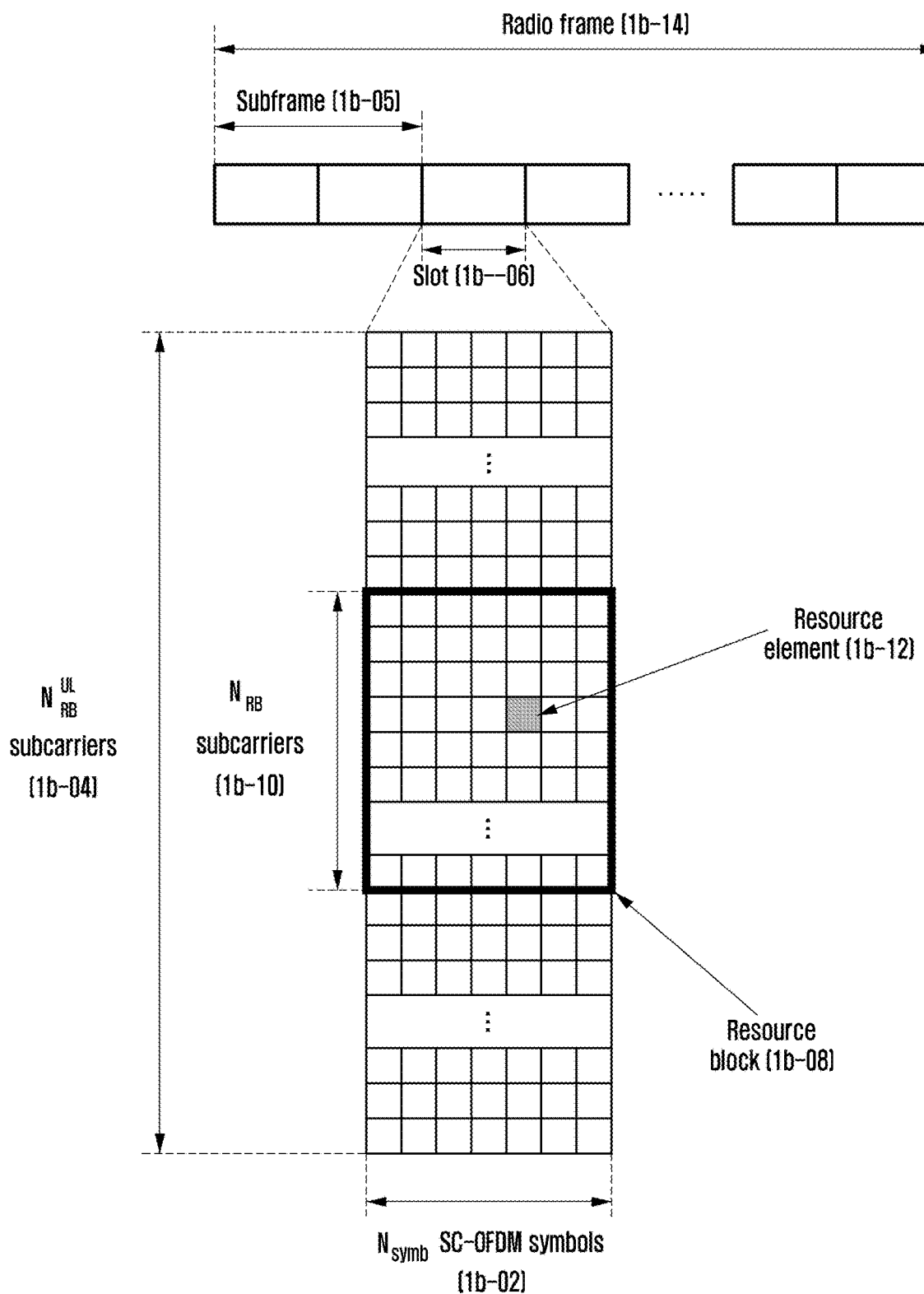
FIG. 1B illustrates a diagram of a transport structure of an uplink time-frequency domain of the LTE or LTE-A system.

FIG. 1B illustrates a diagram of a basic structure of a time-frequency domain that is a radio resource region in which data or a control channel is transmitted in the uplink, the LTE system.

Referring to FIG. 1B, a horizontal axis represents a time domain and a vertical axis represents a frequency domain. The minimum transmission unit in the time domain is an SC-FDMA symbol 1b-02, and may configure one slot 1b-06 by collecting $N_{symb}$ UL SC-FDMA symbols. One subframe 1b-05 is configured by collecting two slots. The minimum transmission unit in the frequency domain is a subcarrier, in which the entire system transmission bandwidth 1b-04 includes a total of $N_{BW}$ subcarriers. The $N_{BW}$ may have a value proportional to the system transmission bandwidth.

A basic unit of resources in the time-frequency domain is a resource element (RE) 1b-12 and may be defined by an SC-FDMA symbol index and a subcarrier index. A resource block pair (RB pair) 1b-08 may be defined by $N_{symb}$ UL continued SC-FDMA symbols in the time domain and $N_{sc}$ RB continued subcarriers in the frequency domain. Accordingly, one RB includes $N_{symb}$ UL×$N_{sc}$ RB REs. In general, the minimum transmission unit of the data or the control information is the RB unit. The PUCCH is mapped to a frequency domain corresponding to 1 RB and transmitted for one subframe.

In the LTE system, a timing relationship between a PUCCH or a PUSCH is defined, with the PUCCH or the PUSCH being an uplink physical channel to which an HARQ ACK/NACK corresponding to a PDSCH as a physical channel for downlink data transmission or a PDCCH/

EPDDCH including a semi-persistent scheduling release (SPS release) is transmitted. For example, in an LTE system operated by frequency division duplex (FDD), the HARQ ACK/NACK corresponding to the PDSCH transmitted in an n−4-th subframe or the PDCCH/EPDCCH including the SPS release is transmitted to the PUCCH or the PUSCH in an n-th subframe.

In the LTE system, the downlink HARQ has adopted an asynchronous HARQ scheme in which data retransmission time is not fixed. That is, if for initial transmission data transmitted by the base station, the HARQ NACK is fed back from the terminal, the base station freely determines transmission time of retransmission data based on the scheduling operation. The terminal performs buffering on data determined as an error as a result of decoding the received data for an HARQ operation and then performs combining with the next retransmission data.

If the terminal receives the PDSCH including the downlink data transmitted from the base station in subframe n, the terminal transmits the uplink control information including the HARQ ACK or the NACK of the downlink data to the base station through the PUCCH or PUSCH in subframe n+k. At this time, the k is differently defined depending on the FDD or time division duplex (TDD) of the LTE system and the subframe setting thereof. For example, in the case of the FDD LTE system, the k is fixed as 4. Meanwhile, in the case of the TDD LTE system, the k may be changed depending on the subframe setting and the subframe number.

In the LTE system, unlike the downlink HARQ, the uplink HARQ has adopted a synchronous HARQ scheme in which the data transmission time is fixed. That is, the uplink/downlink timing relationship between the physical uplink shared channel (PUSCH) as the physical channel for the uplink data transmission and the PDCCH as the downlink control channel preceding the PUSCH and a physical hybrid indicator channel (PHICH) as the physical channel to which a downlink HARQ ACK/NACK corresponding to the PUSCH is transmitted is fixed by the following rule.

If in the subframe n, the terminal receives the PDCCH including the uplink scheduling control information transmitted from the base station or the PHICH to which the downlink HARQ ACK/NACK are transmitted, the terminal transmits the uplink data corresponding to the control information through the PUSCH in subframe n+k. At this time, the k is differently defined depending on the FDD or the time division duplex (TDD) of the LTE system and the setting thereof. For example, in the case of the FDD LTE system, the k is fixed as 4. Meanwhile, in the case of the TDD LTE system, the k may be changed depending on the subframe setting and the subframe number. In the FDD LTE system, if the base station transmits an uplink scheduling grant or a downlink control signal and data to the terminal in the subframe n, the terminal receives the uplink scheduling grant or the downlink control signal and data in the subframe n. First, if the uplink scheduling grant is received in the subframe n, the terminal performs the uplink data transmission in subframe n+4. If the downlink control signal and data are received in the subframe n, the terminal transmits HARQ ACK or NACK for the downlink data in the subframe n+4. Therefore, the terminal receives the uplink scheduling grant and performs the uplink data transmission or receives the downlink data, and the time taken to transmit the HARQ ACK or the NACK becomes 3 ms corresponding to 3 subframes. Further, if the terminal receives the PHICH transporting the downlink HARQ ACK/NACK from the base station in subframe i, the PHICH corresponds to the PUSCH that the terminal transmits in subframe i−k. At this time, the k is differently defined depending on the FDD or the TDD of the LTE system and the setting thereof. For example, in the case of the FDD LTE system, the k is fixed as 4. Meanwhile, in the case of the TDD LTE system, the k may be changed depending on the subframe setting and the subframe number.

Figure 1C:
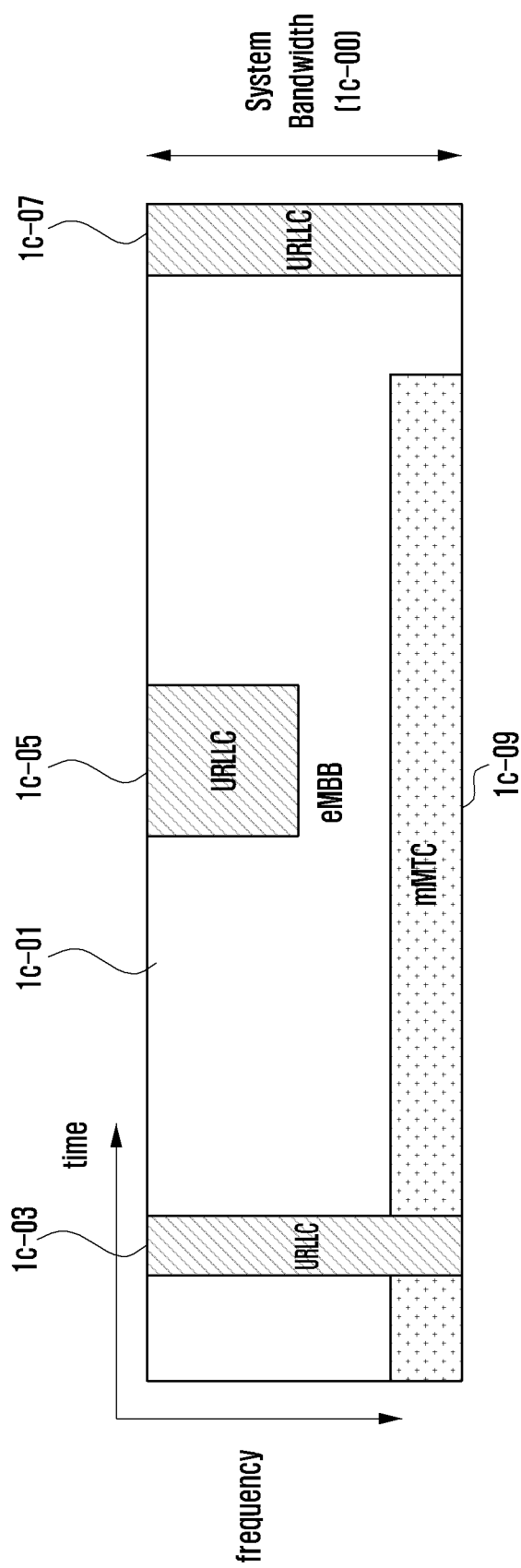
FIG. 1C illustrates a diagram of a state in which data for eMBB, URLLC, and mMTC are allocated in frequency-time resources in a communication system.
Figure 1D:
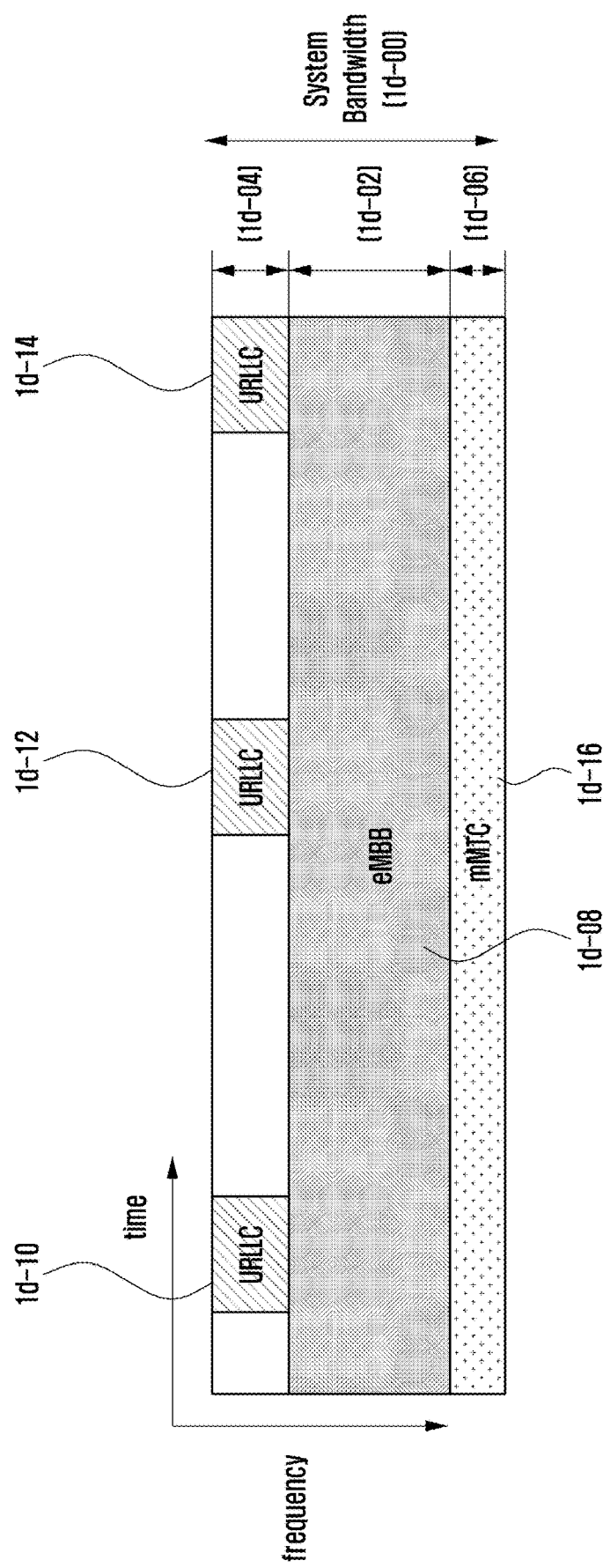
FIG. 1D illustrates a diagram of a state in which the data for eMBB, URLLC, and mMTC are allocated in the frequency-time resources in the communication system.

FIGS. 1C and 1D illustrate states in which data for eMBB, URLLC, and mMTC, which are services to be considered in a 5G or NR system are allocated in frequency-time resources.

Referring to FIGS. 1C and 1D, a method for allocating frequency and time resources for information transmission in each system can be seen.

First, FIG. 1C illustrates a state in which the data for the eMBB, the URLLC, and the mMTC are allocated in the entire system frequency bandwidth 1c-00. If URLLC data 1c-03, 1c-05, and 1c-07 is generated while eMBB 1c-01 and mMTC 1c-09 are allocated and transmitted in a specific frequency band and need to be transmitted, a part where the eMBB 1c-01 and the mMTC 1c-09 are previously allocated may be emptied or the eMBB 1c-01 and the mMTC 1c-09 may not be transmitted, and the URLLC data 1c-03, 1c-05, and 1c-07 may be transmitted. Among the above services, since latency of the URLLC needs to reduce, the URLLC data 1c-03, 1c-05, and 1c-07 may be transmitted by being allocated to a part of the resource 1c-01 to which the eMBB is allocated. Of course, if the URLLC is transmitted by being additionally allocated to the resource to which the eMBB is allocated, the eMBB data may not be transmitted in the redundancy frequency-time resources, such that the transmission performance of the eMBB data may deteriorate. That is, in such a case, the eMBB data transmission failure may occur due to the URLLC allocation.

In FIG. 1D, the entire system frequency band 1d-00 may be divided and used to transmit services and data in the respective subbands 1d-02, 1d-04, 1d-06. Information related to the subband setting may be determined in advance. The information may be transmitted from the base station to the terminal through higher signaling. Alternatively, the information related to the subbands may be arbitrarily divided by the base station or a network node to transmit services without transmitting separate subband configuration information to the terminal. FIG. 1D illustrates a state in which the subband 1d-02 is used for eMBB data transmission, the subband 1d-04 is used for URLLC data transmission, and the subband 1d-06 is used for mMTC data transmission.

A transmission time interval (TTI) length used for the URLLC transmission may be shorter than that used for the eMBB or mMTC transmission. In addition, a response to the information related to the URLLC may be transmitted faster than the eMBB or mMTC, such that the information may be transmitted and received with the low latency.

Figure 1E:
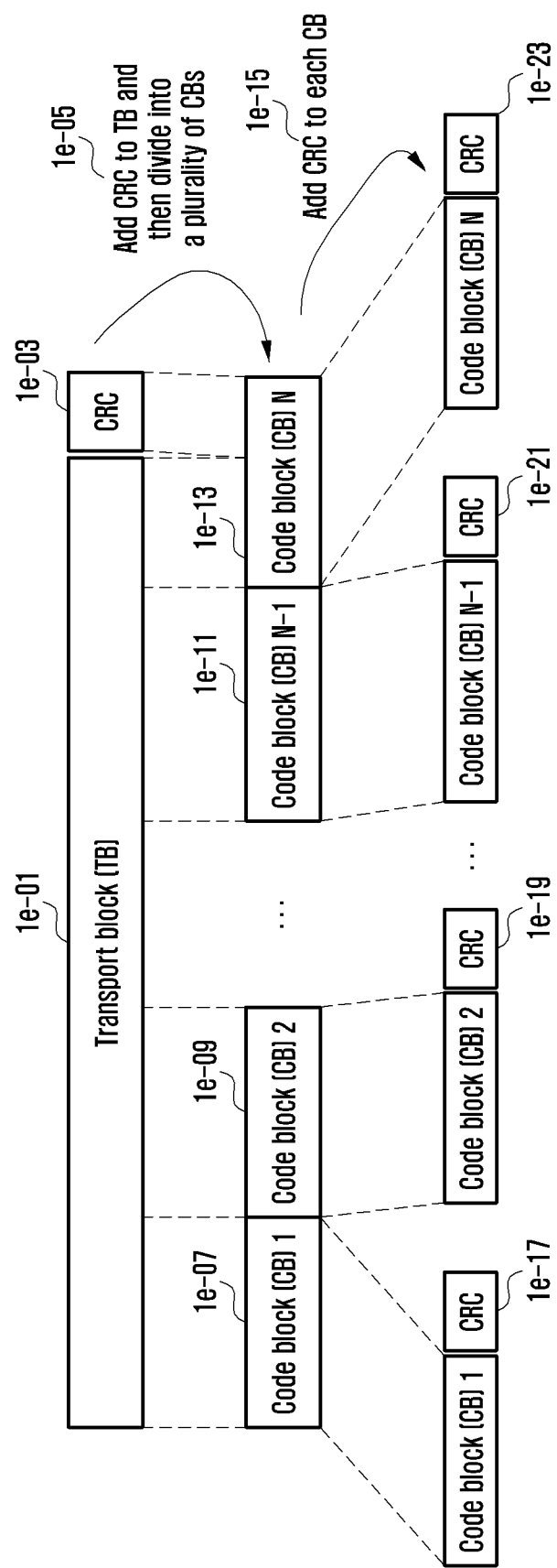
FIG. 1E illustrates a diagram of a structure in which one transport block according to embodiments of the present disclosure is divided into several code blocks and a CRC is added.

FIG. 1E illustrates a diagram of a process in which one transport block is divided into a plurality of code blocks and a CRC is added.

Referring to FIG. 1E, a CRC (1e-03) may be added to the last or first part of one transport block or a transport block (TB) 1e-01 to be transmitted in the uplink or the downlink. The CRC may have 16 bits or 24 bits, the predetermined number of bits, or the number of bits varying depending on a channel condition or the like, and may be used to determine whether channel coding succeeds. The blocks 1e-01 and 1e-03 to which the TB and the CRC are added can be divided (1e-05) into a plurality of code blocks (CBs) 1e-07, 1e-09, 1e-11, and 1e-13-05. The maximum size of the code block is set in advance and the code block may be divided accordingly. In this case, the last code block 1e-13 may be smaller than other code blocks, or the last code block 1e-13 may be added with 0, a random value, or 1 so that the length thereof may be adjusted to be equal to the length of other code blocks. CRCs 1e-17, 1e-19, 1e-21, and 1e-23 may be added (1e-15) to each of the divided code blocks. The CRC may have 16 bits or 24 bits or the predetermined number of bits, and may be used to determine whether channel coding succeeds. However, the CRC 1e-03 added to the TB and the CRCs 1e-17, 1e-19, 1e-21, and 1e-23 added to the code block are omitted depending on the type of channel codes to be applied to the code block. For example, if an LDPC code is applied to the code block instead of a turbo code, the CRCs 1e-17, 1e-19, 1e-21, and 1e-23 to be inserted into each code block may be omitted. However, even when the LDPC is applied, the CRCs 1e-17, 1e-19, 1e-21, and 1e-23 may be added to the code block as they are. In addition, the CRC may be added or omitted even when a polar code is used.

Figure 1F:
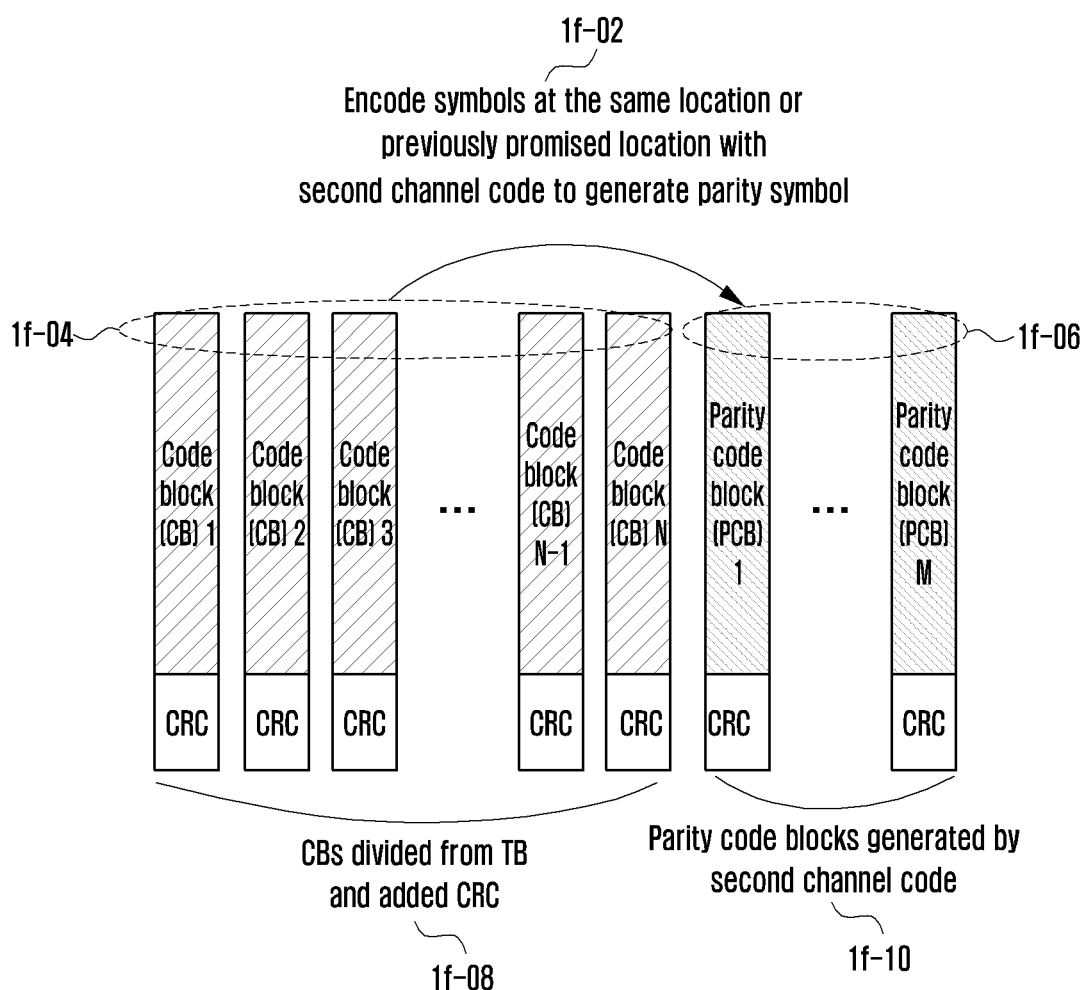
FIG. 1F illustrates a diagram of a structure in which an outer code according to embodiments of the present disclosure is applied and coded.
Figure 1G:
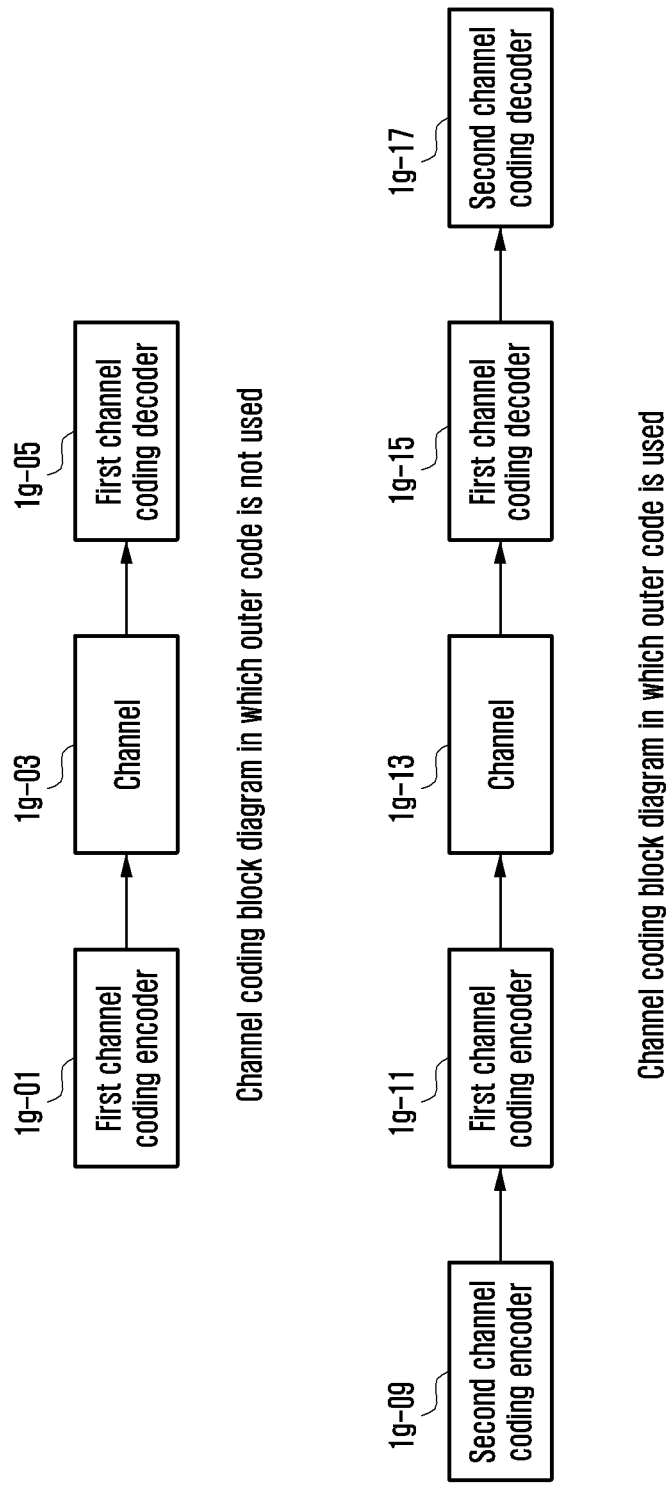
FIG. 1G illustrates a block diagram depending on whether to apply the outer code according to embodiments of the present disclosure.

FIG. 1F illustrates a diagram of a manner in which an outer code is used and transmitted, and FIG. 1G is a block diagram illustrating a structure of a communication system in which the outer code is used.

Referring to FIGS. 1F and 1G, a method of transmitting a signal using an outer code may be reviewed.

Referring to FIG. 1F, one transport block is divided into a plurality of code blocks and bits or symbols 1f-04 at the same position in each code block are encoded with a second channel code to generate (1f-02) parity bits or symbols 1f-06. Thereafter, the CRCs may be added (1f-08 and 1f-10) to the respective code blocks and the parity code blocks generated by the second channel code encoding, respectively. It can vary whether to add the CRC depending on the type of channel codes. For example, when the turbo code is used as a first channel code, the CRCs (1f-08 and 1f-10) are added. Thereafter, however, the respective code blocks and parity code blocks may be encoded with the first channel code encoding.

In FIG. 1G, if the outer code is used, the data to be transmitted passes through a second channel coding encoder 1g-09. As the channel code used for the second channel coding, for example, a Reed-Solomon code, a BCH code, a Raptor code, a parity bit generation code, or the like may be used. The bits or symbols that have passed through the second channel coding encoder 1g-09 pass through a first channel coding encoder 1g-11. The channel code used for the first channel coding may include a convolutional code, an LDPC code, a turbo code, a polar code or the like. If the receiver receives the channel-coded symbols through a channel 1g-13, a first channel coding decoder 1g-15 and a second channel coding decoder 1g-17 may be sequentially operated based on a signal received by the receiver side. The first channel coding decoder 1g-15 and the second channel coding decoder 1g-17 may each perform operations corresponding to the first channel coding encoder 1g-11 and the second channel coding encoder 1g-09.

In the channel coding block diagram in which the outer code is not used, the first channel coding encoder 1g-11 and the first channel coding decoder 1g-05 are each used in a transceiver, and the second channel coding encoder and the second channel coding decoder are not used. Even when the outer code is not used, the first channel coding encoder 1g-01 and the first channel coding decoder 1g-05 may be configured in the same way as the case in which the outer code is used.

As will be described below, the eMBB service is referred to as a first type service, and the data for eMBB is referred to as first type data. The first type service or the first type data is not limited to the eMBB, but may correspond to even a case in which a high speed data transmission is used or a broadband transmission is performed. Further, the URLLC service is referred to as a second type service, and the data for URLLC is referred to as second type data. The second type service or the second type data are not limited to the URLLC, but may correspond to even another system in which the low latency is used or the high reliability transmission is used or a case in which the low latency and the reliability are used simultaneously. Further, the mMTC service is referred to as a third type service and the data for mMTC is referred to as third type data. The third type service or the third type data are not limited to the mMTC but may correspond to a case in which low speed, wide coverage, low power or the like are used. In addition, it may also be understood that the first type service may or may not include the third type service.

To transmit the above three services or data, a structure of physical layer channels used for each type may be different. For example, at least one of the transmission time interval (TTI) length, the frequency resource allocation unit, the control channel structure, the method for mapping data may be different.

Although three services and three data have been described above, more types of services and the corresponding data may exist. Even in this case, the content of the present disclosure may be applied.

For describing the method and the apparatus proposed in the present disclosure, the terms physical channel and signal in the existing LTE or LTE-A system can be used. However, the content of the present disclosure may be applied to wireless communication systems other than the LTE and LTE-A systems.

As described above, there are defined transmission and reception operations of the terminal and the base station for the transmission of the first type service, the second type service, the third type service, or the data and receiving operation of a terminal and a base station for data transmission, and proposes a detailed method for operating terminals receiving different types of services or data scheduling within the same system together. In the present disclosure, a first type terminal, a second type terminal, and a third type terminal each indicate terminals that receive the first type service, the second type service, the third type service, or the data scheduling. The first type terminal, the second type terminal, and the third type terminal may be the same terminal or may be different terminals.

Hereinafter, embodiments of the present disclosure will be described in detail with reference to the accompanying drawings. When it is decided that a detailed description for the known function or configuration related to the present disclosure may obscure the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification. Hereinafter, a base station is the subject performing resource allocation of a terminal and may be at least one of eNodeB, Node B, a base station (BS), a wireless access unit, a base station controller, and a node on a network. The terminal may include user equipment (UE), a mobile station (MS), a cellular phone, a smart phone, a computer, or a multimedia system performing a communication function. In the present disclosure, a downlink (DL) means a radio transmission path of a signal transmitted from a base station to a terminal and an uplink (UL) means a radio transmission path of a signal transmitted from the terminal to the base station. Further, as an example of LTE or an LTE-A system, an embodiment of the present disclosure is described below, but the embodiment of the present disclosure may be applied to other communication systems having similar technical background or a channel form. For example, 5G mobile communication technologies (5G, new radio (NR)) developed after the LTE-A could be included. Further, embodiments of the present disclosure may be applied to other communication systems by partially being changed without greatly departing from the scope of the present disclosure under the decision of those skilled in the art.

In the present disclosure, the transmission time interval (TTI) may mean a unit in which the control signal and the data signal are transmitted, or a unit in which the data signal is transmitted. For example, in the existing LTE system downlink, the transmission time interval becomes a subframe of a time unit of 1 ms. Meanwhile, in the present disclosure, the transmission time interval in the uplink may mean a unit in which the control signal or the data signal is transmitted, or a unit in which the data signal is transmitted. The transmission time interval in the existing LTE system uplink becomes a subframe that is the same time unit of 1 ms as the downlink Unless specifically stated below, the shortened-TTI terminal described may include a terminal capable of transmitting control information or data or the control information and the data in 1 ms or a transmission time interval shorter than 1 ms, and the normal-TTI terminal may include a terminal capable of transmitting the control information or the data or the control information and the data in a transmission time interval of 1 ms. Meanwhile, in the present disclosure, the shortened-TTI, a shorter-TTI, a shortened TTI, a shorter TTI, a short TTI, and an sTTI have the same meaning and thus may be used together with each other. In addition, in the present disclosure, the normal-TTI, a normal TTI, a subframe TTI, and a legacy TTI have the same meaning and thus may be used together with each other. In the above, 1 ms, which is a criterion for distinguishing the shortened-TTI from the normal-TTI, may be different depending on the system. That is, in a specific NR system, based on 0.2 ms, the TTI is the shortened-TTI if the TTI is shorter than 0.2 ms, and the TTI having 0.2 ms may be referred to as the normal-TTI.

Meanwhile, one of the important criteria of the performance of the cellular wireless communication system is packet data latency. For this purpose, the LTE system transmits and receives signals in a subframe unit having the transmission time interval (TTI) of 1 ms. In the LTE system operated as described above, a short-TTI UE having a transmission time interval shorter than 1 ms may also be supported. Meanwhile, the NR, which is the 5G mobile communication system, may be shorter than 1 ms, the transmission time interval may be shorter than 1 ms. The short-TTI terminal is expected to be suitable for a voice over LTE (VoLTE) service, a remote control service or the like where the latency is important. Further, the short-TTI terminal is expected to be a mean capable of realizing the Internet of Things (IoT) which is mission critical in a cellular infrastructure.

In addition, in the present disclosure, the shortened-TTI data refers to data transmitted in the PDSCH or the PUSCH transmitted/received in a shortened TTI unit, and the normal-TTI data refers to data transmitted in the PDSCH or the PUSCH transmitted/received in a subframe unit. In the present disclosure, a control signal for the shortened-TTI refers to a control signal for the shortened-TTI mode operation and is referred to as sPDCCH, and a control signal for the normal-TTI mode refers to a control signal for the normal-TTI mode operation. For example, the control signal for the normal-TTI may be PCFICH, PHICH, PDCCH, EPDCCH, PUCCH, etc., in the existing LTE system In the present disclosure, the terms the physical channel and the signal in the existing LTE or LTE-A system may be used together with the data or the control signal. For example, the PDSCH is the physical channel to which the normal-TTI data is transmitted, but in the present disclosure, the PDSCH may be referred to as the normal-TTI data, and the sPDSCH may be the physical channel to which the shortened-TTI data are transmitted. However, in the present disclosure, the sPDSCH may be referred to as the shortened-TTI data. Similarly, in the present disclosure, the shortened-TTI data transmitted in the downlink and the uplink will be referred to as the sPDSCH and the sPUSCH.

Hereinafter, in the present disclosure, an uplink scheduling grant signal and a downlink data signal are referred to as a first signal. In addition, in the present disclosure, the uplink data signal for the uplink scheduling grant and the HARQ ACK/NACK for the downlink data signal are referred to as a second signal. In the present disclosure, among the signals transmitted from the base station to the terminal, a signal expecting a response from terminal may be a first signal, and a response signal of the terminal corresponding to the first signal may be a second signal. In addition, in the present disclosure, the service type of the first signal may belong to categories of the eMBB, the URLLC, the mMTC, and the like. Hereinafter, in the present disclosure, a TTI length of the first signal means a time length taken to transmit the first signal. In addition, in the present disclosure, a TTI length of the second signal means a time length taken to transmit the second signal. In addition, in the present disclosure, second signal transmission timing is information on when the terminal transmits the second signal and when the base station receives the second signal, which may be referred to as second signal transmitting/receiving timing.

If there is no mention of the TDD system in the present disclosure, the FDD system will be generally described. However, the method and apparatus of the present disclosure in the FDD system may be applied to the TDD system according to a simple modification.

Hereinafter, in the present disclosure, the higher signaling is a method for transmitting a signal from a base station to a terminal using a downlink data channel of a physical layer or from a terminal to a base station using an uplink data channel of a physical layer, which may be referred to as RRC signaling or a MAC control element (CE).

A method of transmitting a code block added at the time of transmitting the code block will be described with reference to FIGS. 1H, 1I, 1J, 1K, 1L, 1M and 1N.

Figure 1H:
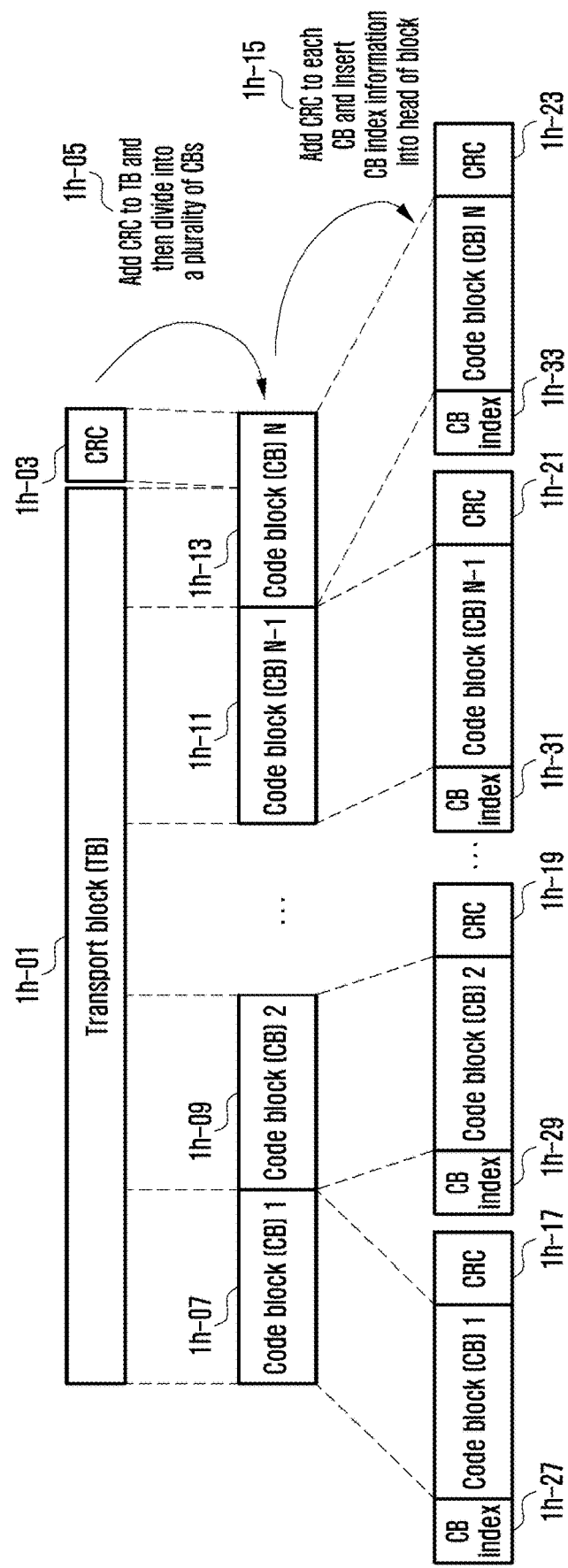
FIG. 1H illustrates a diagram of an example of a structure for inserting code block index information according to the present disclosure.

FIG. 1H illustrates a diagram of a state in which one TB is divided into a plurality of code blocks and then CRC and code block indexes are added. A CRC (1h-03) may be added to the last or head part of one TB (1h-01) to be transmitted in the uplink or the downlink. The CRC may have 16 bits or 24 bits, the predetermined number of bits, or the number of bits varying depending on a channel condition or the like, and may be used to determine whether the whole TB is successfully received. Blocks 1h-01 and 1h-03 to which the TB and the CRC are added can be divided (1h-05) into a plurality of code blocks 1h-07, 1h-09, 1h-11, and 1h-13. The maximum size of the code block is set in advance and the code block may be divided accordingly. In this case, the last code block 1h-13 may be smaller than other code blocks, or the last code block 1h-13 may be added with 0, a random value, or 1 so that the length thereof may be adjusted to be equal to the length of other code blocks. CRCs 1h-17, 1h-19, 1h-21, and 1h-23 may be added (1h-15) to each of the divided code blocks. The CRC may have 16 bits or 24 bits or the predetermined number of bits, and may be used to determine whether channel coding succeeds. However, the CRC 1h-03 added to the TB and the CRCs 1e-17, 1h-19, 1h-21, and 1h-23 added to the code block are omitted depending on the type of channel codes to be applied to the code block. For example, if an LDPC code is applied to the code block instead of a turbo code, the CRCs 1h-17, 1h-19, 1h-21, and 1h-23 to be inserted into each code block may be omitted. However, even when the LDPC is applied, the CRCs 1h-17, 1h-19, 1h-21, and 1h-23 may be added to the code block as they are. In addition, the CRC may be added or omitted even when a polar code is used.

Thereafter, the code block indexes 1h-27, 1h-29, 1h-31, and 1h-33 may be inserted into each code block and transmitted. The code block index is information indicating how many corresponding code blocks are transmitted in one TB before the code blocks transmitted in one TB or a location order (i.e., how many times the corresponding code block is located in the TB) of the corresponding code block and may include bits having a predetermined length. For example, if the code block index includes 8 bits, the code block index of 1h-27 is 00000000, the code block index of 1h-29 is 00000001, and 1h-31 and 1h-33 each may be a value obtained by converting N−1 and N into an 8-digit binary number. The length of the code block index may be determined by at least one of higher signaling, a specific value indicated by the DCI, an MCS value, and a TB size (TBS).

After the code block index and the CRC are added to the code block, channel codes such as a turbo code, an LDPC code, and a polar code may be applied.

Figure 1I:
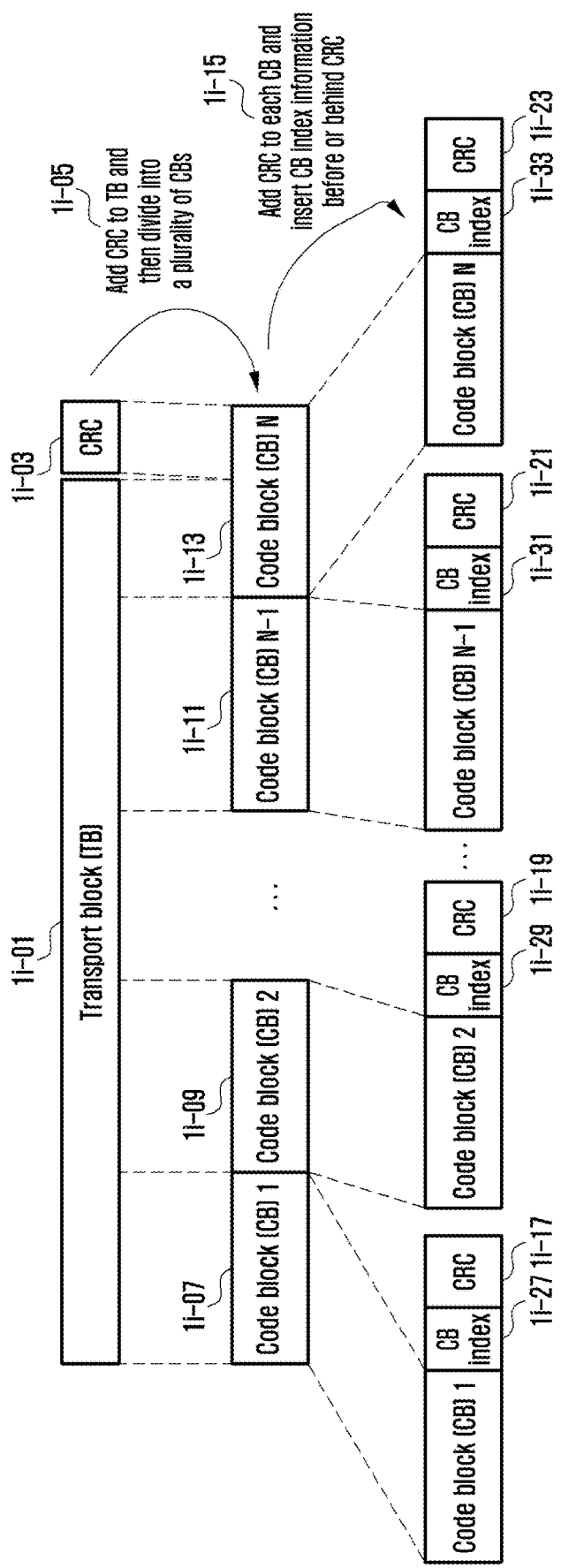
FIG. 1I illustrates a diagram of an example of the structure for inserting code block index information according to the present disclosure.

FIG. 1I illustrates a diagram of a state where a location of a code block index is added behind a code block or before CRCs 1i-27, 1i-29, 1i-31, and 1i-33. Unlike the example proposed in FIG. 1H, the state in which the code block index is added just before the CRC may be illustrated.

In FIGS. 1H and 1I, the code block index inserted into the head of the code block or before the CRC is described. In some embodiments, the code block index may be inserted between the code block and the CRC.

Figure 1J:
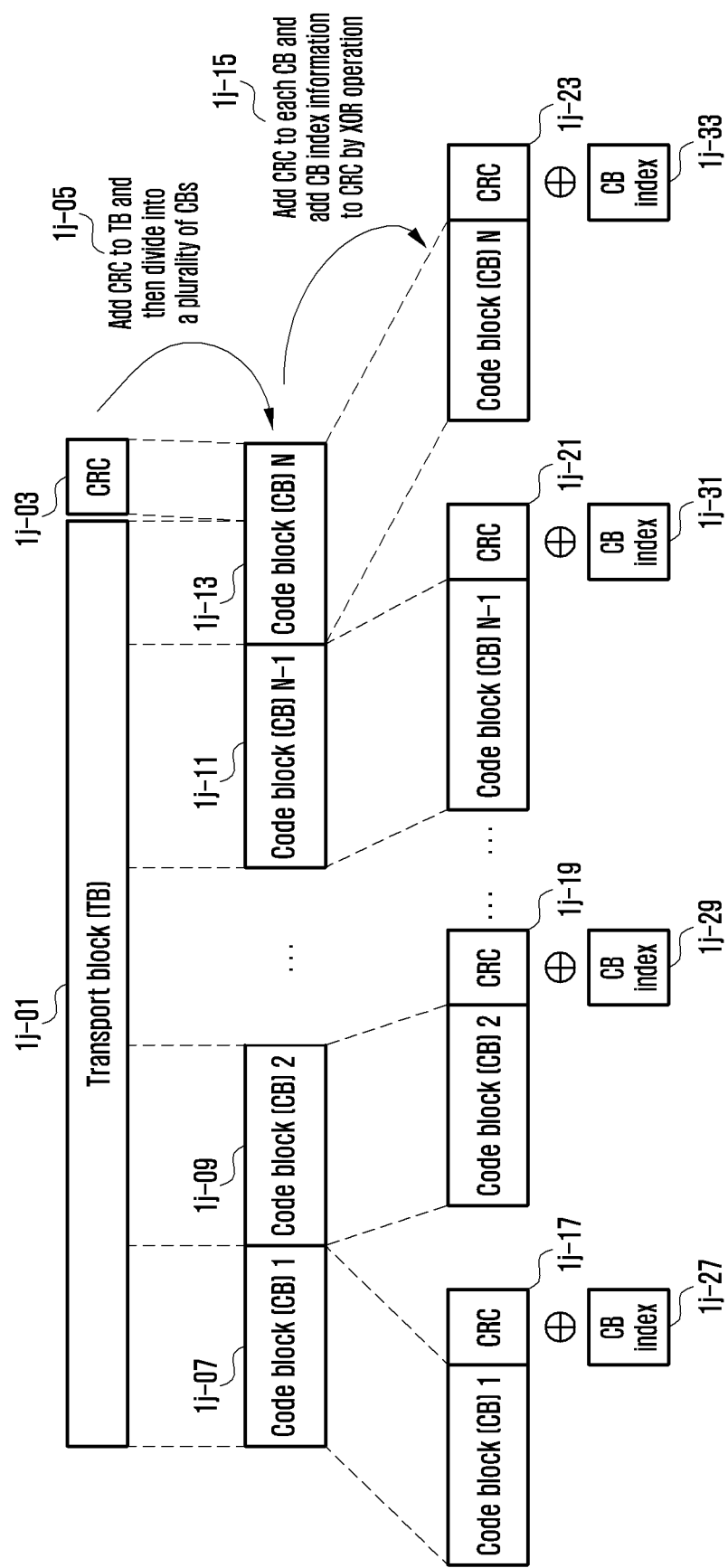
FIG. 1J illustrates a diagram of an example of the structure for inserting code block index information according to the present disclosure.

FIG. 1J illustrates a diagram of an example in which the CRC corresponding to the code block index is masked by a XOR operation. The code block indexes 1j-27, 1j-29, 1j-31, and 1j-33 are generated so as to have the same length as the CRC length and then are XOR-operated with the corresponding CRCs 1j-17, 1j-19, 1j-21, and 1j-23 to be added behind the code block. When the terminal decodes each channel-coded code block according to the above method and then checks the CRC, it can determine whether the channel coding succeeds by performing the XOR operation on various code block indexes.

The code block index may be masked on the CRC by allocating a code block index from 0 or 1 to the code blocks included in one transport block in order from the front. However, the code block index is determined by a separate sequence, and the code block index may be assigned according to the sequence. That is, the code block index like 0, 1, 2, 3, 4, ... from the first code block can be allocated, but can be determined according to arbitrary sequence like 0, 7, 9, 11, 16, 18, 41, 57, . . . . The arbitrary sequence may be promised between the base station and the terminal, and may be set according to the type of sequences from the base station. In addition, it may also be possible to perform masking in the predetermined number of bits from the front or back of the CRC without being masked on the whole CRC.

Figure 1K:
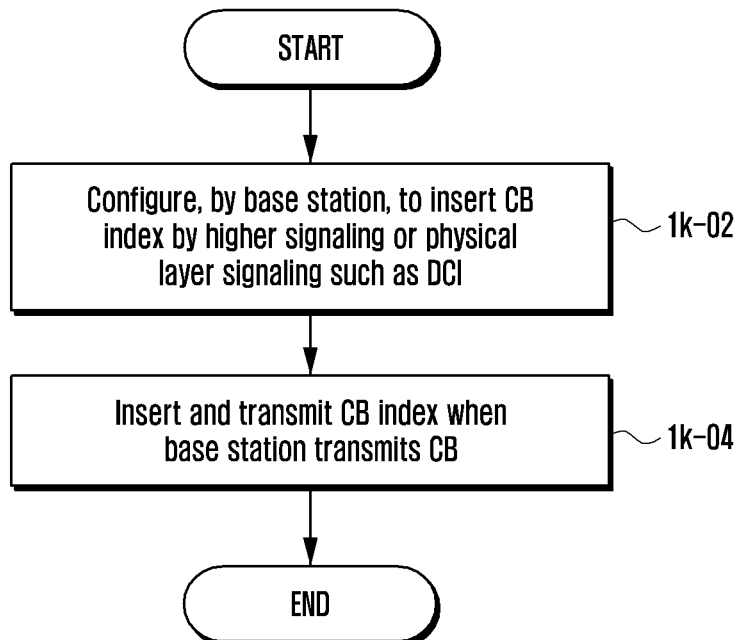
FIG. 1K illustrates a diagram of a procedure of a base station and a terminal according to embodiments of the present disclosure.
Figure 1L:
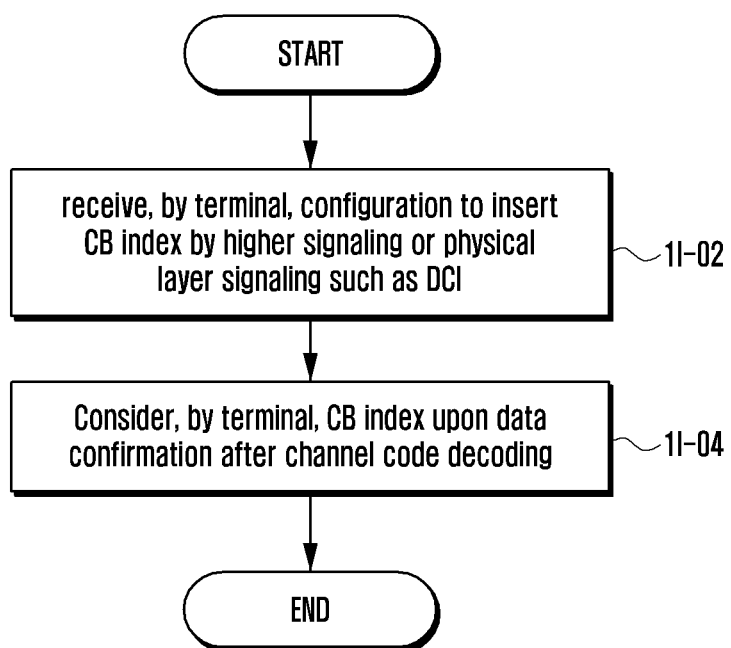
FIG. 1L illustrates a diagram of a procedure of a base station and a terminal according to embodiments of the present disclosure.

FIGS. 1K and 1L illustrate flow charts illustrating a procedure of a base station and a terminal for a method for determining whether to insert a code block index according to higher signaling or a DCI specific bit and transmitting the code block index. In FIG. 1K, the base station transmits (1k-02) to the terminal whether the code block index is inserted by using higher signaling or bits of a DCI specific location. In FIG. 1L, the terminal confirms (1l-02) the higher signaling or the bits of the DCI specific location and confirms whether the code block index is inserted. Thereafter, in FIG. 1K, the base station inserts a code block index at the time of transmitting data to perform channel coding and transmission (1k-04). In FIG. 1L, the terminal performs the channel coding and considers the code block index inserted when confirming data to confirm (1l-04) the sequence of the code block or the location of the data.

Figure 1M:
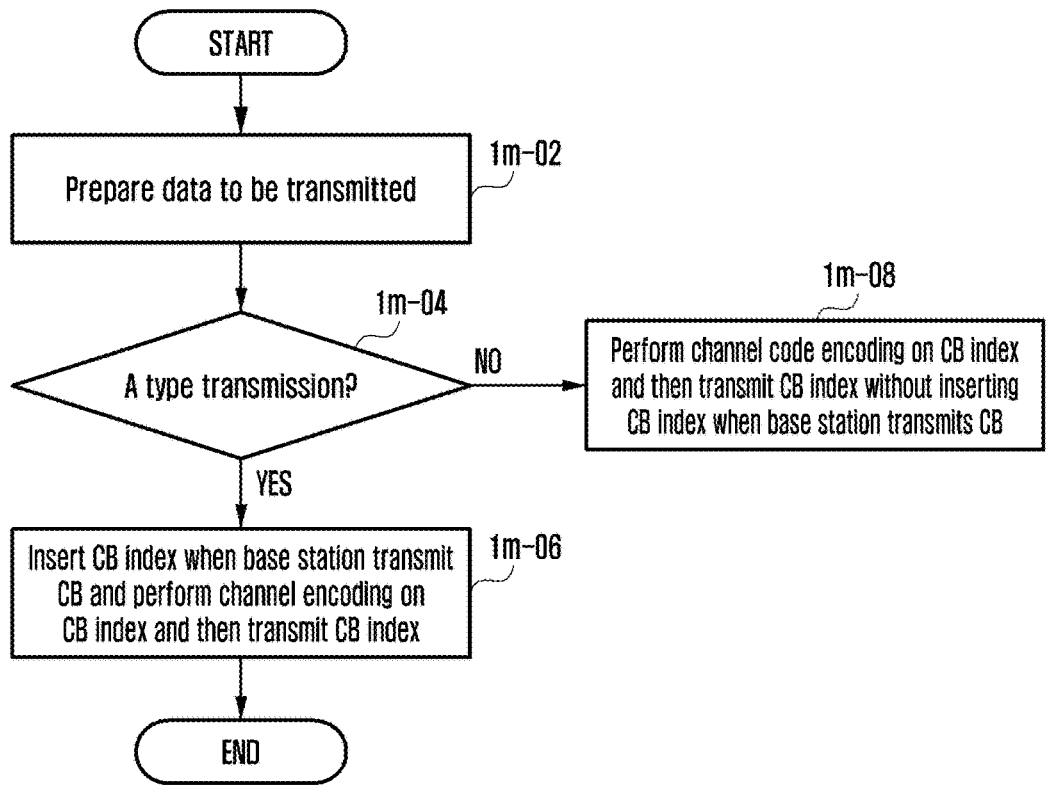
FIG. 1M illustrates a diagram of the procedure of the base station and the terminal according to embodiments of the present disclosure.
Figure 1N:
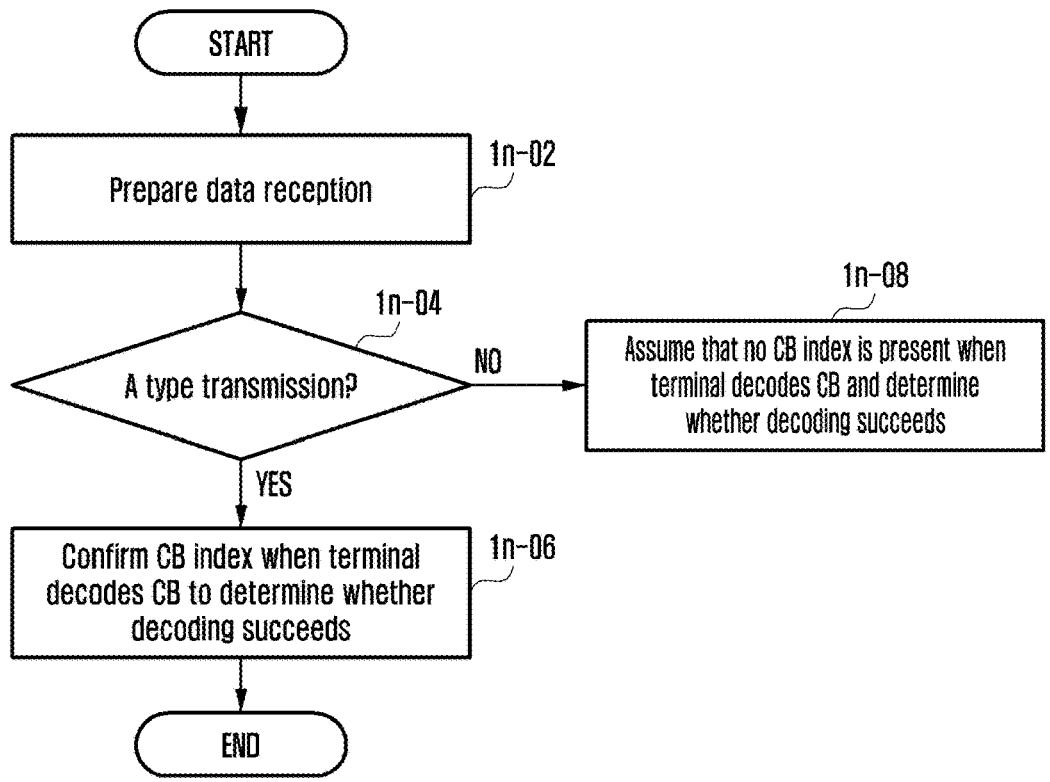
FIG. 1N illustrates a diagram of the procedure of the base station and the terminal according to embodiments of the present disclosure.
Figure 10:
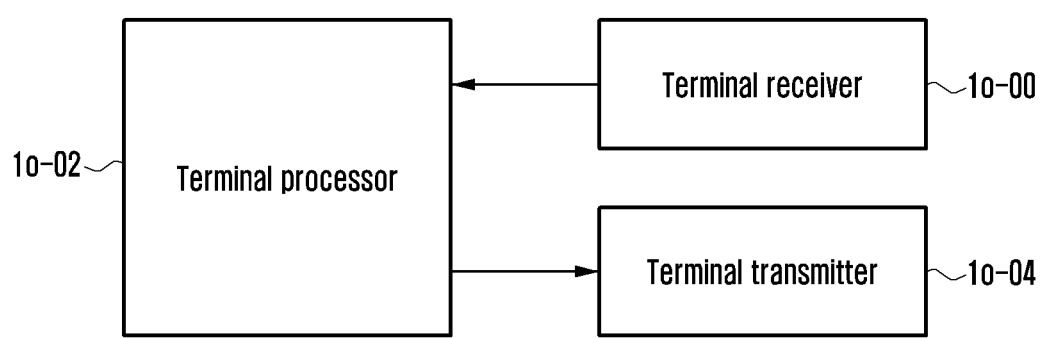

FIGS. 1M and 1N illustrates diagrams of a procedure of a base station and a terminal in a method for determining whether a code block index is inserted and transmitting/receiving data. In the present disclosure, a method for inserting and transmitting a code block may be referred to as A type transmission. The name A type transmission is a term arbitrarily selected for convenience of explanation, and may be defined or called as any other name. The case in which the A type transmission is performed may correspond to at least one of the case in which an initial transmission in which data are transmitted first, the case in which a specific transmission mode is configured by the higher signaling, the case in which the TBS has a specific value or more, the case of the first type transmission, the second type transmission, or the third type transmission, and the case in which the transmission is performed at a specific TTI length.

The initial transmission in which the data are transmitted first is not an initial transmission when the transport blocks are transmitted but may mean the initial transmission that has not been transmitted from the base station in an RE unit or a code block unit even if the transport block is transmitted in previous TTIs. In other words, the initial transmission in which data are transmitted first may mean transmission in an RE unit or a code block unit that has not yet been transmitted among the transport blocks. On the other hand, in the initial transmission in which the data are transmitted first, the code block index is not inserted and the code block index may be inserted when the base station performs the retransmission on the initial transmission before the terminal transmits the HARQ-ACK information on the initial transmission. In this case, in the process of performing the retransmission from the base station after a predetermined time after the terminal transmits the HARQ-ACK information, the code block index is not inserted and the data may be transmitted.

In FIG. 1M, the base station prepares (1m-02) data to be transmitted and determines (1m-04) whether the transmission is the A type transmission in order to determine whether to insert a code block. In the case of the A type transmission, the code block index information is inserted to perform channel code encoding and is transmitted (1m-06), and in the case in which the transmission is not the A type transmission, the code block index information is transmitted (1m-08) by performing the channel code encoding on the code block without being inserted. In FIG. 1N, the terminal confirms (1n-04) whether the transmission is the A type transmission when preparing to receive data (1n-02). If it is the A type transmission, it is determined (1n-08) whether the decoding succeeds by considering the code block index at the time of the channel code decoding of the code block, and if it is not the A type transmission, it is determined (1n-06) whether the decoding succeeds under the assumption that there is no code block index at the time of the channel code decoding of the code block. The initial transmission and the retransmission in the present disclosure may indicate an initial transmission and a retransmission in the HARQ operation.

Although the present disclosure has been described with reference to an example in which the A type is transmitted, the case in which the A type transmission is performed according to various base station and terminal conditions and settings is changed and thus the present disclosure can be applied.

At least one of the methods proposed in FIGS. 1H, 1I, 1J, 1K, 1L, 1M, 1N may be used in combination. Further, the channel code encoding is performed after the code block index information is inserted and the transmission is performed but is not limited thereto. Therefore, some embodiments may be modified so that the code block index information is inserted after the channel code encoding. Meanwhile, the base station transmits data and the terminal receives data. However, the embodiments may not be necessarily limited thereto. Some embodiments can be applied to the case in which the terminal transmits data and the base station receives data in a portion into which the code block index information is inserted in the uplink data transmission.

A method for decoding, by a receiving end, a TB to feedback whether reception succeeds and performing a retransmission of a code block whose decoding fails will be described. That is, a process of performing a retransmission in a code block unit will be described. The receiving end may be a terminal in a downlink, and may be a base station in an uplink The code block index information may be the method proposed in FIGS. 1H, 1I, and 1J, but the embodiments may not be limited thereto. Therefore, the code block may be the information notifying the location in the TB. For example, the code block index information may be optionally confirmed according to a code block order included in one TB. That is, if 10 code blocks are transmitted to one TB when the initial transmission is performed without including the code block index, even if the code block index is not explicitly included, the code block indexes starting from code block 0 or code block 1 located at the front may be sequentially assigned in an ascending order.

As described above, in the present disclosure, a method for inserting and transmitting a code block index may be referred to as A type transmission. The case in which the A type transmission is performed may correspond to at least one of the case in which an initial transmission in which data are transmitted first, the case in which the higher signaling is established to be a specific transmission mode, the case in which the TBS has a specific value or more, the case of the first type transmission, the second type transmission, or the third type transmission, and the case in which the transmission is performed at a specific TTI length.

The receiving end may perform the channel code decoding on the code blocks in the TB and feed back the code blocks whose decoding fails to the transmitting end. For example, when there are 10 code blocks in one transmitted TB, a code block whose transmission has succeeded is mapped to 1 and a code block whose transmission fails is mapped to 0, so that it is possible to transmit whether the channel code decoding of each code block succeeds e of each code block with 10-bit information. In other words, the success or failure of decoding may include the number of bit maps corresponding to the number of code blocks and fed back to the transmitting end. In the above example, if the decoding of the second and fifth code blocks out of 10 code blocks fails and the decoding of the remaining code blocks succeeds, decoding the receiving end can feed back a value of 1011011111 to the transmitting end. The feedback may be transmitted to the base station in the uplink control channel or the data channel.

According to some embodiments, the receiving end can transmit a decoding success or failure to each code block group by establishing a code block group including M code blocks. The number M of code blocks included in the code block group may be determined by performing the higher signaling from the base station to the terminal or transmitting the information of the M value as the DCI or may be automatically determined according to the number of code blocks included in the TBS or the TB or the system frequency band. For example, the transmitting end and/or the receiving end may determine the number M of code blocks included in the code block group according to the TBS value of the scheduled data as illustrated in Table 1a-02 below.

TABLE 1a-02

| TBS value | M |
| --- | --- |
| TBS < 61,440 | 1 |
| 61,440 < TBS < 122,880 | 2 |
| 122,880 < TBS < 184,320 | 3 |
| 184,320 < TBS < 245,760 | 4 |

In the above table, the case in which the TBS value is smaller than 245,760 is described, it is not limited thereto.

As another example, the number M of code blocks included in the code block group may be determined according to the system frequency band. Let the unit of frequency resource be a resource block. The resource block corresponds to 180 kilohertz (kHz) in the LTE system and corresponds to 12 subcarriers, but can be set differently in the NR or 5G system. For example, one resource block may be a frequency band corresponding to 375 kHz. The transmitting end and/or the receiving end may determine the number M value of code blocks included in the code block group according to the total number of resource blocks in the system frequency band as illustrated in Table 1a-03 below.

TABLE 1a-03

| Total number of resource blocks in system frequency band | M |
| --- | --- |
| <=10 | 1 |
| 11-26 | 2 |
| 27-63 | 3 |
| 64-110 | 4 |

Meanwhile, in the above example, in confirming the code block index of the code block whose decoding fails, in the case of the A type transmission, the receiving end can confirm the code block index information included in the code block, and in the case in which the transmission is not the A type transmission, the receiving end can arbitrarily confirm the code block index information according to the code block order included in one TB. For example, if 10 code blocks are transmitted to one TB when the initial transmission is performed without including the code block index, the code block index is not included, but the code block indexes starting from code block 0 or code block 1 located at the front may be assigned.

In the transmitting end, if a certain number of code blocks fail to be transmitted after the initial transmission of one TB, the transmission may be performed on the failing code block when the retransmission is performed. The transmitting end can transmit the code block index information when transmitting the code block in the retransmission. Therefore, when receiving data corresponding to the retransmission, the receiving end may determine that the transmission is the A type transmission, and confirm the code block index information and then decode the corresponding code block in combination with the initial transmission.

According to some embodiments, in the process of retransmitting code blocks which the transmitting end and the receiving end fail to transmit, the retransmission can be performed in units of code block groups. That is, if the number M of code blocks included in the code block group is determined as described above, the receiving end feeds back the success or failure of reception to each of the code block groups to the transmitting end, and the transmitting end can perform the retransmission in units of code block groups. As compared to the case in which the process of performing feedback and retransmission is performed in the units of code blocks, the number of bits used for the feedback and the retransmission can be more saved. That is, the number of bits used for feedback per TB can be determined according to the number M of code blocks included in the code block group. If it is determined that a retransmission of a specific code block group is used according to the feedback (for example, by transmitting a bitmap) from the receiving end, the corresponding code block group instructed via feedback can be retransmitted to the transmitting end.

Although some embodiments describe a method for feeding back, by a receiving end, whether or not the transmission of the code block fails and a method for retransmitting, by a transmitting end, partial code blocks (or code block groups), they will not always be used in combination and may be used separately.

The initial transmission and the retransmission in the present disclosure may indicate an initial transmission and a retransmission in the HARQ operation.

A method for retransmitting a part of data initially transmitted at the time of retransmission after an initial transmission if a base station performs a downlink transmission to a terminal will be described.

Figure 1P:
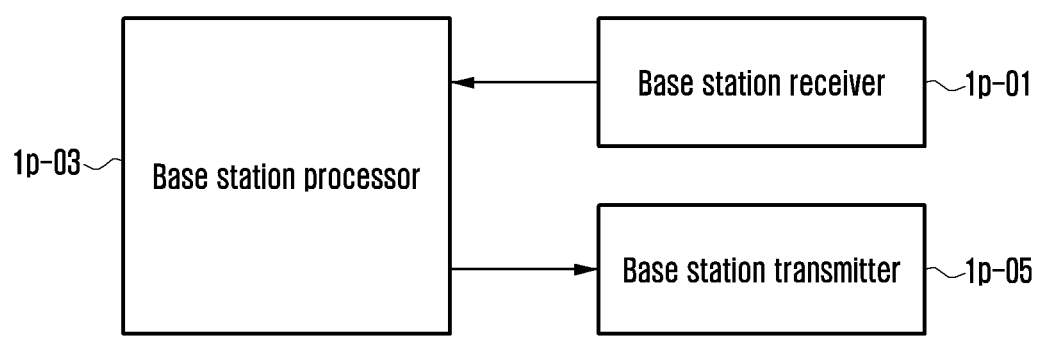
FIG. 1P illustrates a diagram of an internal structure of a base station according to embodiments of the present disclosure.
Figure 1Q:
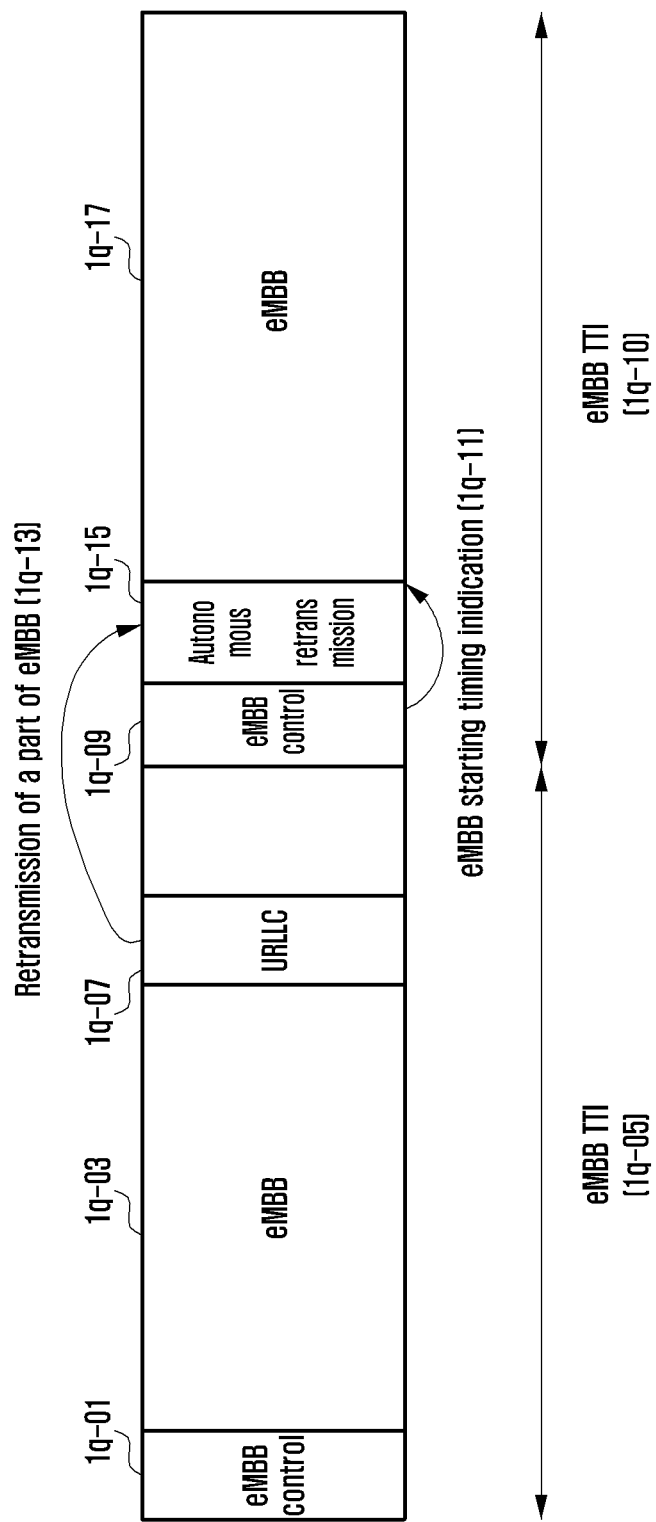
FIG. 1Q illustrates a diagram of an example of a transport structure according to embodiments of the present disclosure.

FIG. 1Q illustrates a process of scheduling, by a base station, eMBB data $1q$-$03$ for the terminal a using a control signal $1q$-$01$, transmitting a part of a resource $1q$-$07$ to be mapped to the eMBB data to the same terminal a or another data $1q$-$07$ to a terminal b when the eMBB data $1q$-$03$ are transmitted, and then retransmitting some $1q$-$15$ of the eMBB data, which have been transmitted to the terminal a, to a next TTI $1q$-$10$. The eMBB control signal $1q$-$01$ transmits the scheduling information on the eMBB data $1q$-$03$ to the terminal a, and the base station transmits ($1q$-$07$) the URLLC control signal and data to the terminal b by generating the URLLC data during the transmission of the eMBB data $1q$-$03$. The URLLC control signal and data are transmitted by mapping the URLLC control signal and data $1q$-$07$ without mapping (or while puncturing) a part of the existing scheduled eMBB data $1q$-$03$ to a resource. Therefore, a part of the eMBB is not transmitted to the terminal a in the existing TTI $1q$-$05$, and therefore the terminal a may fail to decode the eMBB data.

To compensate for this, the base station transmits ($1q$-$13$) a part of the eMBB data, which is not transmitted in the TTI $1q$-$05$, in the TTI $1q$-$10$. The partial transmission is performed in the TTI $1q$-$10$ after the initial transmission and can be performed without receiving (or before receiving) the HARQ-ACK information on the initial transmission from the terminal, and the partial transmission may receive scheduling information in a control signal area $1q$-$09$ of a next TTI. When the eMBB or other data $1q$-$17$ are transmitted to another terminal in the next TTI, the information on the symbol position where the resource mapping of the eMBB or other data $1q$-$17$ starts in the control signal area $1q$-$09$ of the next TTI can be included ($1q$-$11$). The information may be transmitted in some bits of the downlink control information (DCI) transmitted in the control signal area $1q$-$09$. eMBB or other data $1q$-$17$ performs the partial transmission $1q$-$15$ for the previous initial transmission in a specific symbol, using information on the symbol position where which resource mapping starts. The eMBB control signals $1q$-$01$ and $1q$-$09$ in FIG. 1Q can be transmitted in a part of the area, not in the entire displayed area. Further, the control signals $1q$-$01$ and $1q$-$09$ can be transmitted in a part of the frequency bands, not in the entire frequency band.

Although there is described an example in which the base station retransmits ($1q$-$15$) a part of the eMBB data in the next TTI due to the fact that a part of the eMBB is not transmitted for the transmission of the URLLC data $1q$-$07$, even if it is not because of the URLLC data transmission, the base station may optionally be used to retransmit a part of specific data. In addition, although the case in which the retransmission is performed from the first symbol after the control signal in the TTI ($1q$-$10$) after the initial transmission is described, the location of the retransmission can be variously changed and applied.

Also, the case of the downlink transmission has been described as an example, but can be easily modified and applied even to the case of the uplink transmission.

Meanwhile, when the retransmission is performed, it may be necessary to transmit to the terminal a where the retransmitted part corresponds to the information in the initial transmission transmitted to the terminal a. For example, information on how many code blocks are to be retransmitted before the retransmitted codes or what how many symbol parts are retransmitted before the retransmitted symbol parts needs to be transmitted to the terminal a. The information may be transmitted in a manner that a bitmap is used for the control signal $1q$-$09$ transmitting the scheduling information of the partial transmission or a starting or ending part is notified. Alternatively, a code block or a symbol index may be transmitted by being added to a part of the data $1q$-$15$ instead of the control signal $1q$-$09$, or it is possible to scramble a specific RNTI value to the CRC of the code block. Alternatively, in the present example, a method of transmitting to the terminal the information on where the retransmitted part corresponds to in the initial transmission transmitted to the terminal a may use a part of the other embodiments described herein.

Figure 1R:
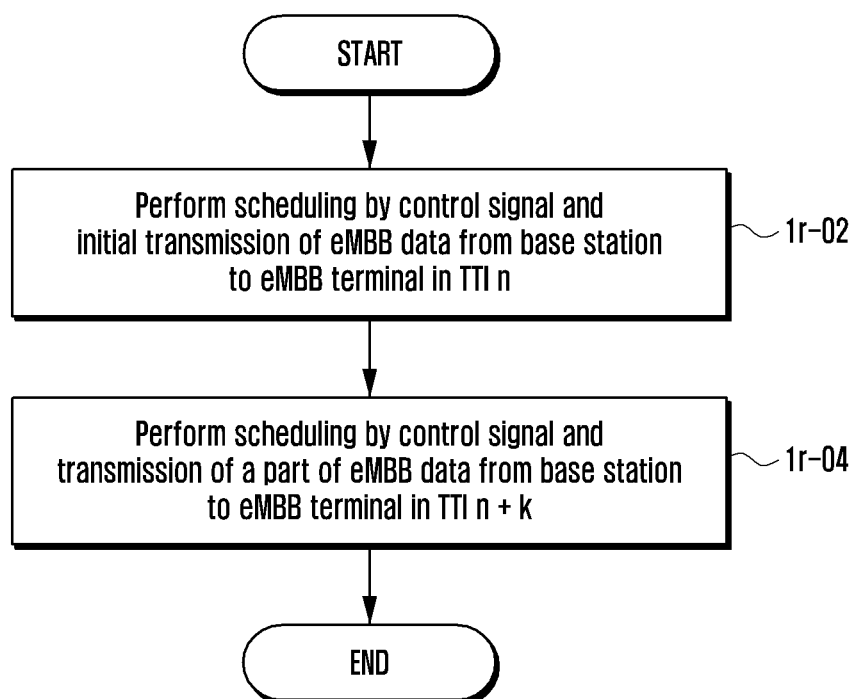
FIG. 1R illustrates a diagram of the procedure of the base station and the terminal according to embodiments of the present disclosure.

FIG. 1R illustrates a flow chart in a case in which when the base station performs the eMBB transmission to the terminal, the initial transmission is performed in the TTI n and the case in which a part or the entire retransmission is performed ($1r$-$04$) in TTI+k which is the next TTI. In the above, k may be set by the base station or fixed to 1. A method for transmitting to a terminal a information on which part of the initial transmission transmitted to terminal a in step $1r$-$02$ the part where the partial retransmission or the partial initial transmission is performed in step $1r$-$04$ corresponds to or transmitting to the terminal a information on what number of code blocks or what number of OFDM symbol may use a part of other embodiments described herein.

Alternatively, in some bits of the DCI for scheduling transmitted in the control signal of the next TTI, the information on which part of the initial transmission transmitted to terminal a in step 1r-02 the part where the partial retransmission or the partial initial transmission is performed in step 1r-04 corresponds to or the information on what number of code blocks or what number of OFDM symbol may be transmitted to the terminal by the scheme of using the bitmap or transmitting the starting and ending point or the like. For example, if the eMBB data 1q-03 of the initial transmission includes 10 code blocks and a 1q-07 part is one code block and a seventh code block, a control signal 1q-09 upon the retransmission is notified by a bitmap like 0000001000 or bit information notifying a location of a code block starting with 0111 included in the DCI is transmitted, and the code blocks corresponding to the code block transmitted from the control information may be retransmitted in a 1q-15 part.

In order to perform the above-described embodiments of the present disclosure, a transmitter, a receiver, and a processor of the terminal and the base station are each illustrated in FIGS. 1O and 1P, respectively. In order to determine whether to insert the code block index information and perform the operation, the transmission/reception method of the base station and the terminal is illustrated, and in order to perform the operation, the receiver, the processor, and the transmitter of the base station and the terminal need to be operated according to some embodiments described herein.

FIG. 1O illustrates a block diagram detailing an internal structure of the terminal according to embodiments of the present disclosure. As illustrated in FIG. 1O, the terminal may include a terminal receiver 1o-00, a terminal transmitter 1o-04, and a terminal processor 1o-02. The terminal receiver 1o-00 and the terminal transmitter 1o-04 may collectively be referred to as a transceiver. The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 1o-02 and transmit the signal output from the terminal processor 1o-02 through the radio channel. The terminal processor 1o-02 may control a series process to operate the terminal as described herein. For example, when the terminal receiver 1o-00 receives the data signal from the base station, the terminal processor 1o-02 may perform the decoding according to whether to insert the code block index information and perform a control to interpret the code block index information. Thereafter, the terminal transmitter 1o-04 transmits/receives a signal according to whether to insert the code block index information.

FIG. 1P illustrates a block diagram of an internal structure of the base station according to some embodiments of the present disclosure. As illustrated in FIG. 1P, the base station of the present disclosure may include a base station receiver 1p-01, a base station transmitter 1p-05, and a base station processor 1p-03. The terminal receiver 1p-01 and the terminal transmitter 1p-05 are collectively referred to as a transceiver. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 1p-03 and transmit the signal output from the terminal processor 1p-03 through the radio channel. The base station processor 1p-03 may control a series process to operate the base station as described herein. For example, the base station processor 1p-03 may determine whether to insert code block index information and perform a control to generate the code block index information to be transmitted to the terminal. Thereafter, the base station transmitter 1p-05 inserts and transmits a code block index, and the base station receiver 1p-01 confirms the code block index or receives the successfully transmitted code block index feedback information.

Also, the base station processor 1p-03 may perform a control to generate the downlink control information (DCI) or the higher signaling signal including the code block index information. In this case, the DCI or the higher signaling may indicate whether code block index information is included in the scheduled signal.

The embodiments of the present disclosure disclosed in the present specification and the accompanying drawings have been provided as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, embodiments described herein may be combined and operated as needed. For example, the base station and the terminal may be operated by combining the parts of the embodiments of the present disclosure. In addition, although the embodiments are presented on the basis of the LTE system, other modifications based on the technical idea of the embodiment may be applicable to other systems such as the 5G or NR system Hereinafter, the present disclosure will be described in detail with reference to the accompanying drawings. When it is decided that a detailed description for the known function or configuration related to the present disclosure may obscure the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification. Hereinafter, a base station is the subject performing resource allocation of a terminal and may be at least one of eNodeB, Node B, a base station (BS), a wireless access unit, a base station controller, and a node on a network. The terminal may include user equipment (UE), a mobile station (MS), a cellular phone, a smart phone, a computer, or a multimedia system performing a communication function. In the present disclosure, a downlink (DL) means a radio transmission path of a signal transmitted from a base station to a terminal and an uplink (UL) means a radio transmission path of a signal transmitted from the terminal to the base station. Further, the embodiments of the present disclosure may be applied even to other communication systems having the technical background or having the channel form similar to the embodiments of the present disclosure described herein. Further, embodiments of the present disclosure may be applied to other communication systems by partially being changed without greatly departing from the scope of the present disclosure under the decision of those skilled in the art.

In order to process explosively increasing mobile data traffic in recent years, a $5^{th}$ generation (5G) system or a new radio access technology (NR) which is a next generation telecommunication system since long term evolution (LTE) or evolved universal terrestrial radio access (E-UTRA) and LTE-advanced (LTE-A) or E-UTRA evolution has been actively discussed. The existing mobile communication system focuses on voice/data communication, while the 5G system aims to meet various services, such as an enhanced mobile broad band (eMBB) service for enhancement of the existing voice/data communication, an ultra reliable/ultra low latency communication (URLLC) service, and a machine type communication (massive MTC) service supporting mass communication of things, and requirements.

A system transmission bandwidth per single carrier of the existing LTE and LTE-A is limited to a maximum of 20 MHz, while the 5G system aims at providing super-high speed data services of several Gbps using an ultra-wide bandwidth much wider than that. As a result, the 5G system has considered as a candidate frequency a very high frequency band from several GHz to 100 GHz, which is relatively easy to secure an ultra-wideband frequency. In addition, a method for securing a wideband frequency for the 5G system is also considered by frequency reallocation or allocation in a frequency band of several hundreds of MHz to several GHz used in the existing mobile communication system.

A radio wave in the very high frequency band is a wavelength of about several mm and therefore is sometimes referred to as a millimeter wave (mmWave). However, in the very high frequency band, a pathloss of the radio wave is increased in proportion to the frequency band, such that the coverage of the mobile communication system becomes small.

In order to overcome the disadvantage of the reduction in the coverage of the very high frequency band, a beamforming technique for concentrating radiation energy of a radio wave onto a predetermined destination by using a plurality of antennas to increase an arrival distance of the radio wave is becoming more important. The beamforming technique may be applied to a transmitting end and a receiving end, respectively. The beamforming technique also reduces interference in areas other than the beam forming direction in addition to increasing the coverage. In order for the beam forming technique to operate properly, a method for accurately measuring and feeding back a transmission/reception beam is used.

As another requirement of the 5G system, there is an ultra-low latency service having a transmission delay of about 1 ms between the transmitting and receiving ends. By one method for reducing a transmission delay, a frame structure design based on short transmission time interval (TTI) compared to the LTE and the LTE-A is possible. The TTI is a basic unit for performing scheduling, and the TTI of the existing LTE and LTE-A systems is 1 ms corresponding to a length of one subframe. For example, the short TTI (for example, slot) to meet the requirements for the ultra-low latency service of the 5G system may be 0.5 ms, 0.2 ms, 0.1 ms, or the like that are shorter than the LTE and LTE-A systems. In the following description, unless otherwise stated, one TTI (or slot) and subframe are a basic unit of the scheduling and is interchangeably used with each other as a meaning representing a predetermined time interval.

Hereinafter, the frame structure of the LTE and LTE-A systems will be described with reference to the drawings, and the design direction of the 5G system will be described.

Figure 2A:
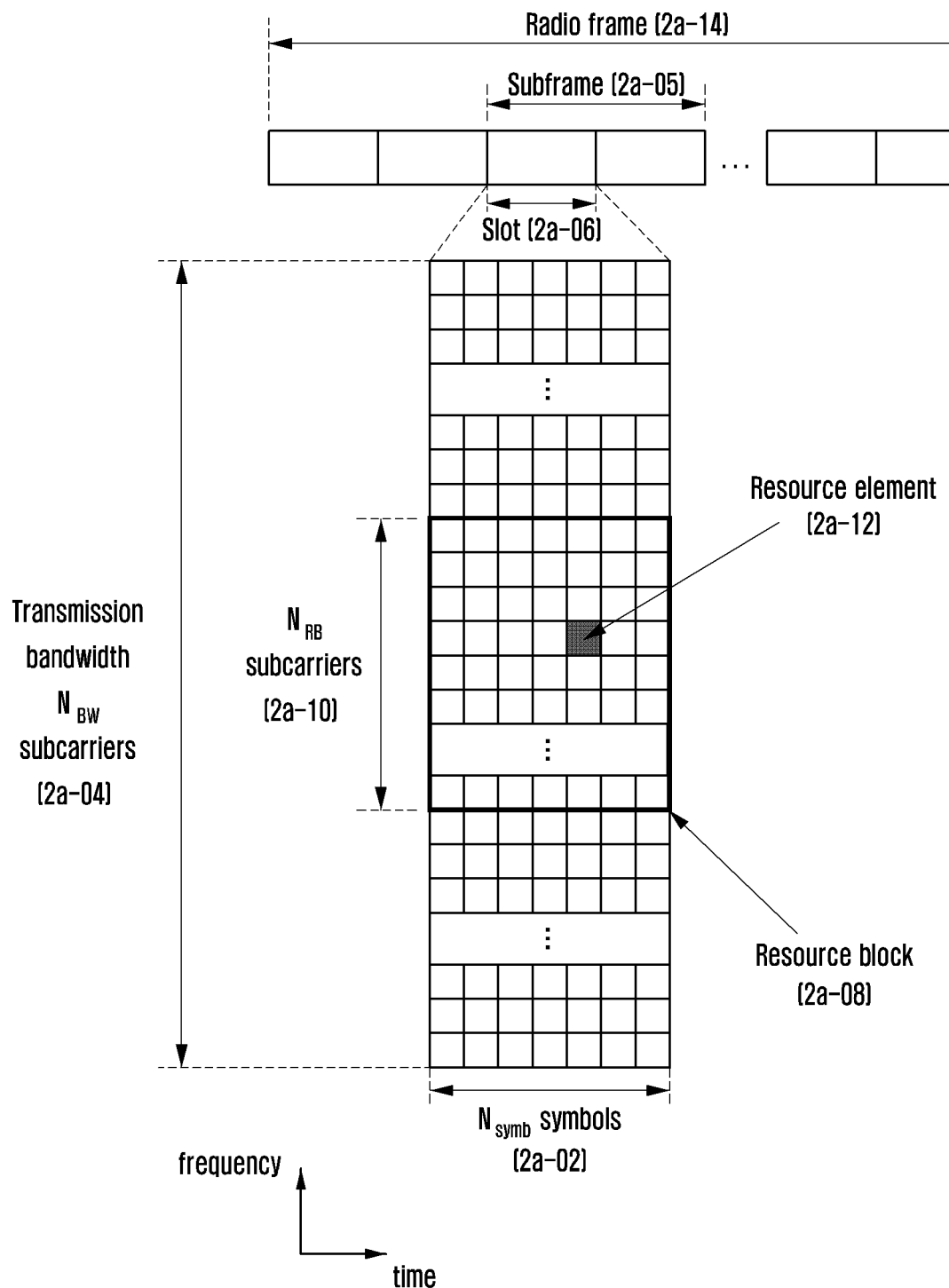
FIG. 2A illustrates a diagram of a basic structure of a time-frequency resource area that is a radio resource area to which a data or a control channel of the existing LTE and LTE-A systems is transmitted.

FIG. 2A illustrates a diagram of a basic structure of a time-frequency resource area that is a radio resource area to which a data or a control channel of the existing LTE and LTE-A systems is transmitted.

In FIG. 2A, a horizontal axis represents a time domain and a vertical axis represents a frequency domain. An uplink (UL) means a radio link through which a terminal transmits a data or a control signal to a base station and a downlink (DL) means a radio link through which the base station transmits the data or the control signal to the terminal. A minimum transmission unit in the time domain of the existing LTE and LTE-A systems is an orthogonal frequency division multiplexing (OFDM) symbol in the case of the downlink and a single carrier-frequency division multiplexing access (SC-FDMA) symbol in the case of the uplink, in which one slot 2a-06 is configured by collecting $N_{symb}$ symbols 2a-02 and one subframe 2a-05 is configured by collecting two slots. A length of the slot is 0.5 ms and a length of the subframe is 1.0 ms. Further, a radio frame 2a-14 is a time domain unit which includes 10 subframes. A minimum transmission unit in the frequency domain is a subcarrier in a unit of 15 kHz (subcarrier spacing is equal to 15 kHz), and the overall system transmission bandwidth includes a total of $N_{BW}$ subcarriers 2a-04.

A basic unit of the resource in the time-frequency domain is a resource element (RE) 2a-12 and may be represented by an OFDM symbol index or an SC-FDMA symbol index and a subcarrier index. A resource block (RB) (or a physical resource block (PRB)) 2a-08 is defined by the $N_{symb}$ continued OFDM symbols 2a-02 or the SC-FDMA symbols in the time domain and $N_{RB}$ continued subcarriers 2a-10 in the frequency domain. Therefore, one RB 2a-08 includes $N_{symb} \times N_{RB}$ REs 2a-12. In the LTE and LTE-A systems, a data is mapped in an RB unit, and the base station performs scheduling on a predetermined terminal in an RB-pair unit configuring one subframe. The number of SC-FDMA symbols or the number $N_{symb}$ of OFDM symbols is determined depending on a cyclic prefix (CP) length added to each symbol to prevent inter-symbol interference. For example, if a normal CP is applied, $N_{symb}=7$ and if a scalable CP is applied, $N_{symb}=6$. The scalable CP is applied to a system having a radio wave transmission distance relatively longer than the normal CP, thereby maintaining inter-symbol orthogonality.

The subcarrier spacing, the CP length, or the like are essential information on OFDM transmission and reception and need to be recognized as a common value by the base station and the terminal to smoothly transmit and receive a signal.

Further the $N_{BW}$ and $N_{RB}$ are also proportional to the system transmission bandwidth. A data rate is increased in proportion to the number of RBs scheduled in the terminal.

The frame structure of the LTE and LTE-A systems as described above is designed considering normal voice/data communications, and has limitations in scalability to meet various services and requirements like the 5G system. Therefore, in 5G system, it is necessary to flexibly define and operate frame structure considering various services and requirements.

Figure 2B:
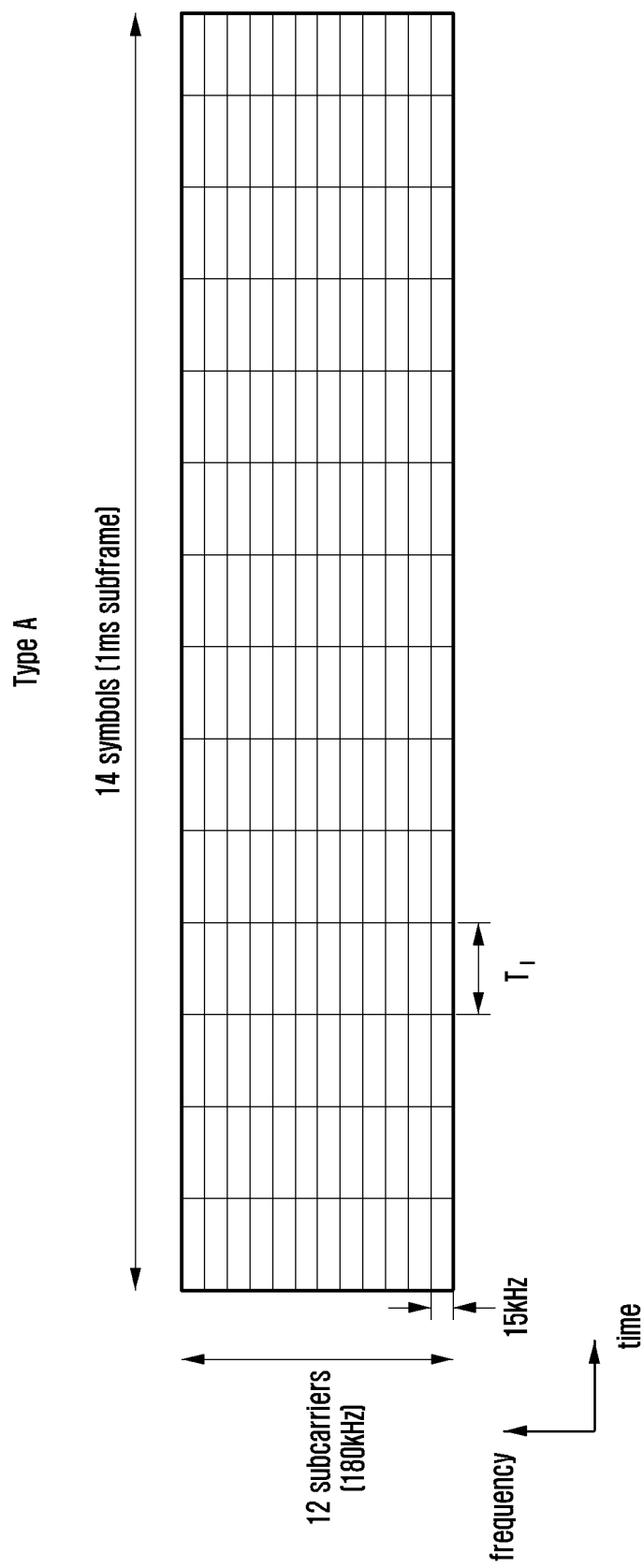
FIGS. 2B, 2C, and 2D illustrate an example of an extended frame structure.
Figure 2C:
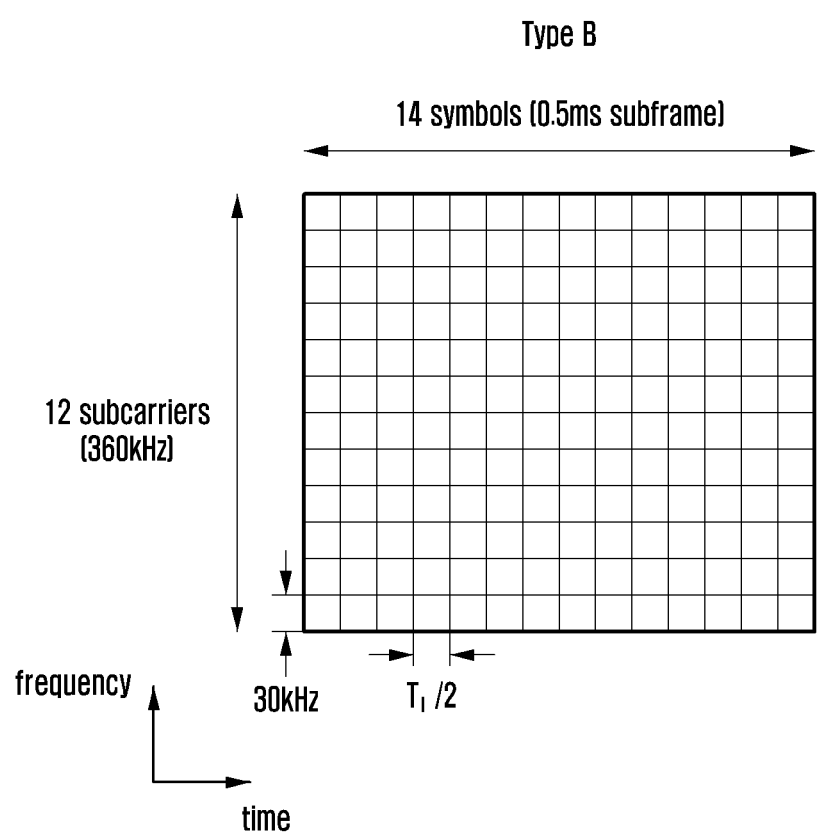
Figure 2D:
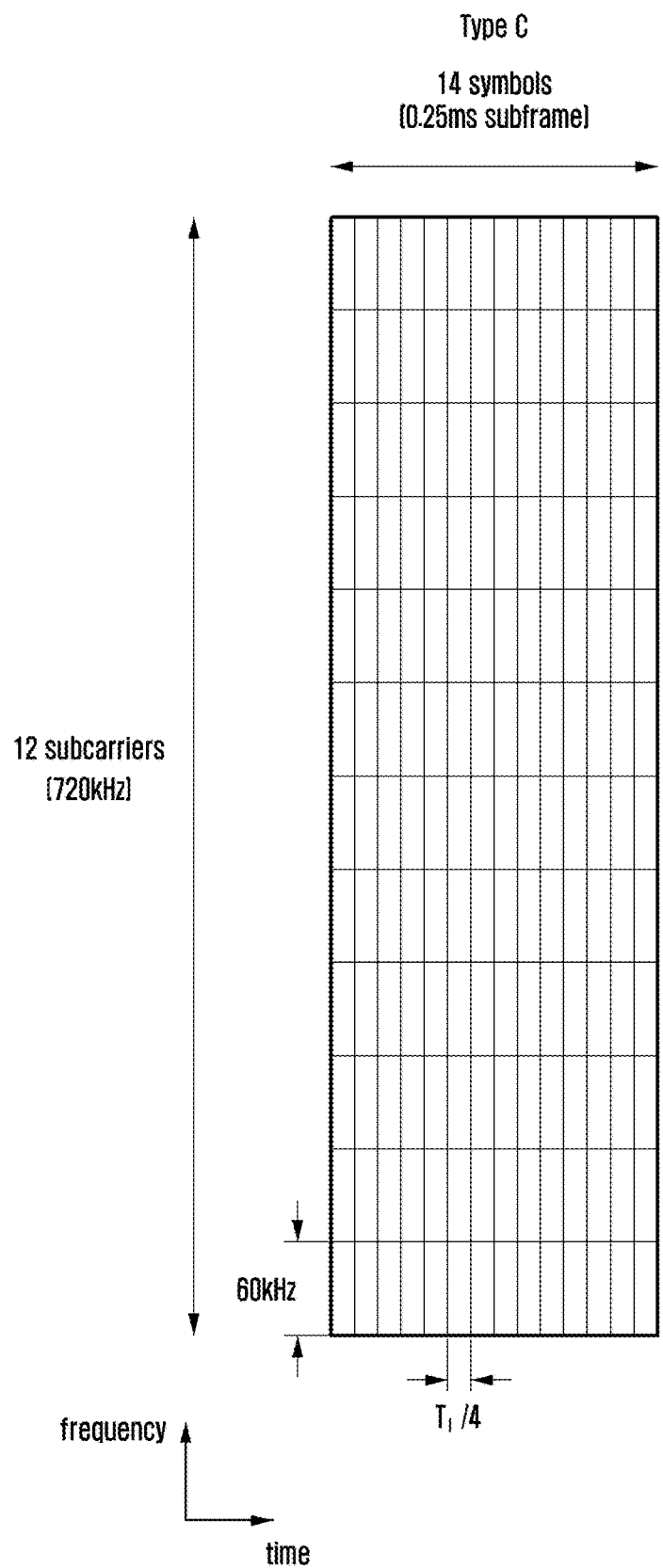

FIGS. 2B to 2D illustrate an example of an extended frame structure. In the example of FIGS. 2B to 2D illustrate the case where the essential parameter sets defining the scalable frame structure include the subcarrier spacing, the CP length, the subframe length, and the like.

In the early stage of the introduction of the 5G system, coexistence with the existing LTE/LTE-A systems or a dual mode operation is at least anticipated. By this, the existing LTE and LTE-A systems may serve to provide the stable system operation and the 5G system may serve to provide enhanced services. Therefore, the scalable frame structure of the 5G system at least needs to include the frame structure of the LTE and LTE-A or the essential parameter set. FIG. 2B illustrates a diagram of the 5G frame structure like the frame structure of the LTE and LTE-A or the essential parameter sets. Referring to FIG. 2B, in a frame structure type A, subcarrier spacing is 15 kHz, a subframe of 1 ms includes 14 symbols, and a PRB includes 12 subcarriers (=180 kHz=12×15 kHz).

Referring to FIG. 2C, in a frame structure type B, the subcarrier spacing is 30 kHz, a subframe of 0.5 ms includes 14 symbols, and a PRB includes 12 subcarriers (=360 kHz=12×30 kHz). That is, it may be seen that the subcarrier spacing and the PRB size are twice as large as those of the frame structure type A, and the subframe length and symbol length are twice as short as those of the frame structure type A.

Referring to FIG. 2D, in a frame structure type C, subcarrier spacing is 60 kHz, a subframe of 0.25 ms includes 14 symbols, and a PRB includes 12 subcarriers (=720 kHz=12×60 kHz). That is, it may be seen that the subcarrier spacing and the PRB size are four times as large as those of the frame structure type A, and the subframe length and symbol length are four times as short as those of the frame structure type A.

Figure 2E:
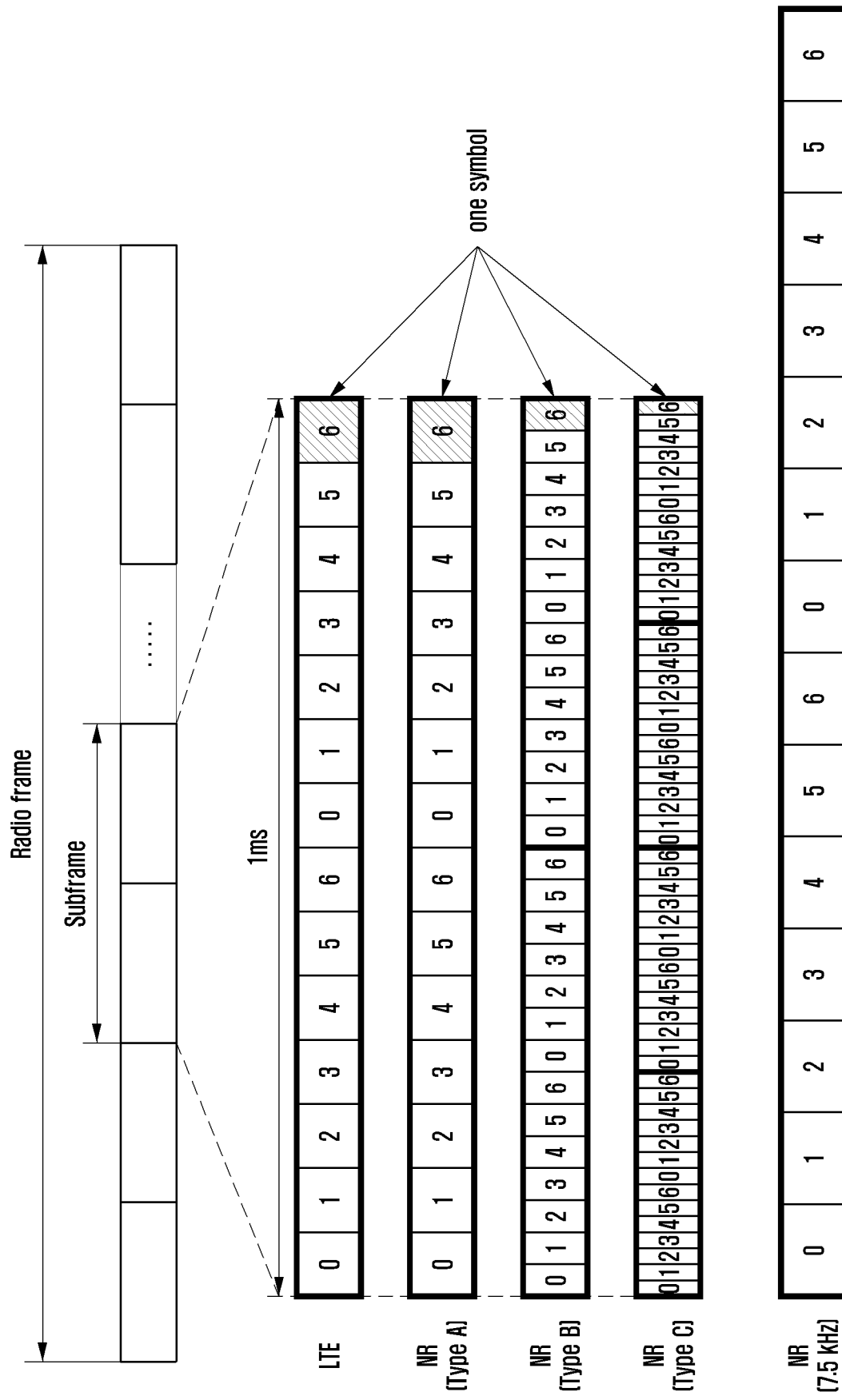
FIG. 2E illustrates a comparison diagram of frame structure types A, B, and C in a time domain together with an LTE frame structure.

That is, if the frame structure type is generalized, the subcarrier spacing, the CP length, and the subframe length that are the essential parameter sets have an integer number of multiple relationships with each other for each type, such that high scalability may be provided. FIG. 2E is a comparison diagram of frame structure types A, B, and C in a time domain together with an LTE frame structure.

The above-mentioned frame structure type may be applied corresponding to various scenarios. From the viewpoint of the cell size, it is possible to support a cell having a larger size as the CP length is increased, such that the frame structure type A may support cells relatively larger than the frame structure types B and C. From the viewpoint of the operating frequency band, as the subcarrier spacing is increased, it is more advantageous in restoring the phase noise in the high frequency band, such that the frame structure type C may support a relatively higher operating frequency than the frame structure types A and B. From the viewpoint of the services, to support the ultra-low delay service like the URLLC, it is advantageous to make the subframe length shorter, and therefore the frame structure type C is relatively more suitable for the URLLC service over the frame structure types A and B.

Figure 2F:
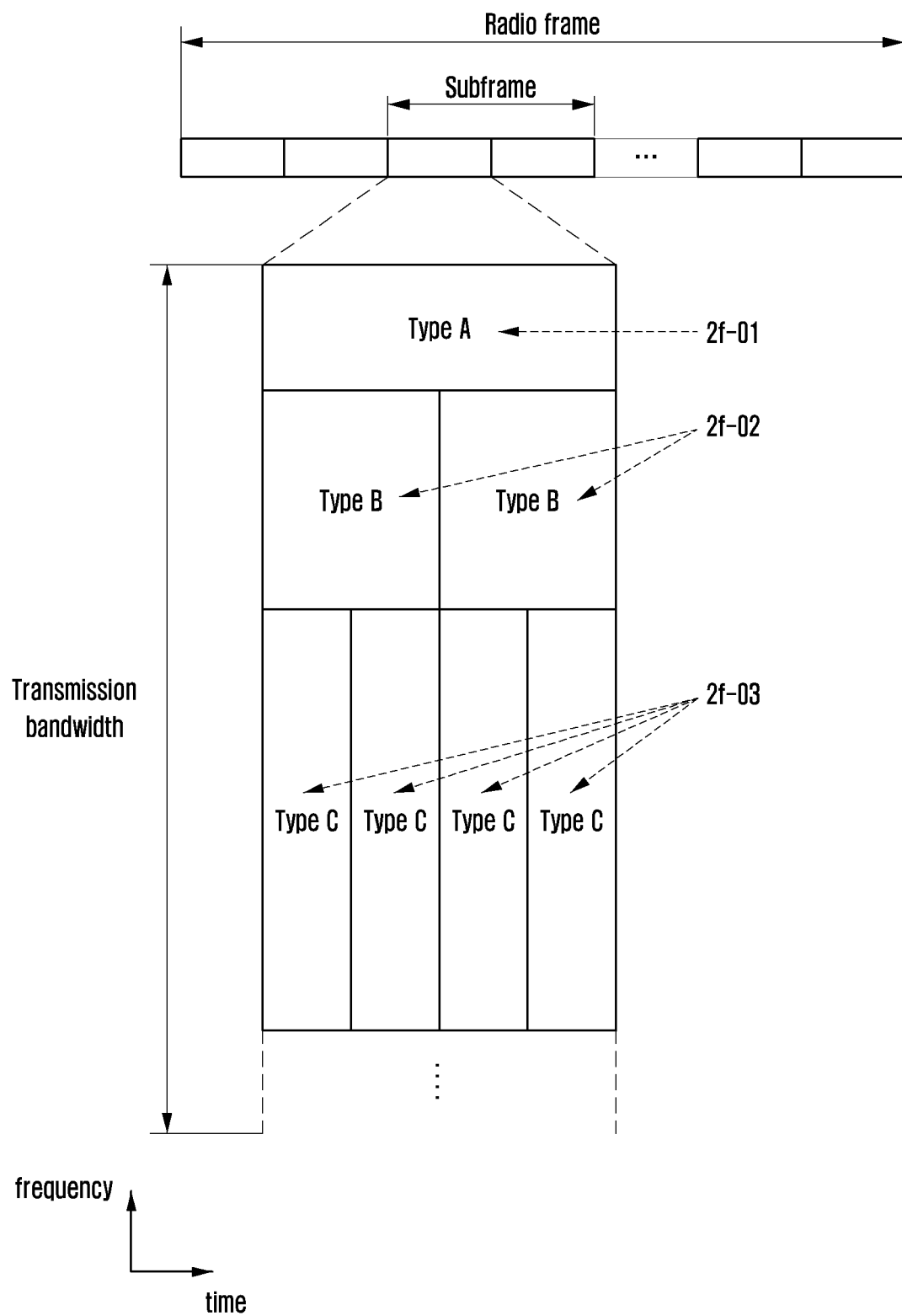
FIG. 2F illustrates a diagram of an example in which the frame structure types A, B, and C are multiplexed in one system.

In addition, a scenario for multiplexing the frame structure types in one system and integrally operating them may be considered. FIG. 2F illustrates an example in which the frame structure types A, B, and C are multiplexed in one system (FIGS. 2F-01, 2F-02, and 2F-03). That is, by maintaining an integer number of multiple relationships between the essential parameter sets defining the frame structure type, resource mapping in a subframe or in the PRB is smoothly performed even in the case of the multiplexing as illustrated in FIG. 2F.

In order to support the mobility of the terminal, the terminal needs to periodically measure the radio link quality for neighboring cells as well as cells (hereinafter referred to as serving cell) currently connected and transmitting/receiving signals. The terminal reports the measured radio link quality to the base station, and the base station determines whether to hand over the terminal to another cell with better radio link quality, referring to the radio link quality report of the terminal. The radio link quality measurement can be classified into intra-frequency measurement, inter-frequency measurement, and inter-radio access technology (RAT) measurement according to a measurement target.

1) The intra-frequency measurement method corresponds to the case where the frequency of the serving cell of the terminal and the frequency of the cell in which the radio link quality is to be measured are the same.

2) The intra-frequency measurement method corresponds to the case where the frequency of the serving cell of the terminal and the frequency of the cell in which the radio link quality is to be measured are different from each other.

3) The intra-RAT measurement method corresponds to the case where the radio access technology (RAT) of the serving cell of the terminal and the RAT of the cell in which the radio link quality is to be measured are different from each other. The RAT is a radio access technology and refers to communication schemes such as 4G and 5G.

In the case of the intra-frequency measurement, the terminal does not need an RF tuning operation of the additional terminal to measure the radio link quality of the cell to be measured. On the other hand, in the case of the inter-frequency measurement or the inter-RAT measurement, an operation of changing (RF tuning) the RF frequency of the terminal to the frequency of a cell to be measured or an operation of changing the RAT to a RAT of a cell to be measured is needed.

Figure 2G:
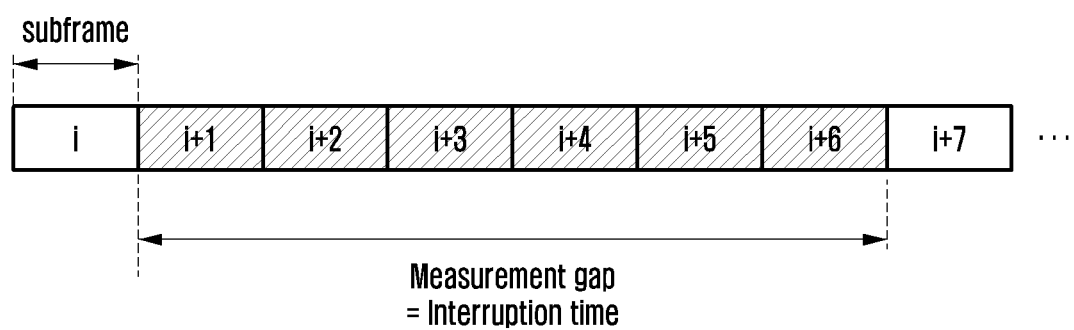
FIG. 2G illustrates a diagram of a measurement gap of the LTE system.

The measurement gap is a time interval used for the terminal to measure the radio link quality by changing the frequency or the RAT upon the inter-frequency measurement and the inter-RAT measurement. During the measurement gap, the terminal stops the uplink transmission operation and does not receive the downlink signal from the serving cell. That is, due to the measurement gap, a service interruption occurs between the terminal and the serving cell. FIG. 2G illustrates the measurement gap of the LTE system. FIG. 2G illustrates the length of the measurement gap indicates 6 subframes (=6 ms) from subframe (i+1) to subframe (i+6). Therefore, the service interruption time of the terminal continues from the subframe (i+1) to the subframe (i+6).

In the case of a terminal capable of transmitting and receiving one RF or one RAT signal at an arbitrary instant, inter-frequency/inter-RAT measurement is performed by changing RF or RAT during the measurement gap time interval. In addition, a measurement gap is used for interference control even if the terminal can simultaneously transmit and receive multiple RFs or multiple RAT signals at any moment. For example, if there is no measurement gap, the reliability of the radio link quality measurement may be degraded because the uplink signal transmitted from the terminal to the serving cell at any moment and signals of neighboring cells to be measured by the terminal are interfered with each other. The influence of the interference may vary according to the interval between the serving cell frequency and the frequency of the cell to be measured, and the RF implementation method of the terminal.

As described above, in the initial stage of the introduction of the 5G system in the future, the terminal expects the coexistence of the LTE-NR or the operation of LTE-NR dual mode through LTE-NR aggregation of at least existing LTE/LTE-A with the NR. By this, the existing LTE and LTE-A systems may serve to provide the stable system operation and the 5G system may serve to provide enhanced services. The present disclosure proposes a method for setting and applying a measurement gap for supporting mobility to LTE or NR systems for the terminal supporting LTE-NR aggregation. Basically, it is assumed that the LTE system and the NR system are independent of each other, and time synchronization between subframes or radio frames between the two systems or radio frames between the two systems does not match. A system whose time synchronization does not match is called an asynchronous system.

Figure 2H:
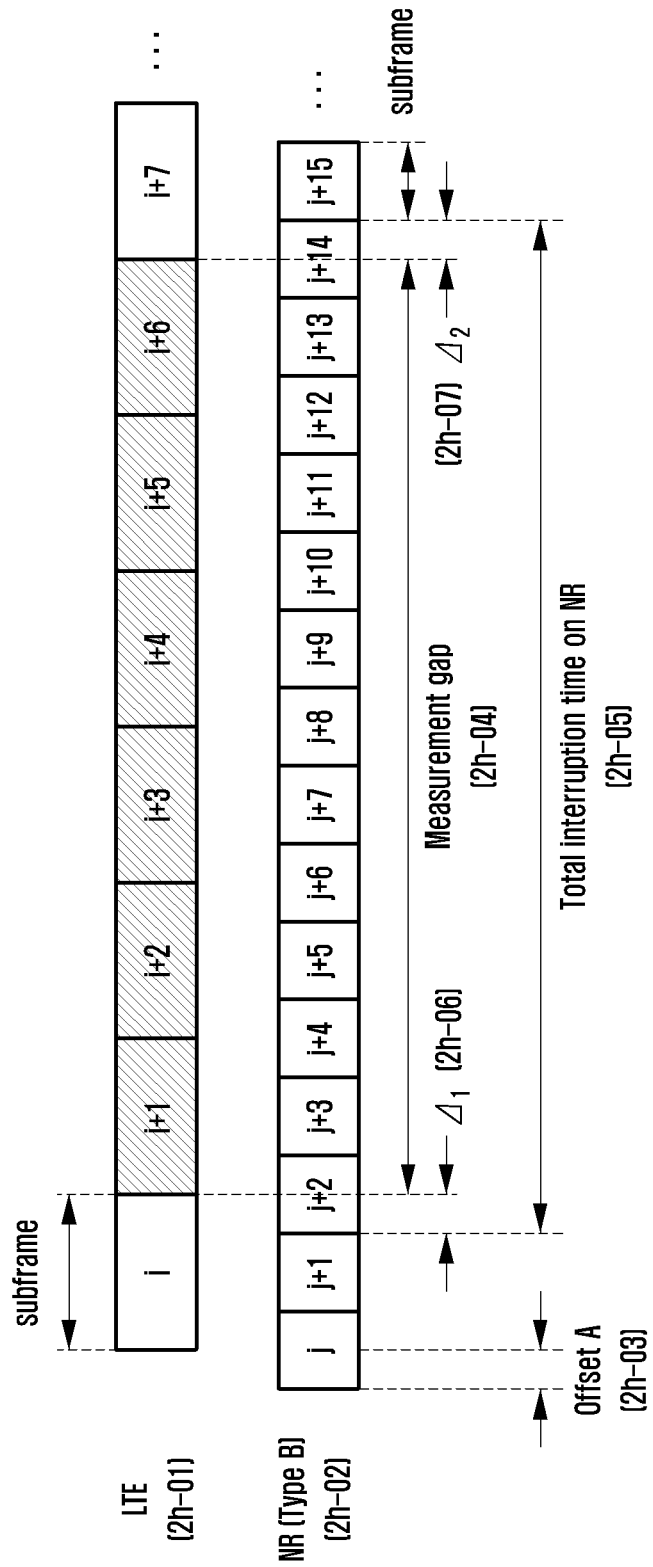
FIG. 2H illustrates a diagram of that a terminal supports a combination of the LTE and an NR as the frame structure type B, in which the LTE system and an NR system illustrate that time synchronization between subframes or radio frames mismatches by a specific offset.
Figure 2I:
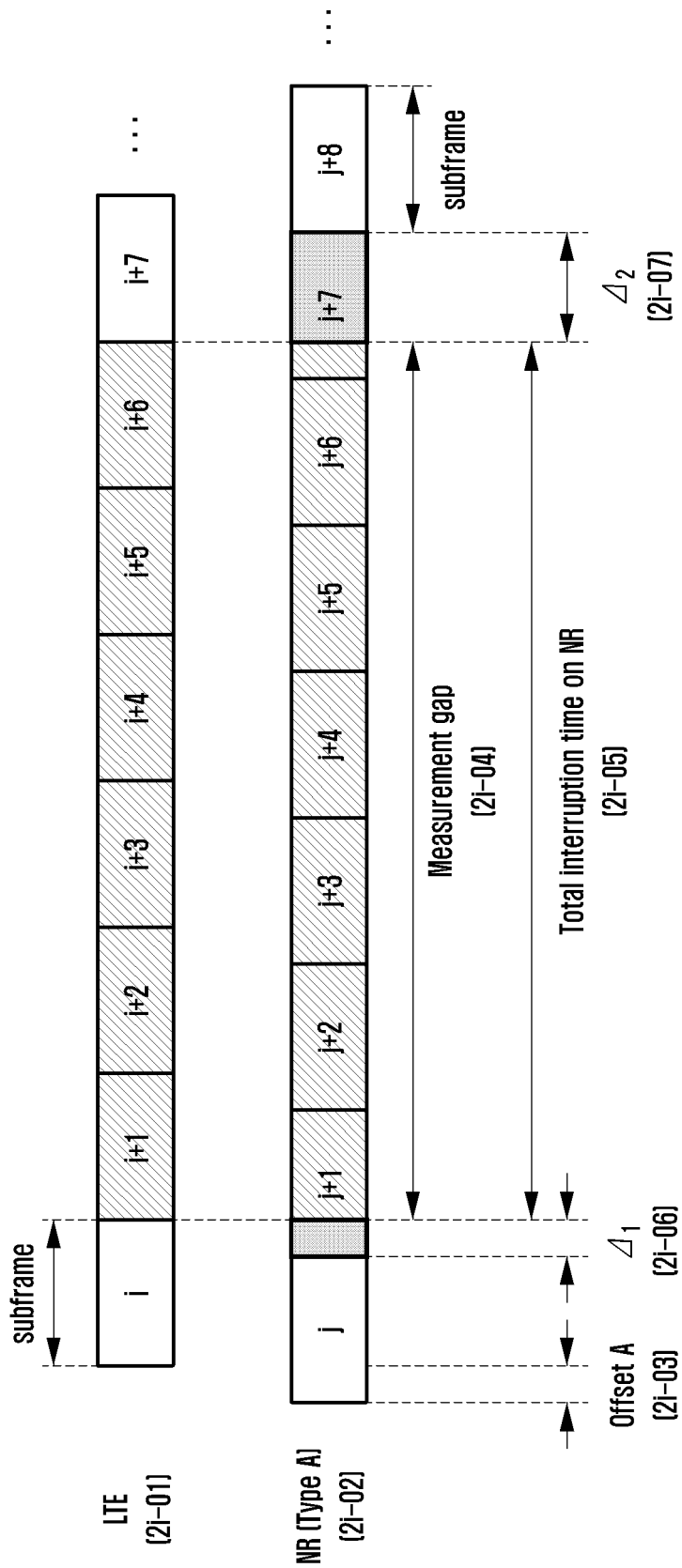
FIGS. 2I, 2J, and 2K each illustrate diagrams of Δ1 and Δ2 intervals for each frame structure type of the NR system.
Figure 2J:
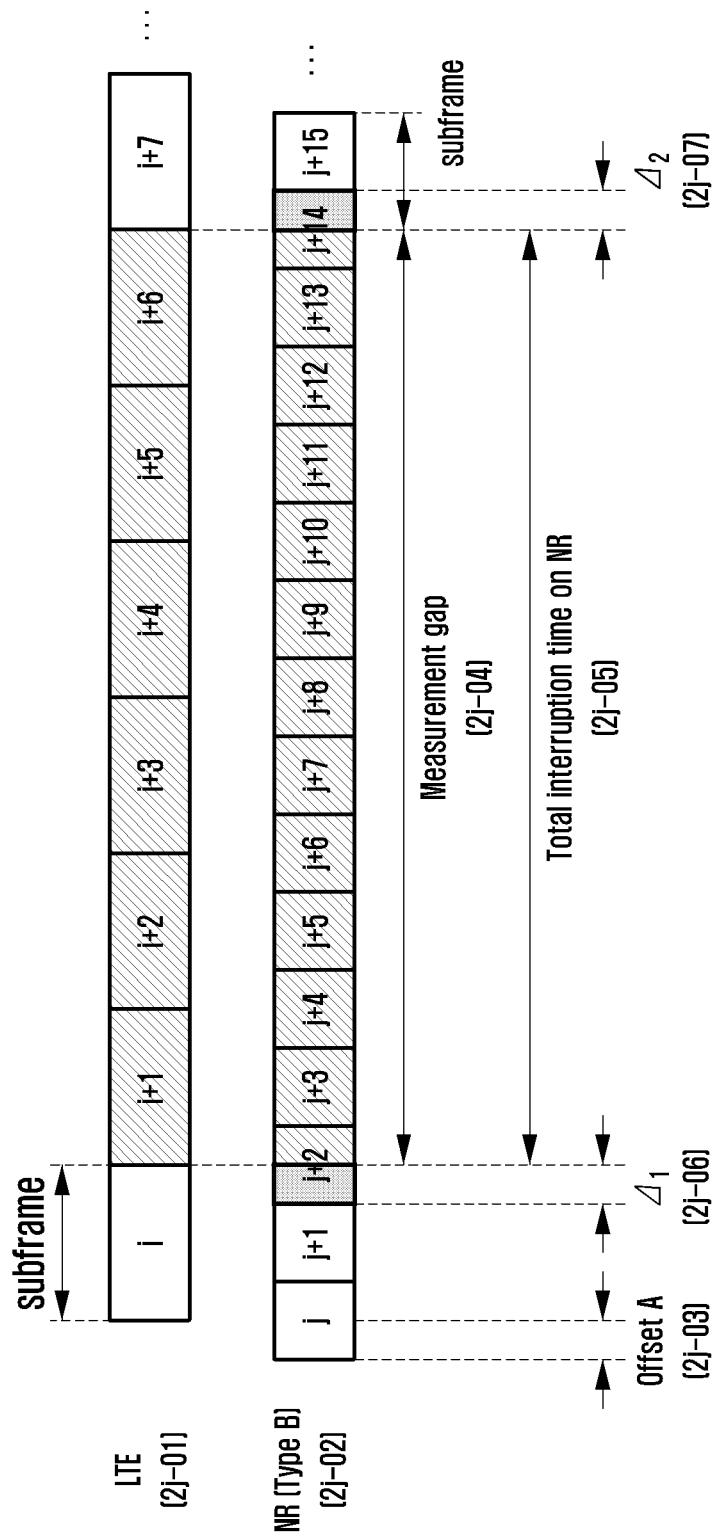
Figure 2K:
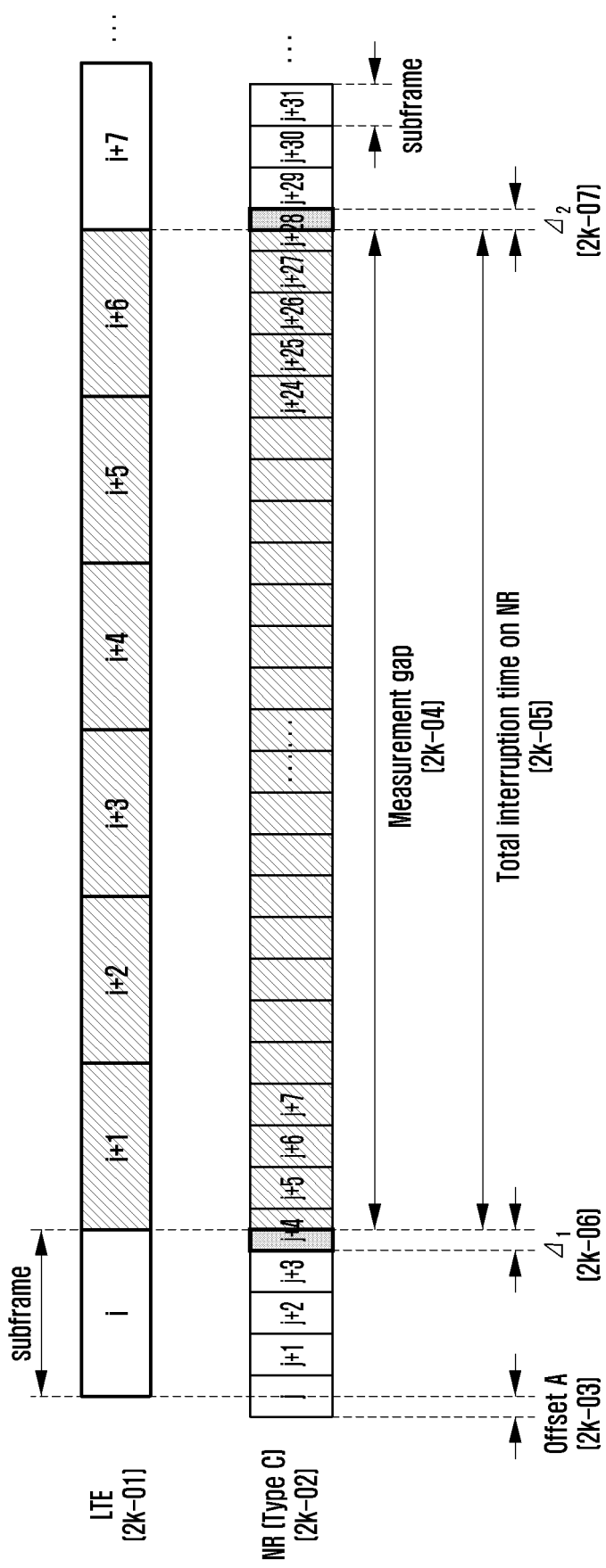

Referring to FIG. 2H, the terminal supports the aggregation of LTE 2h-01 and NR 2h-02 as the frame structure type B, and the LTE system and the NR system indicate that the time synchronization between subframes or radio frames does not match by "offset A" 2h-03. Further, the base station sets a measurement gap 2h-04 corresponding to LTE based 6 subframes in the terminal to indicate corresponding to LTE subframe i+1 to LTE subframe i+6. However, due to the above-mentioned "offset A", the measurement gap occurs in a state in which subframe boundaries do not coincide with the NR subframe. That is, the NR subframe affected by the measurement gap is from NR subframe (j+2) to NR subframe (j+14). Among those, a Δ1 interval 2h-06 which is a part of the NR subframe (j+2) and a Δ2 interval 2h-07 which is a part of the NR subframe (j+14) do not substantially overlap the measurement gap time period, but are inevitably included in the interruption time (=measurement gap+Δ1+Δ2) 2h-05 in terms of the NR system, resulting in inefficiency of radio resource utilization In order to solve the inefficiency of the radio resource utilization as described above, there may be a method for performing signal transmission/reception of a terminal by using Δ1 and Δ2 intervals when a part of the subframe overlaps with the measurement gap. FIGS. 2I, 2J, and 2K each are diagrams illustrating Δ1 and Δ2 intervals for each frame structure type of the NR system.

In FIG. 2I, the terminal supports the aggregation of LTE 2i-01 and NR 2i-02 as the frame structure type B, and the LTE system and the NR system indicate that the time synchronization between subframes or radio frames does not match by "offset A" 2i-03. Further, the base station sets a measurement gap 2i-04 corresponding to LTE based 6 subframes in the terminal to indicate corresponding to LTE subframe i+1 to LTE subframe i+6. Then, in terms of the NR subframe, the overlapping with the measurement gap from a part of an interval of the NR subframe (j+1) to a part of an interval of the NR subframe (j+7) is shown. At this time, the terminal may perform the transmission/reception operation to/from the NR system without the interruption in a Δ1 interval 2i-06 which is a part of the NR subframe (j+1) and a Δ2 interval 2i-07 which is a part of the NR subframe (j+7). Therefore, in terms of the NR system, interruption time 2i-05=measurement gap 2i-04.

FIG. 2J illustrates that the terminal supports the aggregation of LTE 2j-01 and NR 2j-02 as the frame structure type B, and the LTE system and the NR system indicate that the time synchronization between subframes or radio frames does not match by "offset A" 2j-03. Further, the base station sets a measurement gap 2j-04 corresponding to LTE based 6 subframes in the terminal to indicate corresponding to LTE subframe i+1 to LTE subframe i+6. Then, in terms of the NR subframe, the overlapping with the measurement gap from a part of an interval of the NR subframe (j+2) to a part of an interval of the NR subframe (j+4) is shown. At this time, the terminal may perform the transmission/reception operation to/from the NR system without the interruption in a Δ1 interval 2j-06 which is a part of the NR subframe (j+2) and a Δ2 interval 2j-07 which is a part of the NR subframe (j+14). Therefore, in terms of the NR system, interruption time 2j-05=measurement gap 2j-04.

FIG. 2K illustrates that the terminal supports the aggregation of LTE 2k-01 and NR 2k-02 as the frame structure type C, and the LTE system and the NR system indicate that the time synchronization between subframes or radio frames does not match by "offset A" 2k-03. Further, the base station sets a measurement gap 2k-04 corresponding to LTE based 6 subframes in the terminal to indicate corresponding to LTE subframe i+1 to LTE subframe i+6. Then, in terms of the NR subframe, the overlapping with the measurement gap from a part of an interval of the NR subframe (j+4) to a part of an interval of the NR subframe (j+28) is shown. At this time, the terminal may perform the transmission/reception operation to/from the NR system without the interruption in a Δ1 interval 2k-06 which is a part of the NR subframe (j+4) and a Δ2 interval 2k-07 which is a part of the NR subframe (j+28). Therefore, in terms of the NR system, interruption time 2k-05=measurement gap 2k-04.

For the sake of convenience of explanation, an interval of a subframe with which a starting part of the measurement gap partially overlaps is called a partial subframe 1, and a part of a subframe with which an ending part of the measurement gap partially overlaps with is called a partial subframe 2. Such a partial subframe may be defined as a subframe including 1 to N−1 symbols when the number of maximum symbols configuring one normal subframe is N (N is a positive integer). That is, the partial subframe may mean a subframe (or a subframe in which N symbols configuring a normal subframe cannot be used) in which at least one symbol overlaps with the measurement gap in one normal subframe.

The terminal receives (or transmits the uplink signal) the downlink signal in a Δ1 interval of the partial subframe 1 and transmits (or receives the downlink signal) the uplink signal in a Δ2 interval of the partial subframe 2, thereby minimizing waste of radio resources.

Whether the terminal transmits and receives a signal in the partial subframe is determined according to whether or not the following condition is satisfied when the "offset A" is compared with the symbol or subframe length of the NR system. As described above, the symbol length and the subframe length of the NR system is changed depending on the frame structure type of the NR system $0 \leq \text{"offset } A\text{"} \leq 0.5 \text{ symbol}$  Condition 1:

$0.5 \text{ symbol} < \text{"offset } A\text{"} \leq 0.5 \text{ subframe}$  Condition 2:

If the condition 1 is satisfied, the terminal determines that the LTE system and the NR system are time synchronized, and does not perform the transmission/reception operation in the partial subframe (hereinafter, which is referred to as a synchronous mode). If the condition 1 is not satisfied and the condition 2 is satisfied, the terminal determines that the LTE system and the NR system are not time-synchronized, and transmits/receives a signal in the partial subframe (hereinafter, which is referred to as a synchronous mode). As the modification of the conditions 1 and 2, the base station can set a predetermined threshold value 1 instead of 0.5 symbols in the condition 1 and notify the terminal of it through signaling, and can set a predetermined threshold value 2 instead of 0.5 subframes and notify the terminal of through signaling.

The "offset A" may be determined by the terminal or may be determined in the base station installation step, and the base station may notify the terminal of it through signaling.

If the terminal measures the "offset A", the terminal reports the measurement result to the base station and recognizes the same operation between the base station and the terminal.

As another method, the operation in the partial subframe may be determined according to UE capability and the base station setting. Since the asynchronous mode requires the terminal addition operation rather than the synchronous mode, the synchronous mode can be defined as the basic operation of the terminal, and the UE capability supporting the asynchronous mode can be additionally defined. Hereinafter, referring to FIG. 2L, the terminal reports the UE capability to the base station in step **2*l*-01. The UE capability includes information on whether the terminal supports the asynchronous mode. In step 2*l*-02, the terminal acquires configuration information on whether to operate in a synchronous mode or an asynchronous mode from the base station through base station signaling. In step 2*l*-03, the terminal compares the configuration information acquired in step 2*l*-02 with the UE capability, and determines the operation in the partial subframe according to the following determination method Determination method 1: (UE capability=not support asynchronous mode or support only synchronous mode) & (base station setting=asynchronous mode) →determine terminal as synchronous mode and report base station setting error to base station Determination method 2: (UE capability=not support asynchronous mode or support only synchronous mode) & (base station setting=synchronous mode) →determine terminal as synchronous mode Determination method 3: (UE capability=support asynchronous mode) & (base station setting=synchronous mode)→determine terminal as synchronous mode Determination method 4: (UE capability=support asynchronous mode) & (base station setting=asynchronous mode)→determine terminal as asynchronous mode Additionally, in step 2*l*-01, the terminal may report the information on whether the terminal needs the measurement gap, which is included in the UE capability information, to the base station. If the terminal does not need a measurement gap, the procedures of steps 2*l*-02 and 2*l*-03** may be omitted, and the terminal may perform radio link quality measurement of neighboring cells without the measurement gap.

Next, a method of setting, by a base station, a measurement gap in a terminal will be described. The length L of the measurement gap includes the processing time for cell identification from the signal received during the measurement gap interval, and the processing time for changing the RF or RAT of the terminal. In order for the terminal to periodically measure the radio link quality of the neighboring cell, the measurement gap is repeated every predetermined period P with respect to the reference system. The measurement gap starts at a point spaced by "measurement offset" within the period of the measurement gap. The "measurement offset" is set to be different values for each UE, thereby preventing the phenomenon that the terminals in the system simultaneously concentrate the radio link quality measurement at a limited time. The reference system may be the LTE system or the NR system.

The length of the measurement gap, the period, the "measurement offset" information, and the information on the reference system are defined or used, or the base station sets control information related to some or all of the measurement gaps and informs the terminal of it through signaling.

After the terminal acquires the measurement gap related control information from the base station, the terminal attempts radio link quality measurement for neighboring cells in a radio frame and a subframe satisfying the following condition A.

SFN mod $T$=FLOOR("measurement offset"/$N$);

Subframe="measurement offset" mod $N$;

$T=P/10$                      Condition A:

In the above condition A, the SFN is a counter in units of radio frames of the reference system, FLOOR (x) is the largest integer not larger than x, x mod y is the remainder obtained by dividing x by y, and N represents the number of subframes configuring one radio frame of the reference system.

For example, when the measurement gap related control information that the terminal acquires from the base station is P=40 ms, "measurement offset"=25 subframes, and SFN=2 and N=10 of the reference system, if the above condition A is calculated, $T$=40/10=4;

SFN mod $T$=2 mod 4=2

FLOOR(25/10)=2;

Subframe=25 mod 10=5;

the above condition A is satisfied. That is, the terminal starts a measurement gap of length L at SFN=2 and subframe=5 of the reference system and repeats it at a period of 40 ms.

Figure 2M:
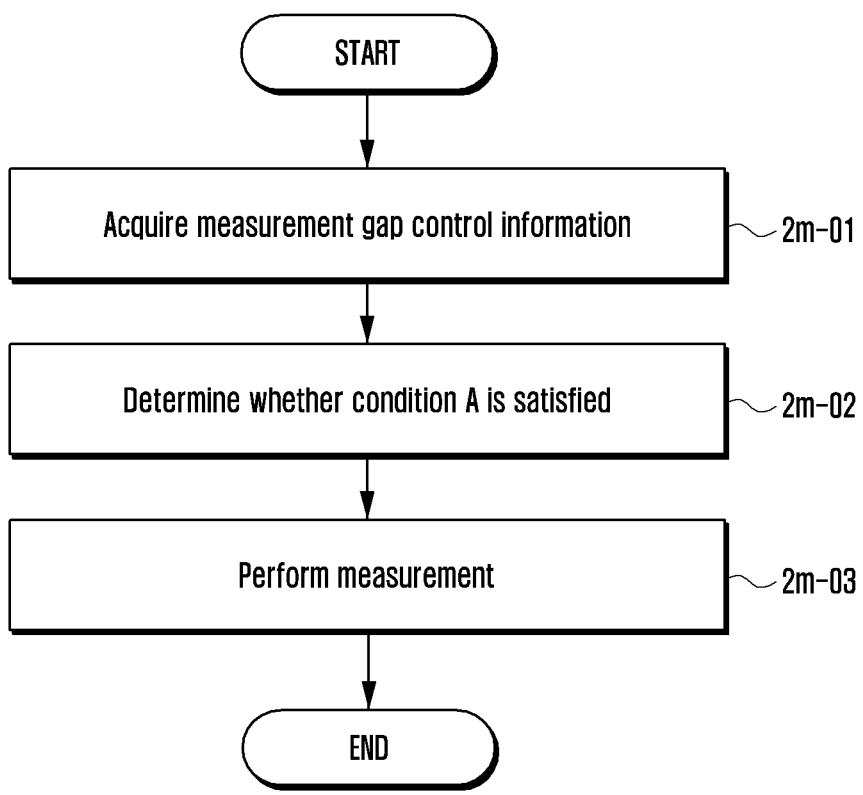
FIG. 2M illustrates a diagram of a procedure of acquiring, by a terminal, measurement gap control information to perform measurement.

FIG. 2M illustrates a diagram illustrating a procedure of acquiring, by a terminal, measurement gap control information to perform measurement. In step **2*m*-01, the terminal acquires the measurement gap control information from the base station. In step 2*m*-02, the terminal determines whether the measurement gap control information acquired from the base station satisfies the condition A, and if it is determined that the measurement gap control information satisfies the condition A, the terminal performs the radio link quality measurement on neighbor cells in step 2*m*-03. If it is determined that the condition A is not satisfied, the terminal proceeds to step 2*m*-02** again at the next time point (next radio frame or next subframe)

Although the operation in the asynchronous mode or the synchronous mode in the partial subframe has been described with respect to the measurement gap of the terminal, it is possible to generalize and apply the technique before and after the predetermined radio resource area in which the transmission or reception of the terminal is restricted, like the measurement gap. For example, the predetermined radio resource region may be defined in advance and allocated by the base station so that the terminal supporting an ultra low latency service in a cell can transmit/receive signals for a time shorter than a subframe length.

A method of transmitting and receiving data that is flexible in an NR system will be described. In the existing LTE/LTE-A system, the fixed value of the time interval (hereinafter, referred to as scheduling timing) between the transmission time of the base station control information for scheduling the uplink data transmission of the terminal and the transmission time of the uplink data is equally applied to the terminals. Similarly, in the LTE/LTE-A system, the fixed value of the time interval (hereinafter referred to as HARQ timing) between the downlink data transmission time of the base station and the transmission time of the HARQ-ACK control information on the downlink data is equally applied to the terminals.

However, in the NR system, the scheduling timing and the HARQ timing may be flexibly adjusted to support the terminal requiring the low latency service and efficiently use radio resources. A timing indicator k is defined for the flexible timing adjustment, and the scheduling timing and the HARQ timing are each determined as follows.

Scheduling timing:

Uplink data transmission time=j+TMIN1+k

HARQ timing:

Uplink HARQ-ACK control information transmission time=j+TMIN2+k

In the scheduling timing, j denotes a subframe in which the base station transmits the control information for scheduling the uplink data transmission of the terminal. The TMIN1 is the minimum time for the terminal to process and acquire the scheduling control information received from the base station.

J in the HARQ timing indicates a subframe in which downlink data of a base station is transmitted. The TMIN2 is the minimum time for the terminal to process and acquire data received from the base station.

The base station may notify the terminal of the timing indicator k included in scheduling control information through dynamic signaling or semi-statically notify the terminal of the timing indicator k through the higher layer signaling.

Figure 2N:
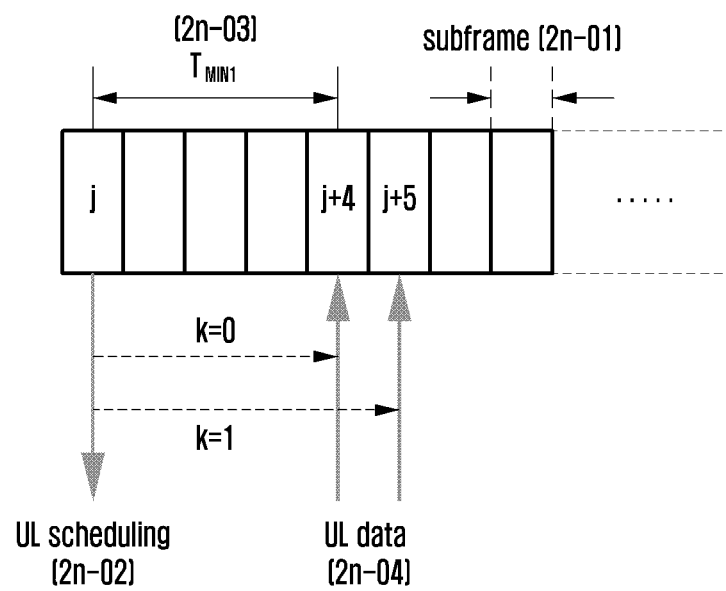
FIG. 2N illustrates a diagram of flexible scheduling timing in the NR system.
Figure 20:
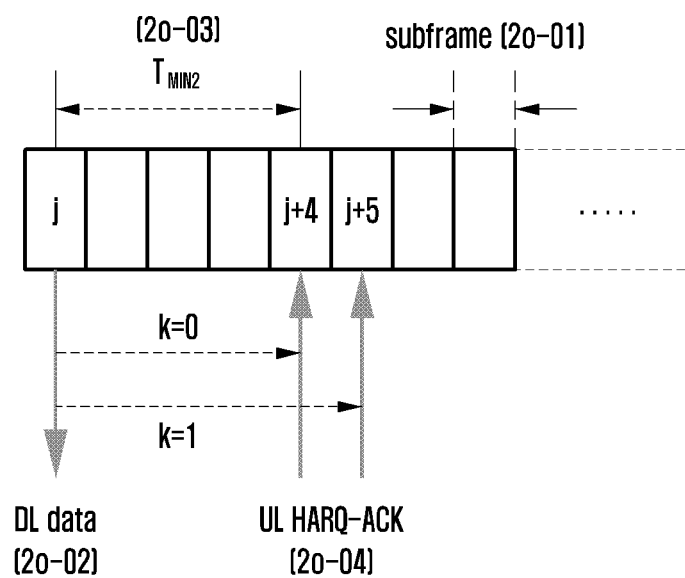

FIG. 2N illustrates flexible scheduling timing in the NR system. FIG. 2N illustrates a case where TMIN1=4 2n-01 and the base station transmits (2n-02) scheduling information in subframe j. The terminal applies the timing indicator k that the base station notifies through the signaling to transmit the uplink data in a subframe j+4 (=j+4+0) if k=0, and transmits the uplink data in a subframe+5 (=j+4+1) if k=1. FIG. 2N illustrates that although the timing indicator k is defined as 0 or 1, k may be defined as various values according to the system design.

FIG. 2O illustrates flexible HARQ timing in the NR system. FIG. 2O illustrates a case where TMIN2=4 2o-01 and the base station transmits (2o-02) downlink data in subframe j. The terminal applies the timing indicator k that the base station notifies through the signaling to transmit uplink HARQ-ACK in a subframe j+4 (=j+4+0) if k=0, and transmits HARQ-ACK control information in a subframe+5 (=j+4+1) if k=1. FIG. 2O illustrates that although the timing indicator k is defined as 0 or 1, k may be defined as various values according to the system design.

In addition, an operation may be defined of a case in which the time when the terminal attempts to transmit the uplink data or the HARQ-ACK control information according to the scheduling timing and the HARQ timing overlaps with the measurement gap interval. Hereinafter, the operation of the terminal will be described with reference to FIGS. 2P and 2Q.

Figure 2P:
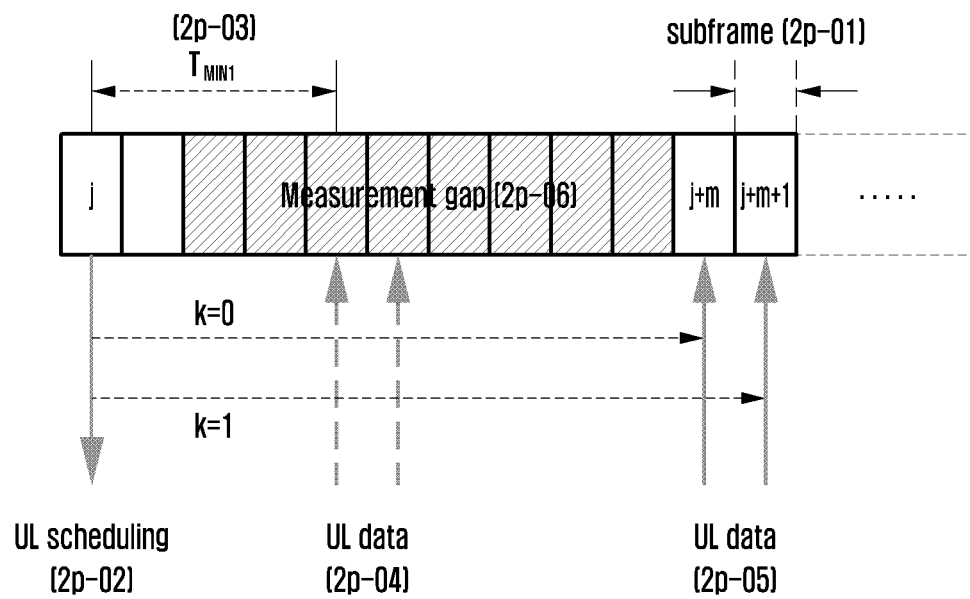
FIGS. 2P and 2Q illustrate a terminal operation according to embodiments of the present disclosure.

FIG. 2P illustrates an example in which the uplink data transmission time calculated according to the scheduling timing overlaps with the (2p-04) measurement gap interval (2p-06) if the base station transmits (2p-02) the scheduling information in the subframe j. In this case, the terminal adjusts the uplink data transmission time so as not to overlap with the measurement gap interval according to the following method and transmits it (2p-05).

Method A: Transmission immediately after the end of the measurement gap interval (transmission in subframe j+m in the example of FIG. 2P)

Method B: Transmission at the time when the timing indicator k is additionally applied at the time when the measurement gap interval ends (in the example of FIG. 2P, if k=0, transmission in the subframe j+m and transmission in the subframe j+1)

The method A can minimize the uplink transmission delay of the terminal and the method B can perform the additional timing adjustment. If the TDD system is used, the terminal performs a transmission in an uplink subframe first arriving after the time calculated according to the methods A and B described above.

Figure 2Q:
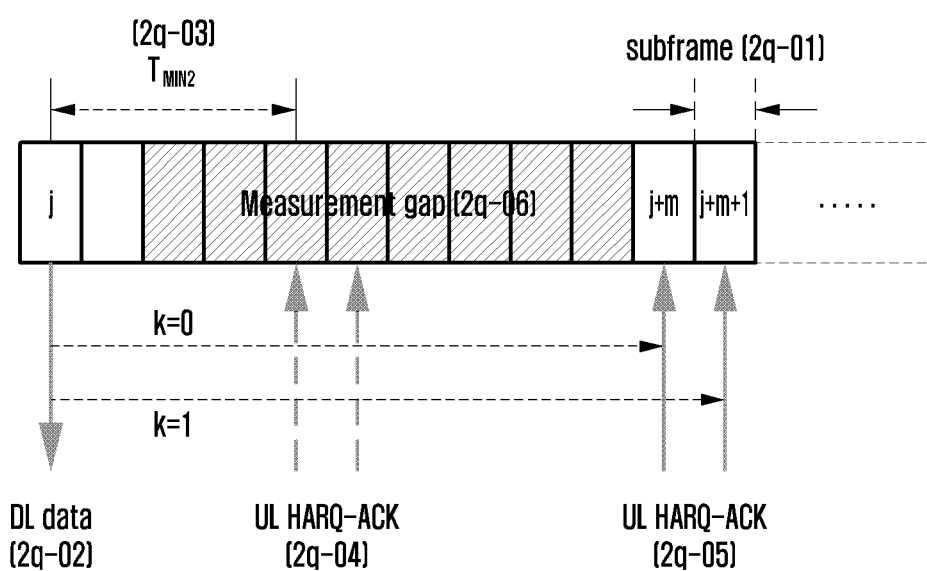

FIG. 2Q illustrates an example in which the uplink data transmission time calculated according to the scheduling timing overlaps with the (2q-04) measurement gap interval (2q-06) if the base station transmits (2q-02) the downlink data in the subframe j. In this case, as in the case of FIG. 2P, according to the method A or B, the terminal adjusts the uplink HARQ-ACK control information transmission time so as not to overlap with the measurement gap interval 2q-05 and transmits it.

Figure 2R:
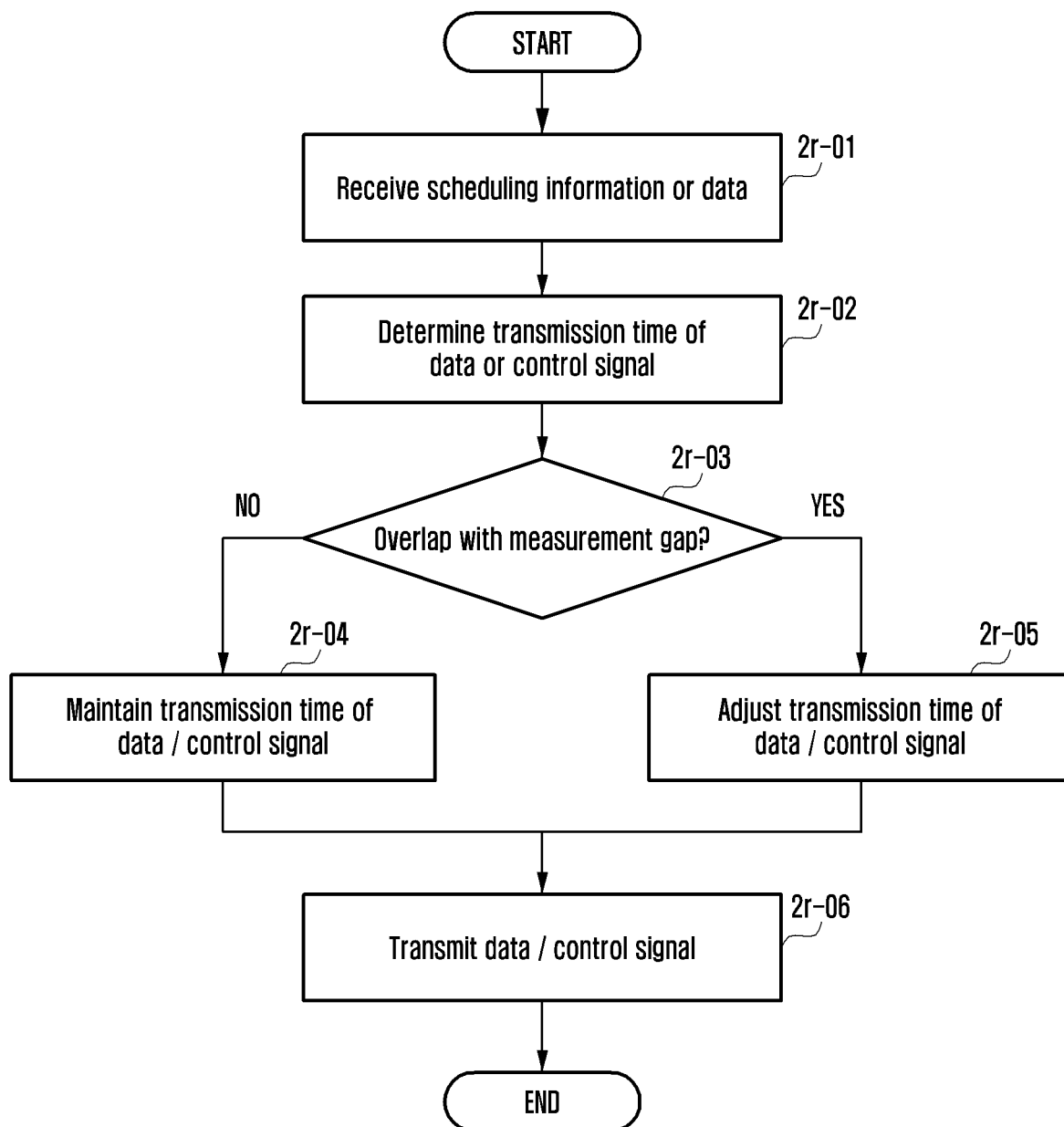
FIG. 2R illustrates a diagram of a terminal procedure in a case in which the measurement gap overlaps with uplink data or control information transmission time according to the above-mentioned method.

FIG. 2R illustrates a diagram of a terminal procedure in a case in which the measurement gap overlaps with uplink data or control information transmission time according to the above-mentioned method. In step 2r-01, the terminal receives the scheduling information or the downlink data from the base station. In step 2r-02, the terminal determines the transmission time of the uplink data or the uplink HARQ-ACK control information according to the scheduling timing or the HARQ timing. In step 2r-03, the terminal determines whether the determined transmission time overlaps with the measurement gap interval. If it is determined that the determined transmission time does not overlap with the measurement gap interval, the terminal maintains the transmission time determined in step 2r-04 as it is and transmits uplink data or uplink HARQ-ACK control information to the base station in step 2r-06. If the uplink transmission time determined in step 2r-02 overlaps with the measurement gap interval, the terminal transmits the transmission time of the uplink data or the uplink HARQ-ACK control information according to the method A or B in step 2r-05 and transmits it to the base station in step 2r-06.

Figure 2S:
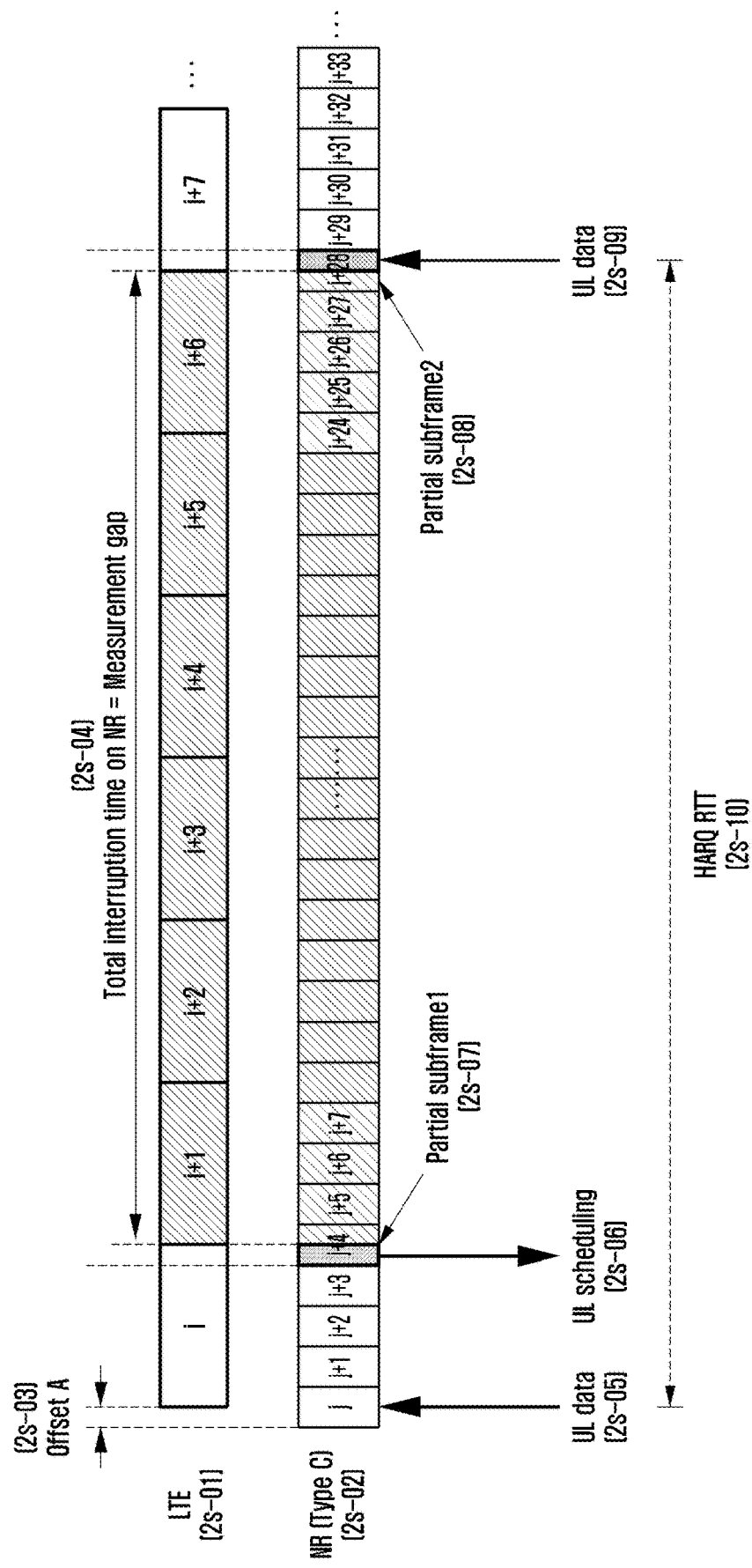
FIG. 2S illustrates a diagram of that a terminal supports a combination of the LTE and an NR as the frame structure type C, in which the LTE system and the NR system illustrate that time synchronization between subframes or radio frames mismatches by a specific offset.

The transmission/reception timing of the terminal can be defined by combining the scheduling timing with the partial subframe of some embodiments. Hereinafter, it will be described with reference to FIG. 2S. Like the case of FIG. 2K, FIG. 2S illustrates that the terminal supports the aggregation of LTE 2s-01 and NR 2s-02 as the frame structure type C, and the LTE system and the NR system indicate that the time synchronization between subframes or radio frames does not match by "offset A" 2k-03. Further, the base station sets a measurement gap 2s-04 corresponding to LTE based 6 subframes in the terminal to indicate corresponding to LTE subframe i+1 to LTE subframe i+6. Then, in terms of the NR subframe, the overlapping with the measurement gap from a part of an interval of the NR subframe (j+4) to a part of an interval of the NR subframe (j+28) is shown. That is, it is illustrated that NR subframe (j+4) is applied to partial subframe 1 and NR subframe (j+28) is applied to partial subframe 2. As described with reference to FIG. 2K, the terminal can perform a transmission/reception operation without interruption with the NR system in an interval that does not overlap the measurement gap of the partial subframes 1 and 2

In the condition, FIG. 2S illustrates the case in which the terminal transmits (2s-05) 4 subframes in the subframe j according to the base station scheduling and the base station transmits the retransmission scheduling control information on the uplink data to the terminal in a subframe j+4 as the minimum processing time to receive and process the uplink data of the terminal is 4 subframes. Since the subframe j+4 is partial subframe 1 and the terminal can receive the downlink signal, the base station transmits the retransmission scheduling control information to the terminal in the subframe j+4 as calculated first.

Thereafter, the terminal stops transmission/reception operation to/from the NR cell during the measurement gap interval, and then performs the uplink data transmission according to the retransmission scheduling of the base station at the time when the measurement gap ends. In the example of FIG. 2S, the terminal transmits uplink data in partial subframe 2 (2s-08). Therefore, the HARQ round trip time (RTT) between the initial uplink data transmission time (2s-05) and the retransmission uplink data transmission time of the terminal corresponds to 28 subframes (2s-10).

If the terminal does not support the transmission/reception operation in the partial subframe, the terminal cannot receive the retransmission scheduling control information transmitted by the base station in subframe j+4, and receive the retransmission scheduling control information in subframe j+29 which is the time when the downlink signal may be fastest received from the base station after the measurement gap. If it is assumed that the retransmission scheduling control information processing time of the terminal is 4 subframes, the terminal can transmit the retransmission scheduled uplink data in subframe j+33. Therefore, the HARQ RTT is increased to 33 subframes, and therefore the transmission delay occurs.

Meanwhile, in FIG. 2S, the timing indicator k may be applied together for the flexible timing adjustment described above. That is, if the terminal transmits the uplink data in the partial subframe 2 (2s-08), the transmission may be performed as it is in the partial subframe 2 (2s-08) in the case of the timing indicator k=0, and the transmission may be performed in the subframe j+29 in the case of the timing indicator k=1.

A method of measuring, by a terminal, channel status information (CSI) in the partial subframe will be described. The terminal measures the CSI indicating the downlink channel state from the CSI-reference signal (CSI-RS) transmitted from the base station and reports the CSI to the base station to support the scheduling operation of the base station. The CSI-RS is mapped to a predetermined promised pattern at a defined location, and the accuracy of terminal CSI measurement depends on the mapping of the CSI-RS in the partial subframe. Hereinafter, it will be described with reference to FIGS. 2T and 2U.

The example of FIG. 2T illustrates that the subframe n (2t-01) is a partial subframe and a part of an interval 2t-04 of the subframe and the subframe (n+1) 2t-05 are included in a measurement 2t-02. In the case of FIG. 2T, it is illustrated that the mapping in the partial subframe 2t-01 of the CSI-RS 2t-03 does not overlap with the measurement gap 2t-02. Therefore, the terminal can receive the CSI-RS without loss and can maintain the reliability of the CSI measurement. That is, if the mapping of the CSI-RS to be measured by the terminal does not overlap with the measurement gap of the partial subframe, the terminal determines that the partial subframe is valid for CSI measurement and performs CSI measurement in the partial subframe. In the case of FIG. 2U, it is illustrated that the mapping in a partial subframe 2u-01 of the CSI-RS 2u-03 does not overlap with the measurement gap 2u-02. FIG. 2U also shows an interval 2u-04 and a subframe n+1 2u-05. Accordingly, the terminal determines that the partial subframe is invalid for CSI measurement and does not perform the CSI measurement in the partial subframe.

Figure 2V:
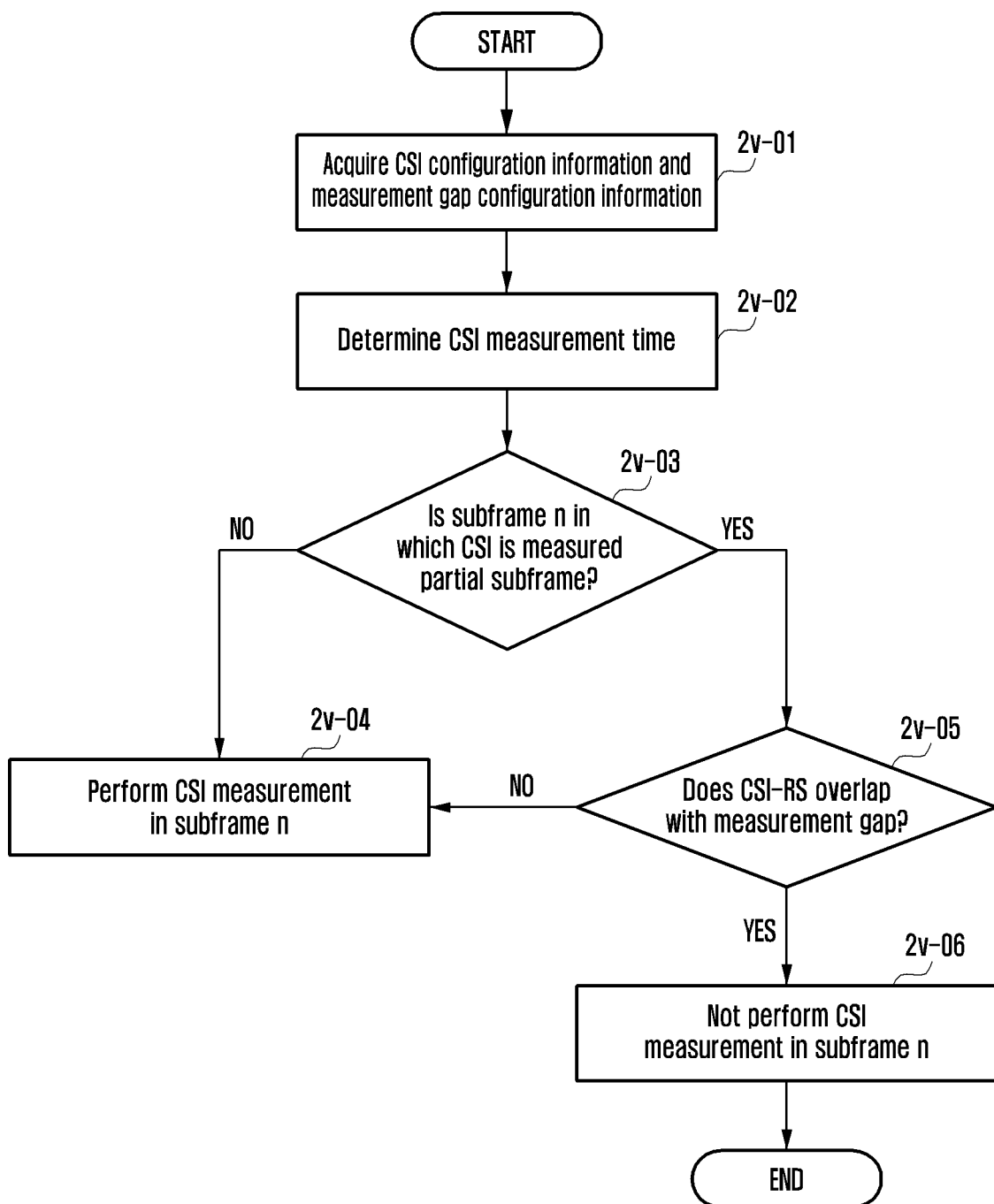
FIG. 2V illustrates a diagram of a procedure of measuring, by a terminal, CSI according to the above-mentioned method.

FIG. 2V illustrates a diagram of a procedure of measuring, by a terminal, CSI according to the above-mentioned method. In step 2v-01, the terminal acquires CSI configuration information and measurement gap configuration information from the base station through signaling. The CSI configuration information includes control information on the CSI measurement of the terminal, such as the mapping pattern of the CSI-RS, the transmission period, and the transmission time. The measurement gap configuration information includes the measurement gap related control information such as the length, period, and time of the measurement gap. In step 2v-02, the terminal determines the CSI measurement time. The terminal can determine the CSI measurement time point by referring to the CSI configuration information acquired in step 2v-01 and the CSI reporting command additionally indicated by the base station. In step 2v-03, the terminal determines whether the subframe n in which the CSI is measured is a partial subframe, and thus if the subframe is not a partial subframe, the terminal proceeds to step 2v-04 to perform the CSI measurement in the subframe n. If it is a partial subframe as a result of the determination in step 2v-03, the terminal determines in step 2v-05 whether the CSI-RS overlaps with the measurement gap. If the CSI-RS does not overlap the measurement gap, the terminal proceeds to step 2v-04 to perform the CSI measurement in the subframe n. If the CSI-RS overlaps with the measurement gap as a result of the determination in step 2v-05, the terminal proceeds to step 2v-06 and does not perform the CSI measurement in the subframe n. That is, the terminal does not transmit the CSI feedback to the base station because the CSI measurement is not performed in the subframe n, and the base station does not receive the CSI feedback from the terminal.

The base station can notify the terminal whether the CSI is measured in the partial subframe through signaling.

Figure 2W:
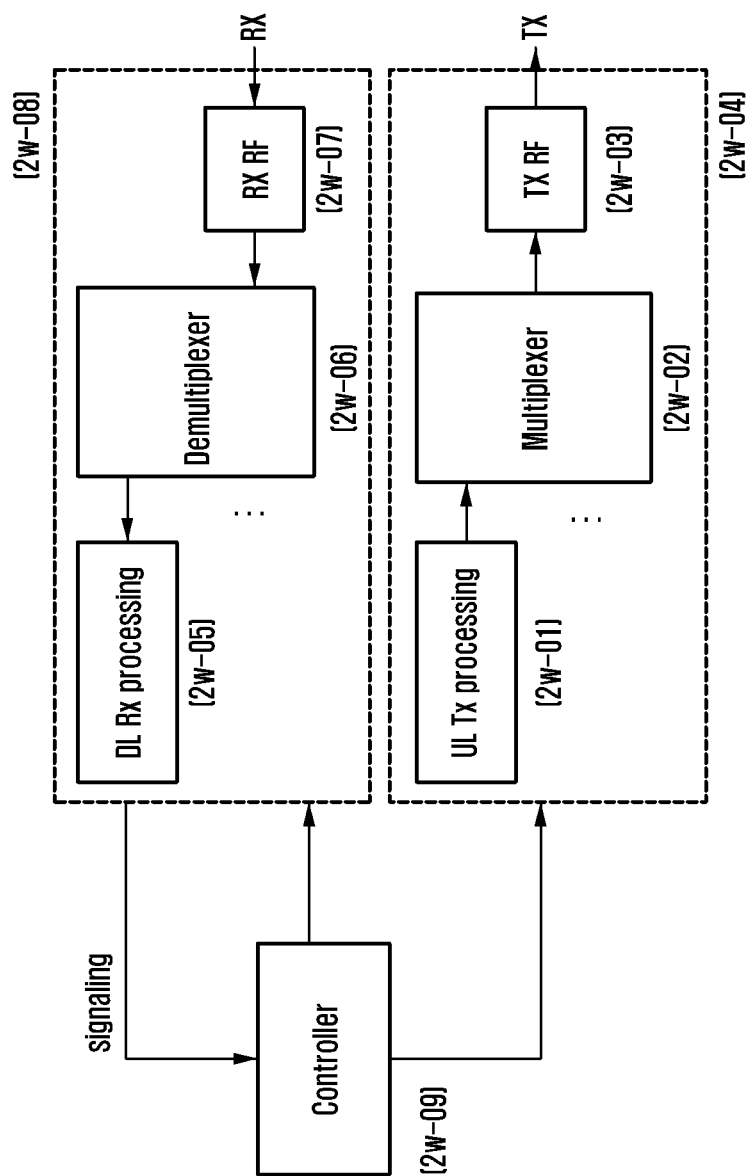
FIG. 2W illustrates a diagram of a terminal transceiver according to embodiments of the present disclosure.

FIG. 2W illustrates a diagram of a terminal transceiver according to the present disclosure. For convenience of explanation, the illustration and description of the apparatus that is not directly related to the present disclosure will be omitted.

Referring to FIG. 2W, the terminal includes a transmitter 2w-04 including an uplink transmission processing block 2w-01, a multiplexer 2w-02, a transmission RF block 2w-03, a receiver 2w-08 including a downlink reception processing block 2w-05, a demultiplexer 2w-06, and a reception RF block 2w-07, and a controller 2w-09. The controller 2w-09 determines how to apply, by the terminal, the measurement gap from the measurement gap control information acquired by the base station signaling, how to apply the partial subframe, and the like to control each configuration block of the receiver 2w-08 for receiving the downlink signal of the terminal and each configuration block of the transmitter 2w-04 for uplink signal transmission.

The uplink transmission processing block 2w-01 in the transmitter 2w-04 of the terminal performs the processes such as the channel coding and the modulation to generate the signal to be transmitted. The signal generated from the uplink transmission processing block 2w-01 is multiplexed with other uplink signals by the multiplexer 2w-02, processed by the transmission RF block 2w-03, and then transmitted to the base station.

The receiver 2w-08 of the terminal demultiplexes the signal received from the base station and distributes the signal into each of the downlink reception processing blocks. The downlink reception processing block 2w-05 performs processes such as demodulation and channel decoding on the downlink signal of the base station to obtain control information or data transmitted by the base station. The terminal receiver 2w-08 applies the output result of the downlink reception processing block to the controller 2w-09 to support the operation of the controller 2w-09.

The embodiments of the present disclosure disclosed in the present specification and the accompanying drawings have been provided as specific examples in order to assist in understanding the present disclosure and do not limit the scope of the present disclosure. That is, it is obvious to those skilled in the art to which the present disclosure pertains that other change examples based on the technical idea of the present disclosure may be made without departing from the scope of the present disclosure. Further, embodiments may be combined and operated as needed.

A wireless communication system has been developed from a wireless communication system providing a voice centered service in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a user equipment (UE) or a mobile station (MS) transmits data or a control signal to a base station (eNodeB or base station (BS)) and the down link refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system since the LTE, that is, a 5G communication system has to be able to freely reflect various requirements such as a user and a service provider, a service satisfying various requirements needs to be supported at the same time. The services considered for the 5G communication system include enhanced mobile broadband (hereinafter, eMBB), massive machine type communication (hereinafter, mMTC), ultra reliability low latency communication (hereinafter, URLLC), etc.

The eMBB aims to provide a higher data transfer rate than a data rate supported by the existing LTE, LTE-A, or LTE-Pro. For example, in the 5G communication system, the eMBB may be able to provide a peak transmission rate of 20 Gbps in the downlink and a peak data rate of 10 Gbps in the uplink from the viewpoint of one base station. In addition, the 5G communication system may provide the increased user perceived data rate of the terminal simultaneously with providing the peak data rate. In order to satisfy such the requirement, improvement of various transmitting and receiving technologies including a further improved multi input multi output (MIMO) transmission technology is demanded. In addition, signals are transmitted using the transmission bandwidth of up to 20 MHz in the 2 GHz band used by the current LTE, but the 5G communication system uses a bandwidth wider than 20 MHz in the frequency band of 3 to 6 GHz or more than 6 GHz, thereby satisfying the data transmission rate used in the 5G communication system.

At the same time, the mMTC is being considered to support application services such as Internet of Thing (IoT) in the 5G communication system. The mMTC is used for an access support of a large-scale terminal in a cell, coverage enhancement of a terminal, improved battery time, and cost reduction of a terminal in order to efficiently provide the Internet of things. The Internet of things needs to be able to support a large number of terminals (e.g., 1,000,000 terminals/km$^2$) in a cell because it is attached to various sensors and various devices to provide communication functions. In addition, the terminal supporting the mMTC are more likely to be located in shaded areas not covered by a cell, such as an underground of building due to nature of services, thus the terminal requires a wider coverage than other services provided by the 5G communication system. The terminals that support the mMTC may be configured as inexpensive terminals and require very long battery lifetime, such as 10 to 15 years, because it is difficult to frequently replace the battery of the terminal.

Finally, in the case of the URLLC, it is a cellular-based wireless communication service used for mission-critical purposes. For example, services used for a remote control for a robot or machinery, industrial automation, unmanaged aerial vehicle, remote health care, emergency situation, or the like may be considered. Therefore, the communication provided by the URLLC may provide very low latency and very high reliability. For example, a service that supports URLLC may meet air interface latency of less than 0.5 milliseconds and at the same time have requirements of a packet error rate less than $10^{-5}$. Therefore, for the service that supports the URLLC, the 5G system may provide a transmit time interval (TTI) smaller than other services, and at the same time, design matters for allocating a wide resource in the frequency band in order to secure the reliability of the communication link are used.

Figure 3A:
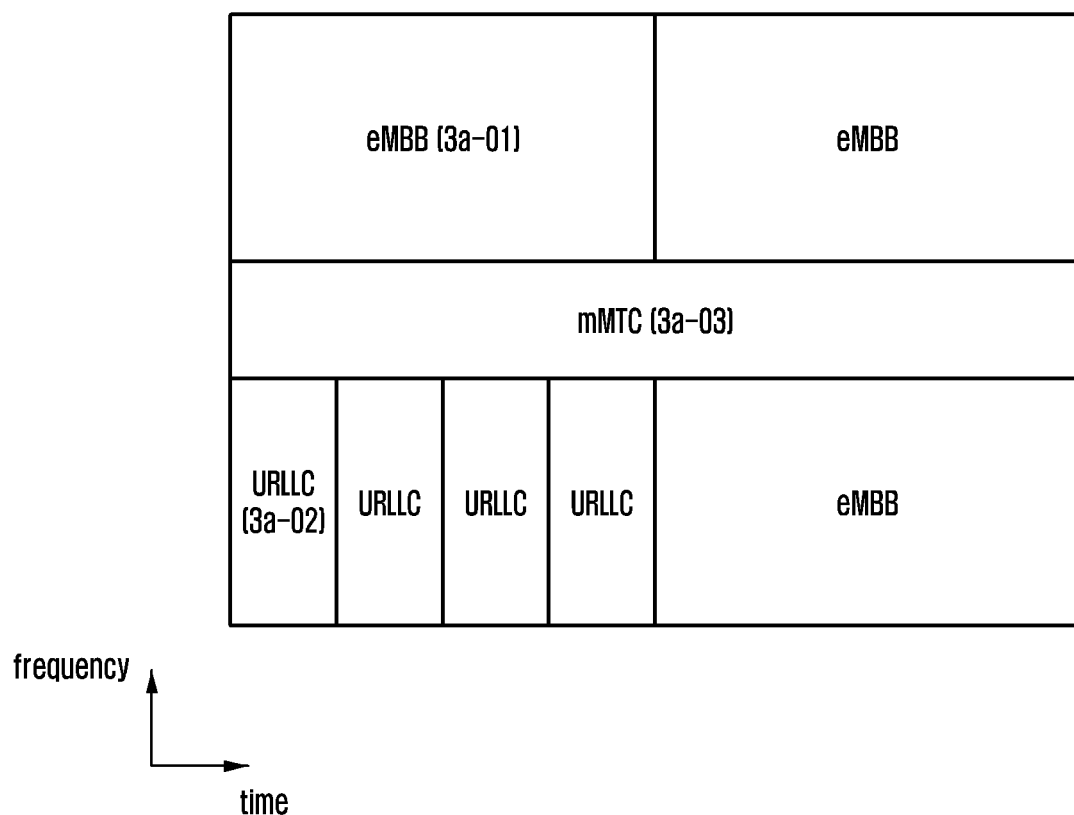
FIG. 3A illustrates a diagram of an example in which 5G services are multiplexed and transmitted in one system.

FIG. 3A illustrates a diagram of an example in which three services of the 5G, i.e., eMBB 3a-01, URLLC 3a-02, and mMTC 3a-03 are multiplexed and transmitted in one system. According to the example illustrated in FIG. 3A, in the 5G communication system, different transmission/reception techniques and transmission/reception parameters can be used between services in order to satisfy different requirements of the respective services.

Hereinafter, the frame structure of the LTE and LTE-A systems will be described in more detail with reference to the drawings.

Figure 3B:
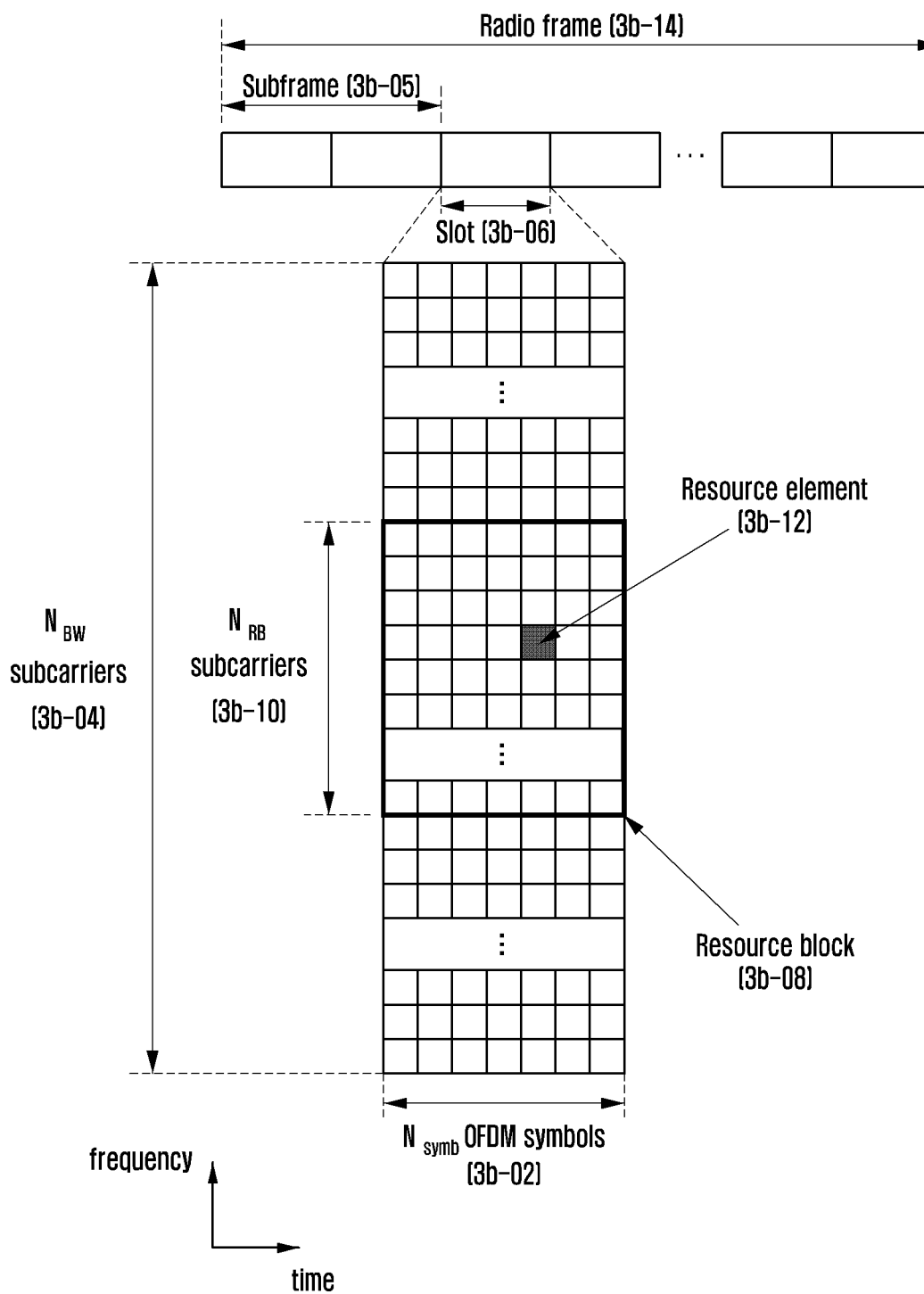
FIG. 3B illustrates a diagram of a basic structure of a time-frequency domain in the LTE.

FIG. 3B illustrates a diagram of a basic structure of a time-frequency domain that is a radio resource region in which data or a control channel is transmitted in a downlink, in the LTE system.

In FIG. 3B, a horizontal axis represents a time domain and a vertical axis represents a frequency domain. A minimum transmission unit in the time domain is an OFDM symbol, in which one slot 3b-06 is configured by collecting $N_{symb}$ OFDM symbols 3b-02 and one subframe 3b-05 is configured by collecting two slots. Further, a radio frame 3b-14 is a time domain unit which includes 10 subframes. A minimum transmission unit in the frequency domain is a subcarrier, in which the whole system transmission bandwidth includes a total of $N_{BW}$ subcarriers 3b-04.

A basic unit of resources in the time-frequency domain is a resource element (RE) 3b-12 and may be represented by an OFDM symbol index and a subcarrier index. A resource block (RB) (or a physical resource block (PRB)) 3b-08 is defined by the $N_{symb}$ continued OFDM symbols 3b-02 in the time domain and $N_{RB}$ continued subcarriers 3b-10 in the frequency domain. Therefore, one RB 3b-08 includes $N_{symb} \times N_{RB}$ REs 3b-12. Generally, a minimum transmission unit of the data is the RB unit. In the LTE system, generally, $N_{symb}=7$ and $N_{RB}=12$ and $N_{BW}$ and $N_{RB}$ are proportional to the system transmission bandwidth.

The frame structure of the LTE and LTE-A systems as described above is designed considering normal voice/data communications, and has limitations in scalability to meet various services and requirements like the 5G system. Therefore, in 5G system, it is necessary to flexibly define and operate frame structure considering various services and requirements. For example, each service may have different subcarrier spacings depending on the requirements. Currently, two schemes are considered to support a plurality of subcarriers in the 5G communication system. As a first method for supporting a plurality of subcarriers in the 5G communication system, a set of subcarrier spacings that the 5G communication system can have may be determined using the following Equation 1.

$$\Delta f = f_0 \cdot M \quad \text{Equation 1}$$

In the above Equation 1, $f_0$ represents a basic subcarrier spacing of the system and M represents a scaling factor. For example, if $f_0$ is 15 kHz, the set of subcarrier spacings that the 5G communication system can have may include 7.5 kHz, 15 kHz, 30 kHz, 45 kHz, 60 kHz, 75 kHz, etc., and the system may be configured using all or some of the corresponding set.

In addition, as a two method for supporting a plurality of subcarriers in the 5G communication system, a set of subcarrier spacings which may be included in the 5G communication system may be determined using the following Equation 2.

$$\Delta f = f_0 \cdot 2^m \quad \text{Equation 2}$$

In the above Equation 2, $f_0$ represents a basic subcarrier spacing of the system and M represents a scaling factor of integer. For example, if $f_0$ is 15 kHz, a set of subcarrier spacings that the 5G communication system can have may include 7.5 kHz, 15 kHz, 30 kHz, 60 kHz, 120 kHz, and the like. The system can be configured using all or some of the set as in Equation (1). According to the two methods described above, the present disclosure will be described on the assumption that $f_0$ is 15 kHz and a set of 15 kHz, 30 kHz, and 60 kHz subcarrier spacing is used in the 5G communication system. However, the technique proposed in the present disclosure can apply even another set of subcarrier spacings (for example, $f_0$ is 17.5 kHz, and a set of subcarrier spacings is 17.5 kHz, 35 kHz, and 70 kHz) without any limitation. If the set of subcarrier spacings of 17.5 kHz, 35 kHz, and 70 kHz is considered in the present disclosure, $f_0$ can be mapped to the technique described based on 15 kHz. Likewise, the present disclosure may be described by mapping 35 kHz, 70 kHz, and 140 kHz to 30 kHz, 60 kHz, and 120 kHz, respectively, on a one-to-one basis.

Figure 3C:
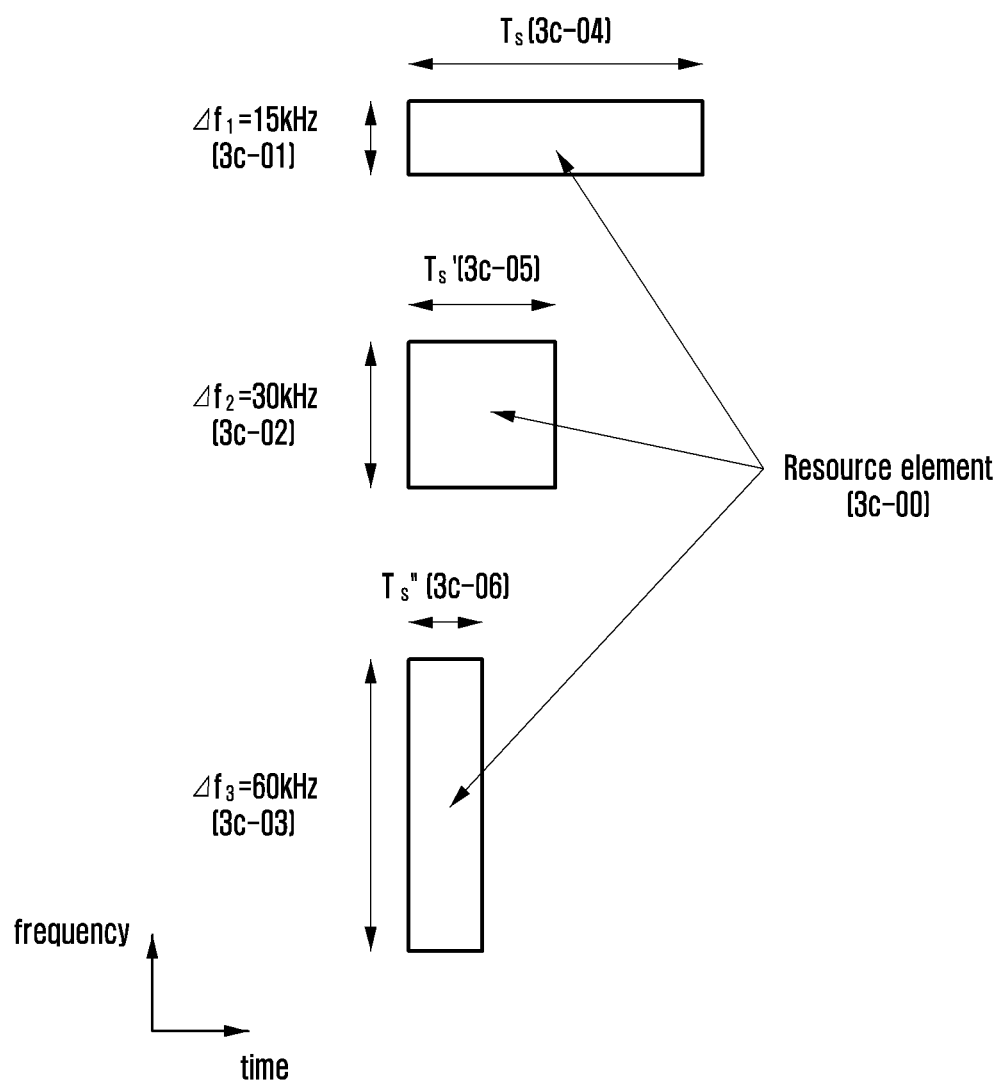
FIG. 3C illustrates a diagram of resource elements having different subcarrier spacings.

FIG. 3C illustrates a diagram of a resource element 3c-00 in the case where the subcarrier spacings are $\Delta f_1$ (3c-01), $\Delta f_2$ (3c-02), and $\Delta f_3$ (3c-03), respectively. In the example of FIG. 3C, the subcarrier spacings of the respective resource elements, i.e., values of $\Delta f_1$ (3c-01), $\Delta f_2$ (3c-02), and $\Delta f_3$ (3c-03) correspond to 15 kHz, 30 kHz, and 60 kHz, respectively. In addition, each resource element has an OFDM symbol length of Ts (3c-04), Ts' (3c-05), Ts' (3c-06). As the characteristic of the OFDM symbol, since the subcarrier spacing and the length of the OFDM symbol have a reciprocal relationship with each other, it can be seen that the larger the subcarrier spacing, the shorter the symbol length. Therefore, Ts (3c-04) is two times Ts' (3c-05) and four times Ts' (3c-06).

Various sets of subcarrier spacings described above can be used for various purposes within a system. For example, it may be appropriate to use the subcarrier spacing in consideration of channel conditions (multi-path delay spread) or coherence bandwidth of a corresponding band at a low carrier frequency such as 2 GHz to 4 GHz band. For example, it is advantageous to use low subcarrier spacing because the path delay spread is relatively large and therefore the coherence bandwidth is small at the carrier frequencies of the 2 GHz to 4 GHz band. At the same time, in a band having a high carrier frequency of 6 GHz or higher, it is advantageous to use wide subcarrier spacing because the influence due to the channel condition, Doppler shift, and frequency offset is more serious. At the same time, the 5G communication system can use high subcarrier spacing of systems that have requirements of very low transmission delay time like the URLLC, even in the band using the low carrier frequency.

Figure 3D:
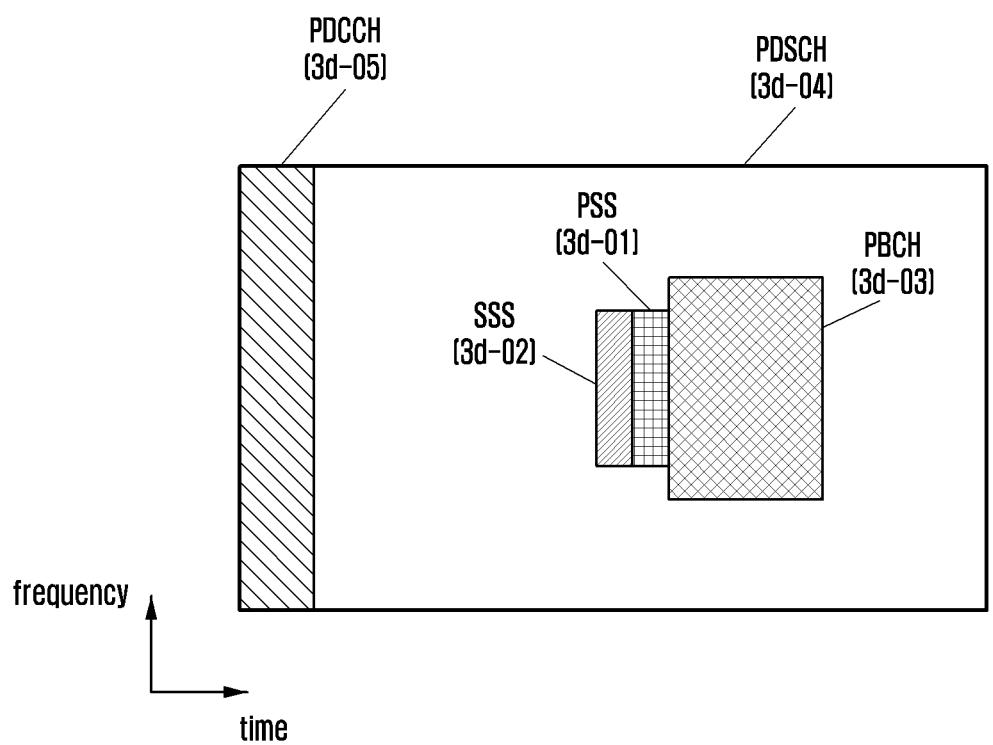
FIG. 3D illustrates a diagram of a downlink physical layer channel used in a cell initial connection in the LTE.

Hereinafter, a cell initial connection operation procedure of the LTE and LTE-A systems will be described in more detail with reference to the drawings FIG. 3D illustrates a diagram of a downlink physical layer channel structure used in a cell initial connection step in the LTE.

In FIG. 3D, a primary synchronization signal (PSS) 3d-01 and a secondary synchronization signal (SSS) 3d-02 are physical layer signals transmitted to acquire synchronization with a cell in a network.

In FIG. 3D, a physical broadcast channel (PBCH) 3d-03 is a physical layer channel to which a master information block (MIB) having a very limited amount of system information is transmitted.

In FIG. 3D, a physical downlink shared channel (PDSCH) 3d-04 is a physical layer channel to which a downlink shared channel (DL-SCH) which is a transmission channel used for downlink data transmission and a paging channel (PCH) which is a transmission channel used for transmission of paging information are transmitted.

In FIG. 3D, a physical downlink control channel (PDCCH) 3d-05 is a physical layer channel to which downlink control information is transmitted.

A cyclic redundancy check (CRC) is attached to a payload of a DCI message transmitted to the PDCCH 3d-05, and the CRC is scrambled with a radio network temporary identifier (RNTI) corresponding to identity of the terminal. Different RNTIs are used depending on the purpose of the DCI, e.g. UE-specific data transmission, power control command, or random access response. Soon, the RNTI is not explicitly transmitted but is transmitted by being included in the CRC computation process. Upon receiving the DCI message transmitted onto the PDCCH, the terminal checks the CRC using the allocated RNTI. If the confirmation result of the CRC is correct, the terminal can know that the message is transmitted to the terminal. Hereinafter, in describing the present disclosure, the case in which the DCI message with the CRC scrambled with the RNTI is transmitted to a PDCCH is simply defined as "PDCCH configured as RNTI"

The LTE terminal may perform the following procedure prior to communicating with the network.

Acquire synchronization with cell in network

Receive and decode of system information

First, a synchronization acquisition procedure with a cell will be described. In order to acquire synchronization with the cell, the terminal transmits two synchronization signals such as the primary synchronization signal (PSS) 3d-01 and the secondary synchronization signal (SSS) 3d-02 in the LTE. The PSS 3d-01 includes three different Zadoff-Chu (ZC) sequences according to the physical layer cell ID (Identity) of the cell. More specifically, three cell IDs in one cell ID group correspond to different PSSs 3d-01. If the terminal detects and confirms the PSS 3d-01, the terminal acquires the information on 5 ms timing of the cell, the location of the SSS 3d-02, and the cell ID in the cell ID group. The SSS 3d-02 has 168 different values corresponding to different cell ID groups. For this purpose, the SSS 3d-02 is designed based on frequency interleaving of m-sequences X and Y of two length 31. The terminal detects the SSS 3d-02 to know frame timing and know a cell ID group. As a result, the synchronization with the network is acquired through the PSS 3d-01 and the SSS 3d-02, and one of 504 physical layer cell IDs is acquired. It is known what the corresponding cell-specific reference signal (CRS) is based on the obtained physical layer ID. At this time, in the case of the first cell search, that is, in the RRC_IDLE mode, the CRS is used to decode PBCH 3d-03 for channel estimation and system information acquisition. On the other hand, in case of measurement for mobility, that is, in the case of RRC_CONNECTED mode, the received power of the CRS is measured, and if the measured value satisfies the set condition, an RSRP measurement report is transmitted to the network. Based on the measurement report, the network determines whether or not to perform handover.

Next, the reception and decoding of the system information will be described in detail at the cell initial connection step. As described above, in the RRC_IDLE mode in which a cell is selected or reselected, the cell system information may be acquired in order to access the cell after acquiring synchronization with the cell through the cell search procedure. In the LTE, the system information is transmitted in two ways over two different transmission channels.

Master information block (MIB): transmission using PBCH 3d-03

System information block (SIB): transmission using PDSCH 3d-04

The MIB transmitted through the PBCH 3d-03 includes the following information.

Information on downlink cell bandwidth

Physical hybrid ARQ indicator channel (PHICH) configuration information of the cell System frame number (SFN)

The PBCH 3d-03 is decoded using the CRS scrambled with the cell ID acquired through PSS 3d-01/SSS 3d-02 as described above. Unlike other downlink transmission channels, the PBCH 3d-03 is not mapped on RB basis and is transmitted through 72 subcarriers regardless of cell bandwidth.

The SIB transmitted through the PDSCH (3d-05) are defined differently from SIBx (where x is a positive integer such as 1, 2, 3, . . . ) depending on the type of information included. Herein, to simplify the explanation, SIB1 and SIB2 related to the initial cell connection of the cell will be mainly described. The SIB1 mainly includes information on whether or not the terminal may access the corresponding cell to use the service and the scheduling information in the time domain for the remaining SIBx (x=2, 3, . . . ). Some of them are as follows PLMN(Public Land Mobile Network)-Identity trackingAreaCode schedulingInfoList si_Periodicity si_WindowLength systemInfoValueTag etc.

The PDSCH 3d-04 to which the SIB1 is transmitted is transmitted in a period of 80 ms from a 0-th subframe in the time domain. The frequency-domain scheduling information on the PDSCH 3d-04 to which the SIB1 is transmitted may be acquired from the downlink control information (DCI) transmitted to a common search space (DCS) of the PDCCH 3d-05 configured as the system information radio network temporary identifier (SI-RNTI). On the other hand, the SIB2 includes information for the terminal to access the cell. This includes an uplink cell bandwidth, random access parameters, paging parameters, parameters related to an uplink power control, and the like. Some of them are as follows ac-BarringInfor radioResourceConfig ra_SupervisionInfo pcch_Config prach_Config uplinkPowerControl etc.

The time-domain scheduling information of the PDSCH 3d-04 to which the SIB2 is transmitted can be obtained through the above-mentioned SIB1. Like the SIB1, the frequency-domain scheduling information on the PDSCH 3d-04 to which the SIB2 is transmitted can be acquired from the DCI transmitted to the common search space of the PDCCH 3d-05 configured as the SI-RNTI.

In the LTE, the terminal may acquire the synchronization information and the system information with the network in the initial connection step of a cell and then form a radio link with the network through the random access process. The random access may use either a contention-based scheme or a contention-free scheme. When the cell selection and re-selection are performed in the initial connection step of the cell, the contention-based random access scheme may be used for purpose such as movement from an RRC_IDLE state to an RRC_CONNECTED state. The contention-free random access can be used for re-establishing of the uplink synchronization in the case of arrival of the downlink data, handover, or position measurement.

Figure 3E:
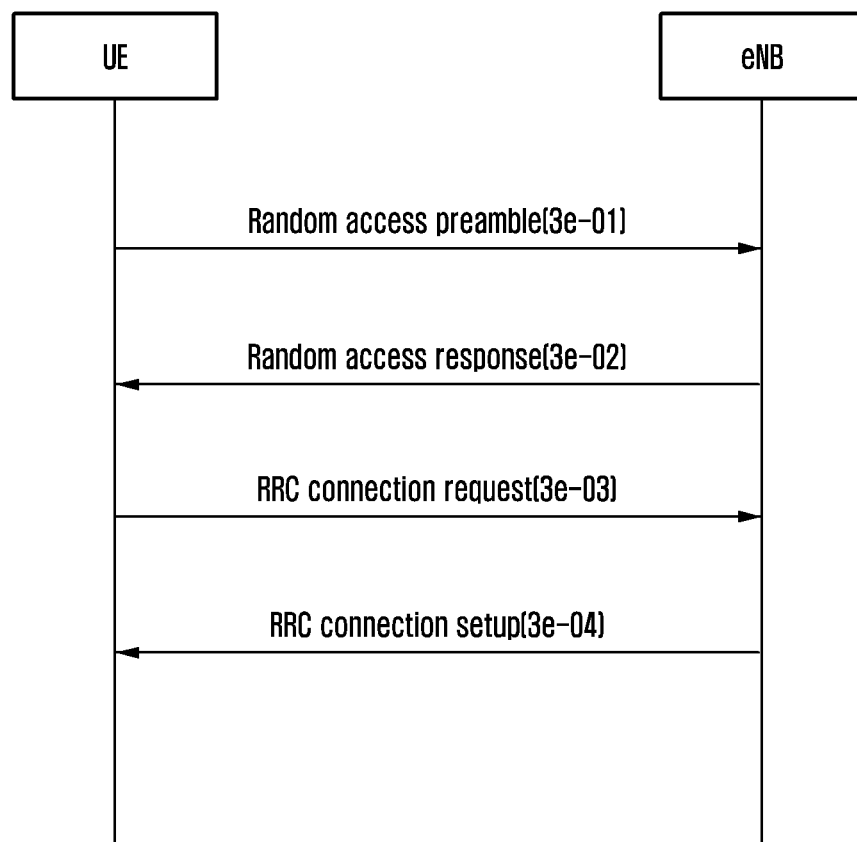
FIG. 3E illustrates a diagram of a contention-based random access procedure in the LTE.

FIG. 3E illustrates a diagram of a contention-based random access procedure in the LTE. Referring to FIG. 3E, the random access process includes four steps. A first step is a step (3e-01) in which the terminal transmits a random access preamble so that the eNB can estimate the transmission timing of the terminal. The random access preamble is transmitted through an uplink physical layer channel corresponding to a physical random access channel (PRACH), and a detailed content thereof will be described later. Through the step 3e-01 of transmitting the random access preamble, the base station recognizes that there is a random access attempt and estimates a delay time between the terminal and the base station to adjust the uplink timing.

A second step is a step (3e-02) of transmitting a random access response (RAR) detected by the eNB to the terminal. The RAR is transmitted through the PDSCH (3d-04) and includes the following message.

Index of random access preamble sequence detected by network

Temporary cell radio network temporary identifier (TC-RNTI)

Uplink scheduling grant

Timing advance

The terminal that has transmitted the preamble observes the PDCCH for the RAR within the set time window. The frequency-domain control information on the PDSCH 3d-04 to which the SIB2 is transmitted can be acquired from the DCI transmitted to the common search space of the PDCCH 3d-05 configured as the random access radio network temporary identifier (RA-RATI). The terminal receiving the RAR adjusts its uplink transmission timing and proceeds to the next step.

The third step is a step (3e-03) in which the terminal transmits an L2/L3 message (or message 3) for an RRC connection request to the eNB. The terminal uses the uplink physical layer resource allocated in the random access response in the second step (3e-02) to transmit the message, for example, the messages such as the identity of the terminal and the HARQ to the eNB. At this time, the message is transmitted through the physical uplink shared channel (PUSCH) which is the uplink physical channel configured as the TC-RNTI.

In a fourth step 3e-04, the terminal receives a downlink message from the eNB for contention resolution and RRC connection setup. The contention resolution message is transmitted through the PDSCH 3d-04 and the scheduling information on the corresponding PDSCH 3d-04 can be acquired from the DCI transmitted to the PDCCH 3d-05 configured as the C-RNTI.

The first step 3e-01 and the second step 3e-02 are used in FIG. 3E because the contention resolution is not used in the contention free-based random access procedure.

Figure 3F:
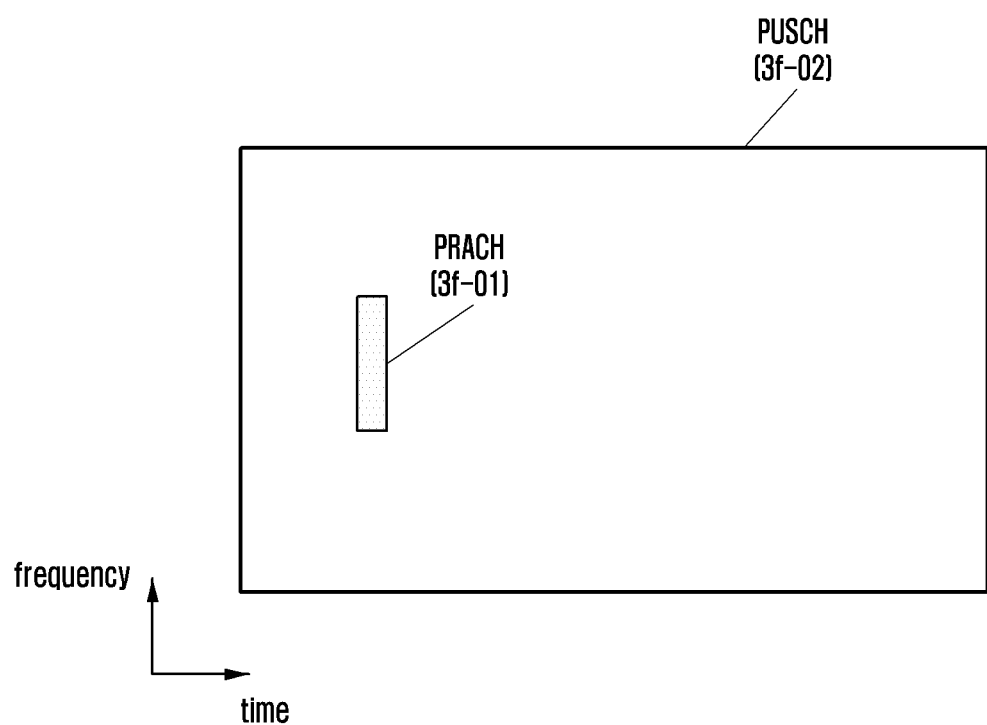
FIG. 3F illustrates a diagram of an uplink physical layer channel for a random access in the LTE.

FIG. 3F illustrates a diagram of an uplink physical layer channel used in a random access process in the LTE. As described above, in the first step 3e-01 of the random access process, the terminal can transmit the random access preamble using a PRACH 3f-01. The network can broadcast which time-frequency resource can be used for PRACH 3f-01 to terminals using SIB2. Each cell has 64 available preamble sequences, which are defined as two subsets and sequences of each subset are signaled as a part of the system information. When performing a random access attempt, the terminal randomly selects one sequence from either subset. The transmission of the L2/L3 message for the RRC connection request in the third step (3e-04) of the random access is performed using the PUSCH 3f-02.

As described above, in the existing LTE, messages in a cell initial connection process are transmitted using transmission channels of various physical layers. At this time, the physical layer transmission channel in the LTE is set as a parameter of common numerology. The numerology can refer to various physical parameters, such as subcarrier spacing, OFDM symbol length, and/or CP (Cyclic Prefix) length. Meanwhile, hereinafter, the subcarrier spacing will be mainly described as an example of numerology, but the content of the subcarrier spacing may be extended to other numerologies and applied. For example, an OFDM modulated symbol set at the subcarrier spacing of 15 kHz is transmitted. However, since the 5G communication system supports various subcarriers, for example, various parameters for the subcarrier spacing, the numerologies for the physical layer channel in which each information is transmitted in the initial connection step may be different from each other. For example, the subcarrier spacings of the PBCH and the PDCCH or the PDSCH may be different. Since the constraints may be different depending on the transmission purpose of each physical layer channel, a message size, and broadcasting, each physical layer channel can be set at different subcarrier spacings and transmitted. Alternatively, the physical layer channels having different subcarrier spacings may be multiplexed with each other to support various services having different requirements of eMBB, URLLC, and mMTC. That is, each service may be supported through a physical layer channel set at a different subcarrier spacings. Therefore, additional base station and terminal operations are used to efficiently perform the initial connection in the 5G system supporting various subcarrier spacings.

Figure 3G:
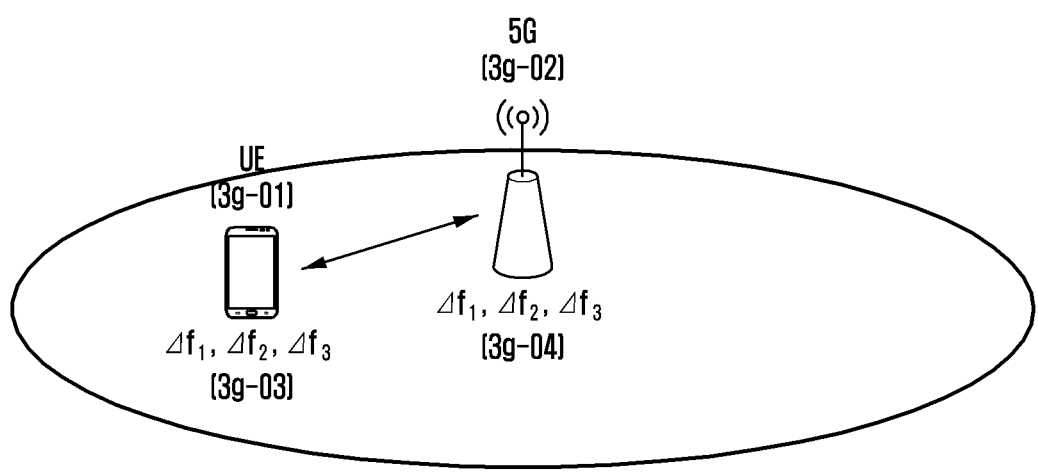
FIG. 3G illustrates a diagram of a communication system to according to embodiments of the present disclosure.

FIG. 3G illustrates a diagram of a communication system to which the present disclosure is applied. FIG. 3G illustrates that a terminal 3g-01 supporting a set of different neighbors and a 5G cell 3g-02 transmits/receives data. FIG. 3G illustrates that the terminal 3g-01 supports a set of different numerologies (i.e., subcarrier spacings of $\Delta f_1$, $\Delta f_2$, and $\Delta f_3$) and the base station 3g-03 supports (3g-04) a set of different numerologies (i.e., subcarrier spacing of $\Delta f_1$, $\Delta f_2$, and $\Delta f_3$). However, the present disclosure does not exclude the case in which the terminal 3g-01 and the 5G base station 3g-02 can support one or a part of subcarrier spacings as well as subcarrier spacing sets. For example, the terminal 3g-01 may support $\Delta f_1$, or the base station 3g-02 may support $\Delta f_2$ and $\Delta f_3$. In the case of supporting one or a part of the subcarrier spacing in the sets of subcarrier spacings, a service is possible when the terminal 3g-01 and the cell 3g-02 support the same subcarrier spacing. Therefore, in FIG. 3G, it is assumed that the terminal 3g-01 and the cell 3g-02 support at least one same subcarrier spacing.

Hereinafter, the present disclosure will be described in detail to efficiently cope with a situation in which different subcarrier spacings can be used for the physical layer channel (FIGS. 3D and 3F) used for each step of the cell initial connection described above.

First, the operation for detecting a sync signal according to the present disclosure will be described.

This is the state in which the terminal 3g-01 and the cell 3g-02 do not have any information in the synchronization acquisition step which is the first step of the cell initial connection. Therefore, in the step of acquiring the synchronization of the cell using the synchronization signal such as the PSS/SSS, the terminal 3g-01 performs blind detection on subcarrier spacings that the terminal 3g-01 can use, thereby detecting the synchronization signal from the 5G cell 3g-02.

Next, the operation of the PBCH decoding of the present disclosure will be described.

It may be considered that the base station 3g-02 uses the subcarrier spacing different from the subcarrier spacing used for the synchronization signal transmission for the PBCH 3d-03 to which the MIB is transmitted. In this case, it may be considered that the base station 3g-02 implicitly indicates the subcarrier spacing used for the transmission of the PBCH 3d-03 through the mapping between the sequence of PSS/SSS and the subcarrier spacing. The base station 3g-02 maps a specific sequence of the synchronization signal to one of subcarrier spacings, and when the terminal 3g-01 acquires synchronization in the corresponding sequence, the information on the sequence of the received synchronization signal can be utilized as information on the subcarrier spacing of the next transmitted PBCH. Alternatively, it may be considered that the base station 3g-02 uses a subcarrier spacing equal to the subcarrier spacing used for the synchronization signal transmission in the PBCH transmission.

In this case, the terminal can perform the decoding on the PBCH under the assumption that the subcarrier spacing itself for the synchronization signal acquired through the blind detection is the subcarrier spacing of the PBCH 3*d*-03.

Next, the operation for the decoding of PDCCH 3*d*-05 configured as the SI-RNTI of the present disclosure will be described.

As described above, the SIM is transmitted through the PDSCH 3*d*-04. At this time, the control information for decoding the PDSCH 3*d*-04 can be obtained through the PDCCH 3*d*-05 configured as the SI-RNTI. The subcarrier spacing of the PDCCH 3*d*-04 configured as the SI-RNTI can also use the subcarrier spacing different from those of the synchronization signal 3*d*-01 and 3*d*-02 or the PBCH 3*d*-03 and the base station 3*g*-02 may notify the information thereon through the MIB. The terminal 3*g*-01 can perform decoding on the PDCCH 3*d*-05 based on the subcarrier spacing information on the PDCCH 3*d*-05 configured as the SI-RNTI acquired through the MIB. Alternatively, the base station 3*g*-02 may use the same subcarrier spacing used for the PBCH 3*d*-03 in the transmission of the PDCCH 3*d*-05 configured as the SI-RNTI. In this case, the terminal 3*g*-01 may perform the decoding under the assumption that the subcarrier spacing itself used for the decoding of the PBCH 3*d*-03 is the subcarrier spacing of PDCCH 3*d*-05 configured as the SI-RNTI.

Next, the operation of the decoding of the PDSCH 3*d*-04 in which the SIBx of the present disclosure is transmitted will be described.

The PDSCH 3*d*-04 to which the SIBx is transmitted may be transmitted using the subcarrier spacings different from those of the synchronization signals 3*d*-01 and 3*d*-02, the PBCH, and the PDCCH 3*d*-05 configured as the SI-RNTI. In this case, SIB1 and SIBx (x=2, 3, . . . ) are described separately. As described above, the SIB1 contains the carrier information of the cell for the initial connection and the scheduling information in the time domain for different Ms. Therefore, the terminal obtains SIB1 earlier than other SIBx (x=2, 3, . . . ). The base station 3*g*-02 can notify, through the MIB, information on the subcarrier spacing of the PDSCH 3*d*-04 to which the SIB1 is transmitted. However, since the PBCH 3*g*-03 transmitting the MIB can be transmitted in a very narrow bandwidth, the transmission capacity may be limited. Therefore, it is also possible to consider a method of indicating information on the subcarrier spacing of the PDSCH 3*d*-04 in which the SIB1 is transmitted to the DCI acquired from the PDCCH 3*d*-05 configured as the SI-RNTI. The terminal 3*g*-01 can perform decoding on the PDSCH 3*d*-04 for the SIB1 based on the information on the subcarrier spacing acquired through the MIB or the DCI Next, the information on the subcarrier spacing of the PDSCH 3*d*-04 for transmission of the SIBx (x=2, 3, . . . ) may also be indicated via the MIB or the DCI. In addition, since the acquisition of the SIB1 precedes the SIBx (x=2, 3, . . . ), it may be considered to indicate the subcarrier spacing of SIBx (x=2, 3, . . . ) through the SIB1. On the other hand, the base station 3*g*-02 can use the same subcarrier spacing used for the PDCCH 3*d*-05 configured as the SI-RNTI in the transmission of the PDSCH 3*d*-04 for the SIBx transmission. In this case, the terminal 3*g*-01 can perform decoding under the assumption that the subcarrier spacing itself used for the decoding of the PDCCH 3*d*-05 set in the SI-RNTI is the subcarrier spacing of the PDSCH 3*d*-04 to which the SIBx is transmitted.

Next, the operation of the transmission of the PRACH 3*e*-01 of the present disclosure will be described.

As described above, the terminal 3*g*-01 acquires configuration information on the physical layer PRACH 3*e*-01 that transmits the random access preamble from the SIB2. Therefore, the base station 3*g*-02 can add the information on the subcarrier spacing to be used for the transmission of the PRACH 3*e*-01 to the SIB2 and instruct the information to the terminal 3*g*-01. The terminal 3*g*-01 itself determines the subcarrier spacing of the PRACH 3*e*-01 to transmit the PRACH 3*e*-01 without the base station 3*g*-02 transmitting an additional indicator for the subcarrier spacing of the PRACH 3*e*-01, thereby considering the implicit indication of the subcarrier spacing of the transmission of the PRACH 3*e*-01. Alternatively, by mapping a specific random access preamble sequence to a specific subcarrier spacing, the base station 3*g*-02 may implicitly acquire the information on the subcarrier spacing used for PRACH 3*e*-01 through the received random access preamble sequence number or an aggregation number. Alternatively, the situation in which the PRACH 3*e*-01 uses the same subcarrier spacing as the downlink physical layer transmission channel in the previous step may be considered. Here, the use of the same subcarrier spacing as that of the downlink physical layer transmission channel in the previous step means that the subcarrier spacing used for transmission of any one of the PBCH 3*d*-03, the PDCCH 3*d*-05 configured as in the SI-RNTI, and the PDSCH 3*d*-04 to which the SIBx is transmitted is identically used for even the PRACH 3*e*-01.

Next, the operation for the decoding of PDCCH 3*d*-05 configured as the RA-RNTI of the present disclosure will be described.

As described above, the RAR message is transmitted through the PDSCH 3*d*-04. At this time, the control information for decoding the PDSCH 3*d*-04 can be obtained through the PDCCH 3*d*-05 configured as the RA-RNTI. The subcarrier spacing of the PDCCH 3*d*-05 configured as the RA-RNTI may use the subcarrier spacing different from those of the synchronization signals 3*d*-01 and 3*d*-02 received in a previous step, PBCH 3*d*-03, PDSCH 3*d*-04 configured as the SI-RNTI, or the PDSCH 3*d*-04. Therefore, the base station 3*g*-02 can notify the information on the subcarrier spacing of the PDCCH 3*d*-05 configured as the RA-RNTI through the MIB or the SIBx (x=1, 2). The terminal 3*g*-01 can perform decoding based on the subcarrier spacing information on the PDCCH 3*d*-05 configured as the acquired RA-RNTI. Alternatively, the base station 3*g*-02 may use the same subcarrier spacing of another downlink physical layer channel in the transmission of the PDCCH 3*d*-05 configured as the RA-RNTI. In this case, the terminal 3*g*-01 may perform the decoding under the assumption that the subcarrier spacing itself of the downlink physical layer channel decoded previously is the subcarrier spacing of PDCCH 3*d*-05 configured as the RA-RNTI. Here, the assumption of the same subcarrier spacing as that of the downlink physical layer transmission channel decoded previously means that the subcarrier spacing used for transmission of any one of the PBCH 3*d*-03, the PDCCH 3*d*-05 configured as in the SI-RNTI, and the PDSCH 3*d*-04 to which the SIBx is transmitted is identically used for even the PRACH 3*e*-01 configured as the RA-RNTI.

Next, the operation of the decoding of the PDSCH 3*d*-04 in which the RAR of the present disclosure is transmitted will be described.

Even the PDSCH 3*d*-04 to which the RAR is transmitted may be transmitted using a subcarrier spacing different from that of another downlink physical layer transmission channel. Therefore, the base station 3*g*-02 can notify the information on the subcarrier spacing of the PDSCH 3*d*-04 to which the RAR is transmitted through the MIB or the SIBx (x=1, 2). Alternatively, it may be indicated through the DCI transmitted to the PDCCH **3*d*-05 configured as the RA-RNTI. The terminal 3*g*-01 can obtain the RAR message by performing decoding based on the information on the subcarrier spacing of the PDSCH 3*d*-04 to which the acquired RAR is transmitted. Alternatively, the base station 3*g*-02 may use the same subcarrier spacing of another downlink physical layer channel in the transmission of the PDCCH 3*d*-05 to which the RAR is transmitted. In this case, the terminal 3*g*-01 may perform the decoding under the assumption that the subcarrier spacing itself of the downlink physical layer channel decoded previously is the subcarrier spacing of PDCCH 3*d*-04 to which the RAR is transmitted. Similarly, the assumption of the same subcarrier spacing as that of the downlink physical layer transmission channel decoded previously means that the subcarrier spacing used for transmission of any one of the PBCH 3*d*-03, the PDCCH 3*d*-05 configured as the SI-RNTI, and the PDSCH 3*d*-04 to which the SIBx is transmitted, and the PDCCH 3*d*-05 configured as the RA-RNTI is identically used for even the PRACH 3*e*-04** to which the RAR is transmitted.

Next, the operation of the transmission of the PUSCH **3*e*-03** to which the L2/L3 message of the present disclosure is transmitted will be described.

As described above, the control information on the transmission of the PUSCH **3*e*-03 to which the L2/L3 message is transmitted can be acquired from the RAR message transmitted from the base station 3*g*-02. Therefore, the base station 3*g*-02 can add the information on the subcarrier spacing to be used for the PUSCH 3*e*-03 to which the L2/L3 message is transmitted to the RAR message and instruct the information to the terminal 3*g*-01. The terminal 3*g*-01 can transmit the PUSCH 3*e*-03 to which the L2/L3 message is transmitted using the acquired subcarrier spacing. Alternatively, it may be considered to transmit the PUSCH 3*e*-03 using the same subcarrier spacing as that of the downlink physical layer transmission channel or the uplink physical layer transmission channel previously used in the initial connection procedure. Here, the use of the same subcarrier spacing as the subcarrier spacing of the downlink physical layer transmission channel or the uplink physical layer transmission channel used in the initial connection procedure may mean that the subcarrier spacing used for any one of the above-described PBCH 3*d*-03, the PDCCH 3*d*-05 configured as the SI-RNTI the PDSCH 3*d*-04 to which the SIBx is transmitted, the PRACH 3*d*-01, the PDCCH 3*d*-05 configured as the RA-RNTI, and the PDSCH 3*d*-04 to which the RAR is transmitted is identically used for even the transmission of the PUSCH 3*e*-03** to which the L2/L3 message is transmitted.

Next, the operation for the decoding of PDCCH **3*d*-05** configured as the C-RNTI of the present disclosure will be described.

The subcarrier spacing of PDCCH **3*d*-05 configured as the C-RNTI may be different from the subcarrier spacing of other physical layer channels. Since the TC-RNTI is promoted to the C-RNTI in the case of the terminal that has succeeded in the random access process, the C-RNTI referred to herein may include a TC-RNTI. Since the PDCCH 3*d*-05 configured as the SI-RNTI or the RA-RNTI is transmitted through the common search space but the C-RNTI can be transmitted through the common search space or the user-specific search space, it can be transmitted in consideration of the UE-specific subcarrier spacing. At this time, since the C-RNTI is a UE-specific unique identifier allocated when the terminal successfully performs the random access, the UE-specific transmission, not the cell common transmission, can be performed in a subsequent step. The subcarrier spacing of the PDCCH 3*d*-05 configured as the C-RNTI may be indicated through the MIB, SIBx, and RAR or may follow the subcarrier spacing of the downlink or uplink physical layer transmission channel that was successfully transmitted and received previously. For example, the same subcarrier spacing as that of any one of the PDCCH 3*d*-03, the PDCCH 3*d*-05 configured as the SI-RNTI, the PDSCH 3*d*-04 to which the SIBx is transmitted, the PRACH 3*d*-01, the PDCCH 3*d*-05 configured as the RA-RNTI, the PDSCH 3*d*-04 to which the RAR is transmitted, the PUSCH 3*e*-02 transmitting the L2/L3 message may be used for the transmission of the PDCCH 3*d*-05** configured as the C-RNTI.

Next, the operation of the decoding of the PDSCH **3*d*-04** in which the contention resolution of the present disclosure is transmitted will be described.

The subcarrier spacing of the PDSCH **3*d*-04 to which the contention resolution message is transmitted may be different from the subcarrier spacing of other physical layer channels. The control information on the PDSCH 3*d*-04 to which the contention resolution message is transmitted can be obtained from the PDCCH 3*d*-05 configured as the C-RNTI. Therefore, the base station 3*g*-02 can include information on the subcarrier spacing of the PDSCH 3*d*-04 to which the contention resolution message is transmitted in the DCI transmitted to the PDCCH 3*d*-05 configured as the C-RNTI. Alternatively, it is also conceivable to decode the PDSCH 3*d*-04 using the same subcarrier spacing as that of the downlink physical layer transmission channel or the uplink physical layer transmission channel previously used. That is, the same subcarrier spacing as that of any one of the PBCH 3*d*-03, the PDCCH 3*d*-05 configured as the SI-RNTI, the PDSCH 3*d*-04 to which the SIBx is transmitted, the PRACH 3*d*-01, the PDCCH 3*d*-05 configured as the RA-RNTI, the PDSCH 3*d*-04 to which the RAR is transmitted, the PUSCH 3*e*-02 transmitting the L2/L3 message, and the PDCCH 3*d*-05 configured as the C-RNTI may be used for even the transmission of the PDSCH 3*d*-04** to which the contention resolution message is transmitted.

Figure 3H:
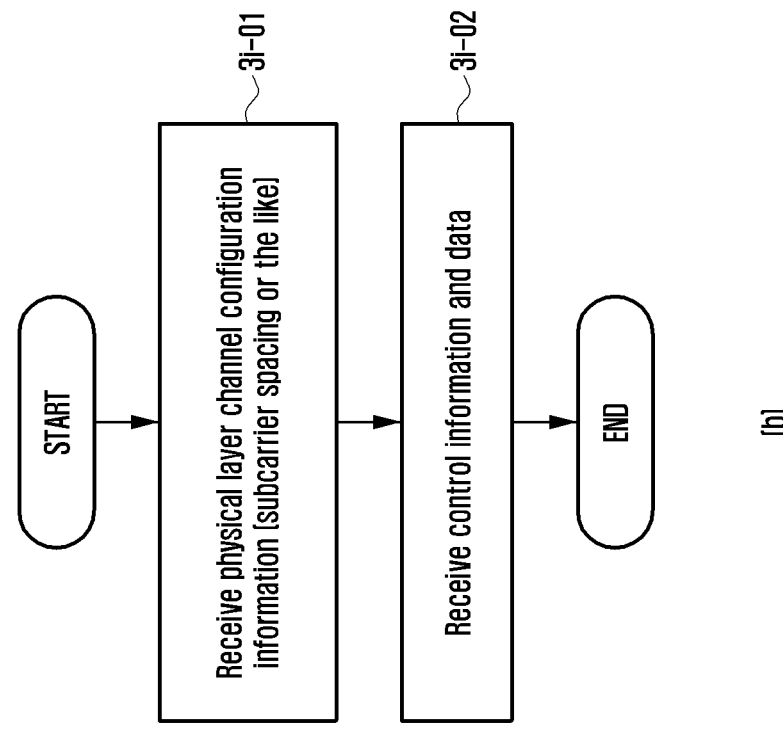
FIGS. 3H and 3I illustrate diagrams of a procedure of a base station and a terminal according to embodiments of the present disclosure.
Figure 3I:
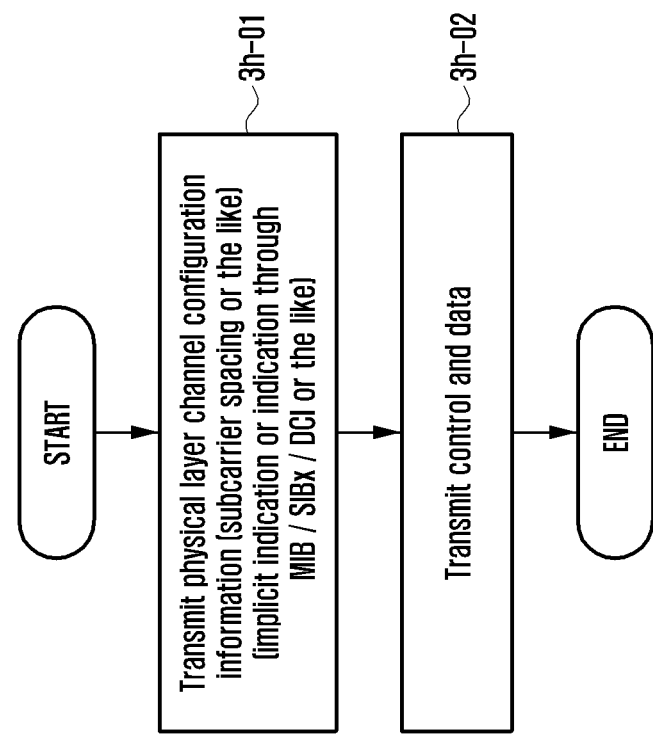

FIGS. 3H and 3I illustrate diagrams of a procedure of a base station and a terminal according to an embodiment of the present disclosure.

First, the base station procedure of the present disclosure will be described. In step **3*h*-01 of FIG. 3H, the base station transmits the configuration information on the downlink or uplink physical layer transmission channel used in the cell initial connection step to the terminal. The configuration information on the physical layer transmission channel may be numerology defined as various system parameters. In the above description, the subcarrier spacing used for OFDM modulation is described as an example. Of course, the description of the subcarrier spacing may be applied to other system parameters. The method for transmitting the configuration information on the physical layer transmission channel may be an implicit indication or an indication using MIB, SIBx, DCI or the like, which has been specifically described above. The fact that the method for transmitting the configuration information on the physical layer transmission channel may be different for each step of the cell initial connection procedure is described in detail. In step 3*h*-02, the base station transmits control information and data using the physical layer channel setting information. Next, the terminal procedure of the present disclosure will be described. In step 3*i*-01** of FIG. 3I, the terminal receives the physical layer channel configuration information from the base station and performs decoding on the corresponding control information and data in step 3*i*-02.

The paging operation procedure of the LTE and LTE-A systems will be described below in detail.

Figure 3J:
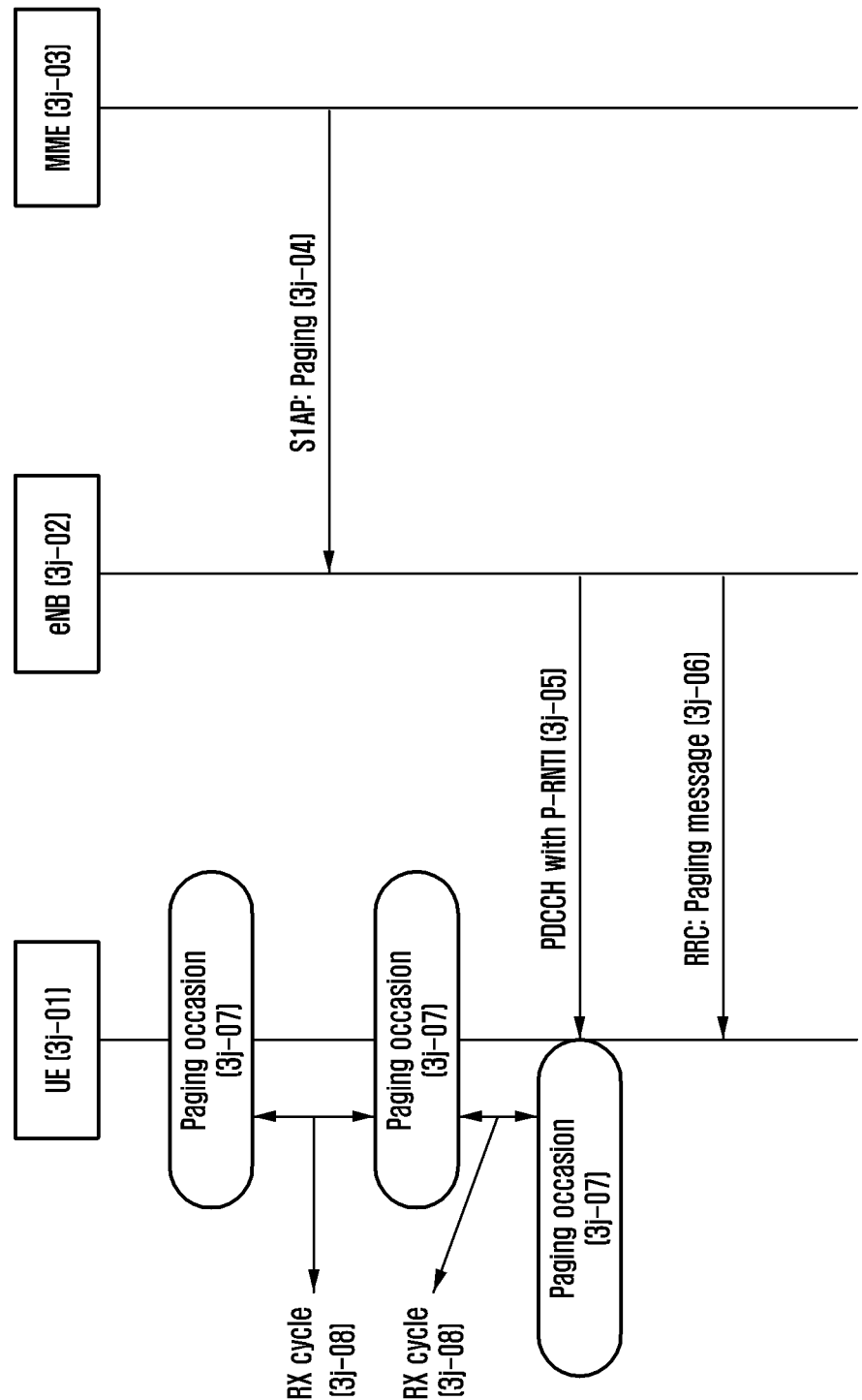
FIG. 3J illustrates a diagram of a paging procedure in the LTE.

FIG. 3J illustrates a diagram of a paging procedure in the LTE. The paging procedure can be used to notify when an incoming call to the terminal in the RRC_IDLE state is generated, to start the network connection to the terminals, or to notify the terminals in the RRC_CONNECTED state that the system information has changed. The paging may be controlled in the mobility management entity (MME) and the paging message may be transmitted across a plurality of cells in the tracking area (TA). According to FIG. 3J, the paging starts from an MME 3*j*-03 and is transmitted to a terminal 3*j*-01 via an eNB 3*j*-02. More specifically, the paging is started from the MME 3*j*-03, transmitted (3*j*-04) to the eNB 3*j*-02 by S1AP signaling, transmitted to the terminal 3*j*-01 by the RRC signaling, and then transmitted to the terminal 3*j*-01 through RRC signaling 3*j*-06. At this time, the terminal 3*j*-01 can know whether a paging message exists by observing the PDCCH 3*j*-05 configured as the P-RNTI.

The efficient paging procedure may be able to wake up for a little while in a predetermined time interval in order to observe the paging information from the network, allowing the terminal 3*j*-01 to be in idle without the terminal 3*j*-01 performing the receiving operation for most of the time. For this purpose, the LTE defines paging occasion (PO) and a paging frame (PF). The PO is defined as a subframe in which the PDCCH configured as the P-RNTI for receiving a paging message exists. The PF is defined as one radio frame including one or more POs. According to FIG. 3J, the terminal 3*j*-01 can observe one PO per discontinuous reception (DRX) period 3*j*-08. PF is given by the following Equation 3.

The efficient paging procedure may be able to wake up a predetermined time interval in order to observe the paging information from the network, allowing the terminal 3*j*-01 to rest without receiving operation for most of the time. For this purpose, LTE defines Paging Occasion (PO) and Paging Frame (PF). The PO is defined as a subframe in which a PDCCH is set to a P-RNTI for receiving a paging message. A PF is defined as a radio frame containing one or more POs. According to FIG. 3J, the terminal 3*j*-01 can observe one PO per DRX (Discontinuous Reception) period (3*j*-08). PF is given by the following equation (3).

$$SFN \bmod T = (T \ div \ N) * (UE\_ID \bmod N) \quad \text{Equation 3}$$

T: DRX cycle
nB: 4T, 2T, T, T/2, T/4, T/8, T/16, T/32, T/64, T/128, T/256
N: min(T,nB)
UE_ID: IMSI mod 1024, if P-RNTI is monitored on PDCCH The T value corresponding to the DRX period can be set through higher layer signaling. If there is no higher layer signaling for T, a default paging cycle (defaultPagingCycle) indicated by SIB2 is set to be T. In rare cases, the terminal may directly request a UE-specific DRX cycle, which is possible through an attach request or a tracking area update (TAU) request. In the above Equation 3, UE_ID is calculated from an international mobile subscriber identity (IMSI). The IMSI transmits an attach request message to the MME through the higher layer signaling (here, non-access stratum (NAS) signaling) in the initial connection step.

On the other hand, if the terminal is in the RRC_IDLE state, the LTE network knows the location of the terminal in units of TA instead of the cell unit. When accessing the LTE network, the terminal receives a tracking area identity (TAI) list from the MME. The terminal can freely move within the cell in the TAI list without updating the MME. When an incoming call to the terminal occurs, the MME transmits the same paging message to the cells in the TA currently set in the corresponding terminal, and each cell transmits the paging message to the corresponding terminal. The terminal acquires the tracking area code (TAC) of the corresponding cell through the SIB1 when (re) selecting any cell and can confirm whether the corresponding cell matches a cell in its own TAI list from acquired TAC. If the TAC of the selected cell is an ID that is not in the TAI list, the terminal transmits a TAU message to the MME. If the MME gives the TAU accept response (TAU Accept) to the terminal, the TAI list is given together, and thus the TAI list may be updated in the terminal, matching the movement of the location of the terminal.

The physical layer transport channel for paging follows the downlink transport channel structure of the above-described 3D. The contention resolution message is transmitted through the PDSCH 3*d*-04 and the scheduling information on the PDSCH 3*d*-04 to which the paging message is transmitted is transmitted through the DCI of the PDCCH 3*d*-05 configured as the P-RNTI. The terminal observes the PDCCH 3*d*-05 configured as the P-RNTI and can receive the corresponding paging message if the paging message is found.

As described above, the paging procedure in the existing LTE is characterized in that a plurality of cells in the TA area transmit the same paging message to a specific terminal. Also, each cell cannot know whether the corresponding terminal is camped on itself, and the terminal can confirm the system information on the cell to which the terminal is connected. The 5G communication system can support various parameters for various subcarrier spacings, and thus different cells belonging to the same TA can transmit a paging message through the physical layer transmission channel set at different subcarrier spacings. In other words, the terminal may not properly receive the paging message coming from different cells in the TA area depending on whether the terminal supports the corresponding subcarrier spacing. Therefore, additional base station and terminal operations are used to efficiently perform the paging procedure in the 5G system supporting various subcarrier spacings.

Figure 3K:
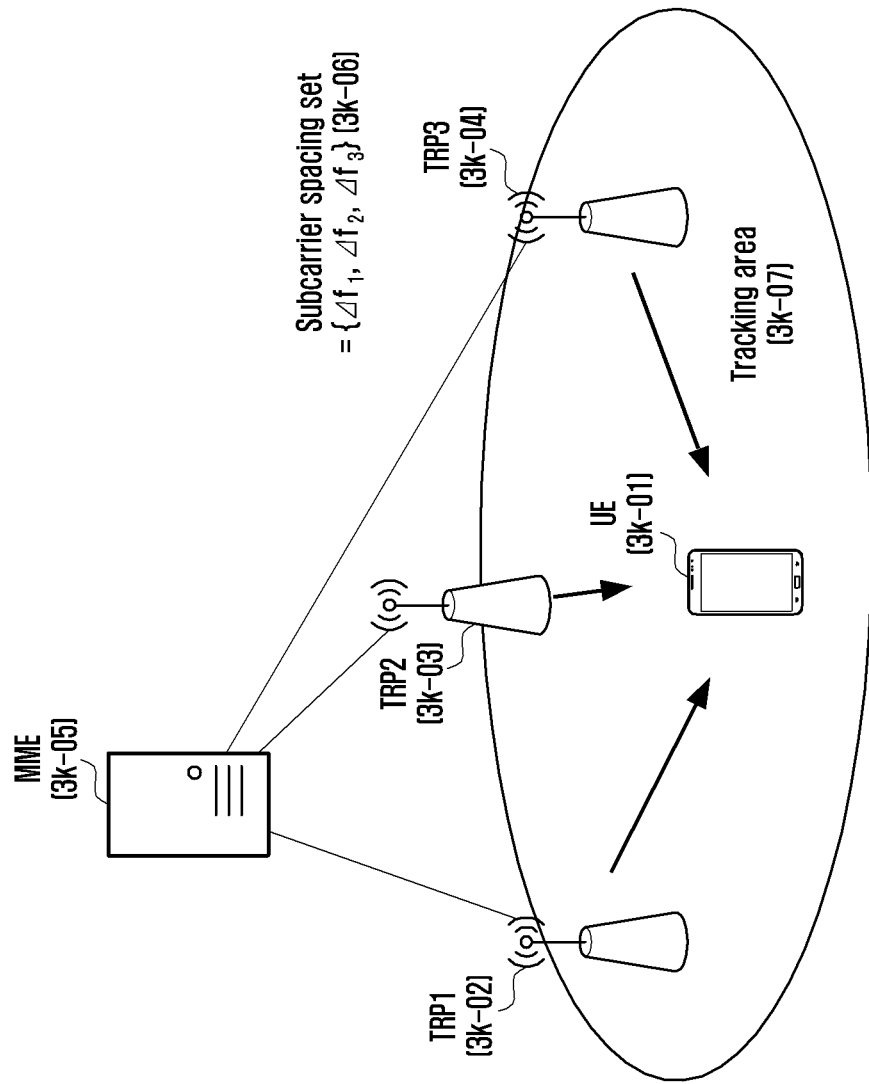
FIG. 3K illustrates a diagram of a communication system according to embodiments of the present disclosure.

FIG. 3K illustrates a diagram of a communication system to which the present disclosure may be applied. FIG. 3K illustrates one terminal 3*k*-01, three 5G transmission reception points (TRPs), TRP1 3*k*-02, TRP2 3*k*-03, TRP3 3*k*-04, and one 5G MME 3*k*-05. In FIG. 3*k*, the TRP1 3*k*-02, the TRP2 3*k*-03, and the TRP3 3*k*-04 are present in the same TA area and the terminal 3*k*-01 may be allocated the information on the TA from the MME 3*k*-05. Each terminal 3*k*-01 and the TRPs 3*k*-02, 3*k*-03, and 3*k*-04 illustrate supporting (3*k*-06) a set of subcarrier spacings of $\Delta f_1$, $\Delta f_2$, and $\Delta f_3$. The present disclosure does not exclude the case in which the terminal 3*k*-01 and the 5G TRPs 3*k*-02, 3*k*-03, and 3*k*-04 support sets of subcarrier spacings, but also the case in which one or some of the subcarrier spacings can be supported. For example, the terminal 3*k*-01 may support $\Delta f_1$, or the TRP1 3*k*-02 may support $\Delta f_1$ and $\Delta f_2$, the TRP2 3*k*-03 may support $\Delta f_2$ and $\Delta f_3$, and the TRP3 3*k*-04 may support $\Delta f_1$ and $\Delta f_3$.

For the case in which one or some of the subcarrier spacings among the sets of subcarrier spacings, the terminal 3k-01 and a service is possible when the 5G TRPs 3k-2, 3k-03, and 3k-04 supports at least one same subcarrier spacings.

First, the operation for the decoding of PDCCH 3d-05 configured as the P-RNTI of the present disclosure will be described. The terminal (3k-01) in the RRC_IDLE state goes through a process of acquiring synchronization with the cell and receiving system information when the cell is selected or reselected. The subcarrier spacing of the PDCCH 3d-05 configured as the P-RNTI may be different from those of the physical layer transmission channels, i.e., that is, the synchronization signal, the PBCH, the PDCCH configured as SI-RNTI, which are received in the cell selection process. Therefore, the base stations 3k-02, 3k-03, and 3k-04 transmit the subcarrier spacing used for the PDCCH 3d-05 configured as the P-RNTI to the terminal 3k-01 in the form of system information (MIB or SIBx). However, as described above, each of the base stations 3k-02, 3k-03, and 3k-04 in the TA cannot know whether or not the terminal 3k-01 has camped on itself and the terminal 3k-01 cannot know whether or not support the corresponding subcarrier spacing. Therefore, when transmitting the subcarrier spacing of the PDCCH 3d-05 configured as the P-RNTI to the system information, a process of reselecting, by the terminal, the cell according to whether to support the received subcarrier spacing may be additionally requested. For example, assume that the TRP1 3k-02, the TRP2 3k-03, and the TRP3 3k-04 in FIG. 3K support the sets of subcarrier spacings of $\Delta f_1$, $\Delta f_2$, and $\Delta f_3$ and the terminal 3k-01 supports the subcarrier spacing. It can be considered that the physical layer channel transmitting the synchronization signal and the system information in the TRP1 3k-02, the TRP2 3k-03, and the TRP3 3k-04 is transmitted at the subcarrier spacing $\Delta f_1$. In addition, assume that the subcarrier spacing of the PDCCH 3d-05 configured as the P-RNTI uses $\Delta f_1$, $\Delta f_2$, and $\Delta f_3$ in the TRP1 3k-02, the TRP2 3k-03, and the TRP3 3k-04. In this environment, the terminal 3k-01 can camp-on one of the TRP1 3k-02, the TRP2 3k-03, and the TRP3 3k-04, thereby obtaining the system information. However, when the terminal camps on the TRP2 3k-03, the terminal can determine that it cannot receive the paging message through the system information. In this case, the terminal will be able to perform reselection with the TRP1 3k-02 or the TRP3 3k-04 which is another cell in the TA. At the same time, the TRP2 3k-03 can be excluded from its own TA by transmitting a request message to the TAU by the MME. Thereafter, the terminal 3k-01 can successfully receive the paging message based on the newly updated TA In another method of determining the subcarrier spacing of the PDCCH (3d-05) configured as P-RNTI, it may be considered that the terminal 3k-01 transmits capability information on whether to support its subcarrier spacing to the MME 3k-05. The terminal 3k-01 can transmit capability information on whether or not to support its own subcarrier spacing through the attach request message in the initial connection step to the MME 3k-05, which may be made through an upper layer signaling (for example, NAS signaling). The MME 3k-05 can transmit the cells (TRP1 3k-02, TRP2 3k-03, and TRP3 3k-04) connected thereto of the capability of the subcarrier spacing of the terminal 3k-01, and each base station may select the subcarrier spacing of the PDCCH 3d-05 configured as the P-RNTI in consideration of this. Alternatively, the base station may reconfigure the TA in consideration of the selection of the subcarrier spacing of the PDCCH 3d-05 as the P-RNTI. For example, assume that the TRP1 3k-02, the TRP2 3k-03, and the TRP3 3k-04 in FIG. 3K support the sets of subcarrier spacings of $\Delta f_1$ $\Delta f_2$, and $\Delta f_3$ and the terminal 3k-01 supports the subcarrier spacing. In addition, assume that the subcarrier spacing of the PDCCH 3d-05 configured as the P-RNTI uses $\Delta f_1$, $\Delta f_2$, and $\Delta f_1$ in TRP1 3k-02, the TRP2 3k-03, and the TRP3 3k-04. It is considered that the TA of the terminal 3k-01 is initially configured as the TRP1 3k-02, the TRP2 3k-03, and the TRP3 3k-04. The MME 3k-05 that has received the capability of the terminal 3k-01 may confirm that the TRP2 3k-03 uses $\Delta f_2$ at the subcarrier spacing of the PDCCH 3d-05 configured as P-RNTI, exclude the TRP2 3k-03 from the TA, and notify the terminal of the updated TA information. Thereafter, the terminal 3k-01 can successfully receive the paging message based on the newly updated TA Next, the operation of the PBCH decoding of the present disclosure to which the paging message is transmitted will be described. The control information on the PDSCH 3d-04 to which the paging message is transmitted can be obtained from the DCI of the PDCCH 3d-05 configured as the C-RNTI. Therefore, the base stations 3k-02, 3k-03, and 3k-04 can include information on the subcarrier spacing of the PDSCH 3d-04 to which the paging message is transmitted in the DCI transmitted to the PDCCH 3d-05 configured as the P-RNTI. Alternatively, it can be considered that the PDSCH 3d-04 is decoded using the same subcarrier spacing as that of the PDCCH 3d-05 configured as the P-RNTI.

Figure 3L:
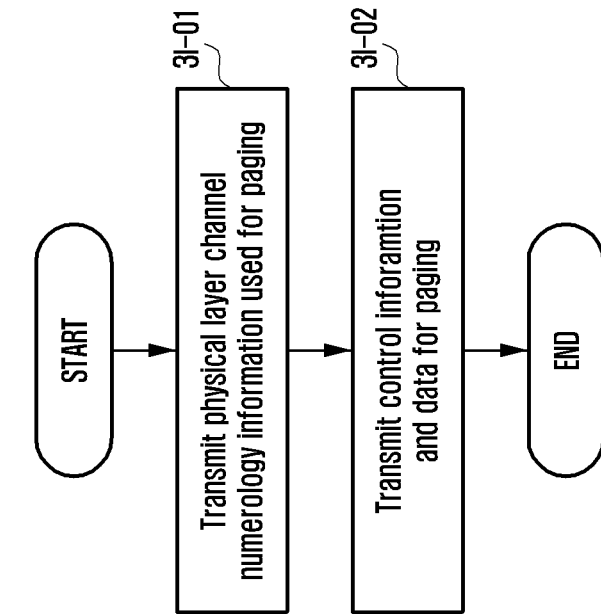
FIGS. 3L and 3M illustrate diagrams of a procedure of a base station and a terminal according to embodiments of the present disclosure.
Figure 3M:
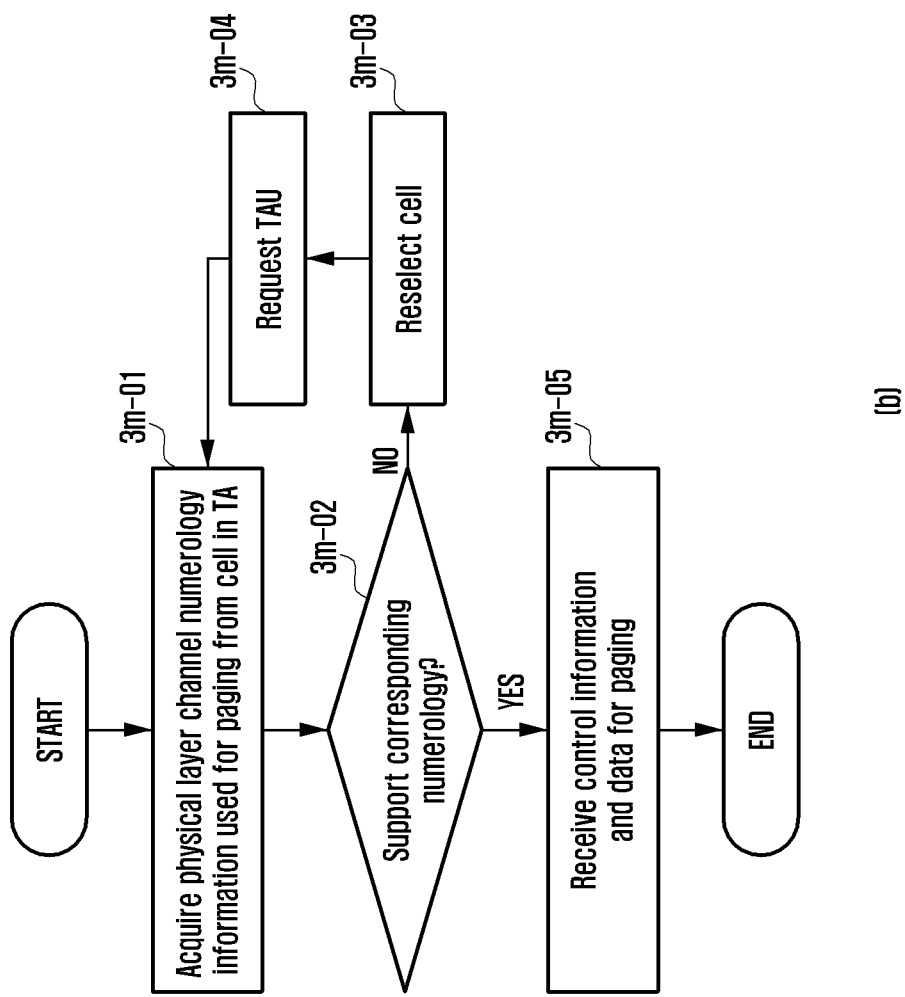

FIGS. 3L and 3M illustrate diagrams of a procedure of a base station and a terminal according to an embodiment of the present disclosure.

Figure 3P:
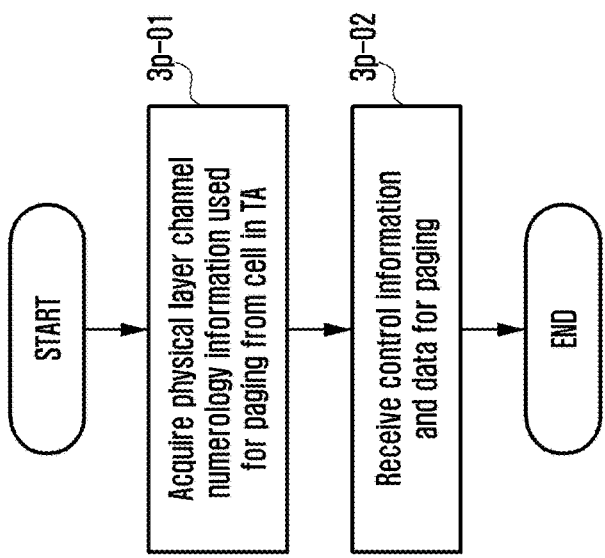
FIGS. 3N, 3O, and 3P illustrate diagrams of a procedure of a base station and a terminal according to embodiments of the present disclosure.
Figure 3O:
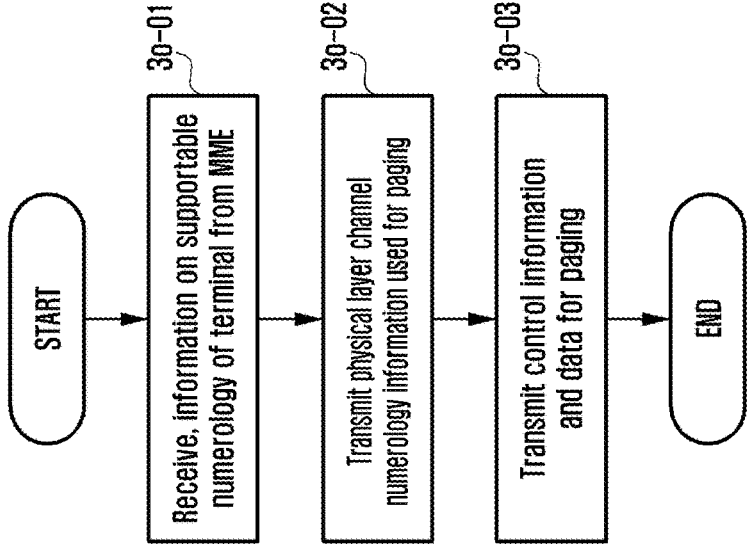
Figure 3N:
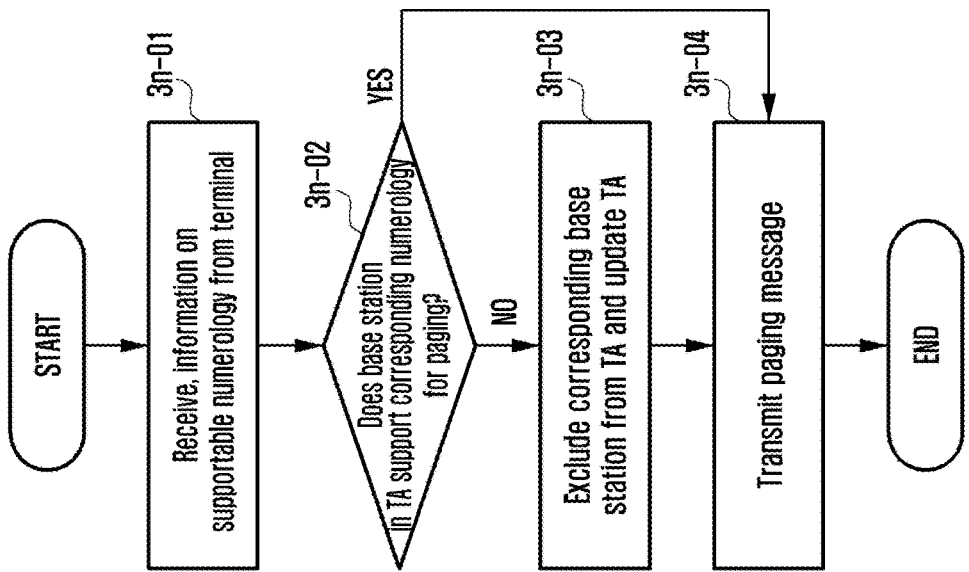

First, the base station procedure of the present disclosure will be described. In step 3l-01 of FIG. 3L, the base station transmits information on numerology (e.g., subcarrier spacing, etc.) for the physical layer channel used for paging to the system information (MIB or SIBx). In step 3l-02, the base station can transmit the control and data for paging. Next, the terminal procedure of the present disclosure will be described. Next, the terminal procedure of the present disclosure will be described. In step 3m-01 of FIG. 3M, the terminal acquires information on the physical layer numerology (e.g., subcarrier spacing, etc.) used for paging from the base station in the TA. In step 3m-02, the terminal determines whether to support the corresponding numerology. If the terminal supports the corresponding numerology, the control information and data reception for paging are completed using the numerology in step 3m-05. On the other hand, if the corresponding numerology is not supported, the cell reselection is performed in step 3m-03. In step 3m-04, a TAU request message is transmitted to the MME FIGS. 3N, 3O, and 3P illustrate diagrams of a procedure of the MME, the base station, and the terminal according to an embodiment of the present disclosure.

First, the MME procedure of the present disclosure will be described. In step 3n-01 of FIG. 3N, the MME receives information on the supportable numerology from the terminal. In step 3n-02, the MME determines whether the base station in the TA supports the corresponding numerology for paging transmission, and updates the TA by excluding the base station from the TA if there is the base station not supported (step 3n-03). If the base station in the TA supports the numerology requested by the terminal in the paging transmission, the MME transmits the paging message to the base station without performing the TA update (step 3n-04). Next, the base station procedure will be described. In step 3o-01 of FIG. 3O, the base station receives capability information on the in the numerology of the terminal from the MME. In steps 3o-02, the base station selects one or a part of the numerologies, which may be supported by the terminal, as numerology for transmitting the paging message, and transmits the selected information to the terminal. In steps 3o-03, the base station transmits the control information and data for paging using the set numerology. Next, the terminal procedure of the present disclosure will be described. In step 3p-01 of FIG. 3P, the terminal obtains the information on the physical layer numerology used for paging from the base station in the TA. In step 3p-02, the terminal determines whether to support the corresponding numerology and the terminal completes the reception of the control information and data for paging using the corresponding numerology.

Figure 3Q:
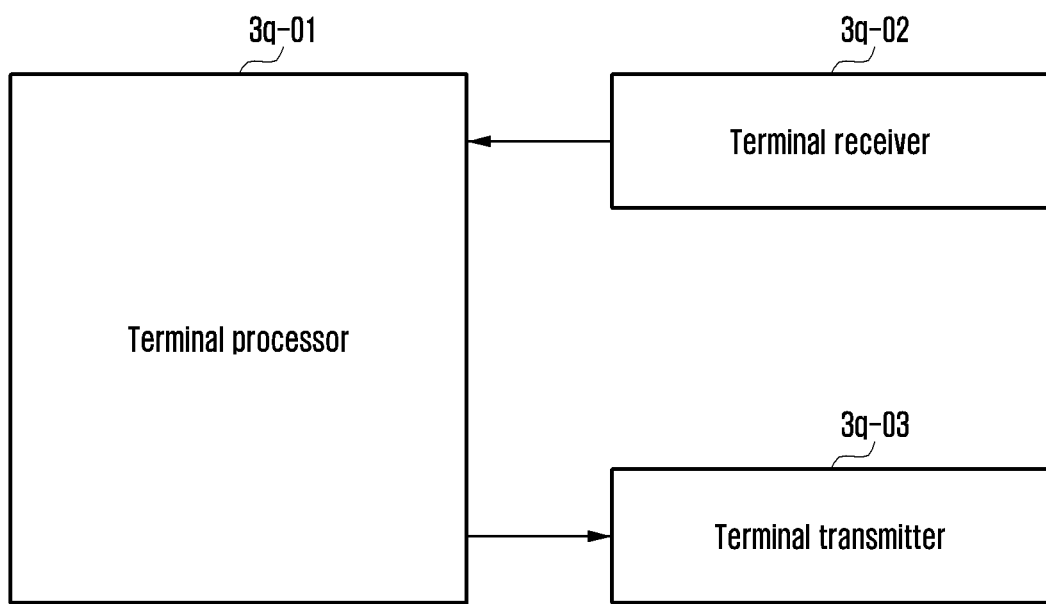
FIG. 3Q illustrates a block diagram of a structure of a terminal transceiver according to embodiments of the present disclosure.
Figure 3R:
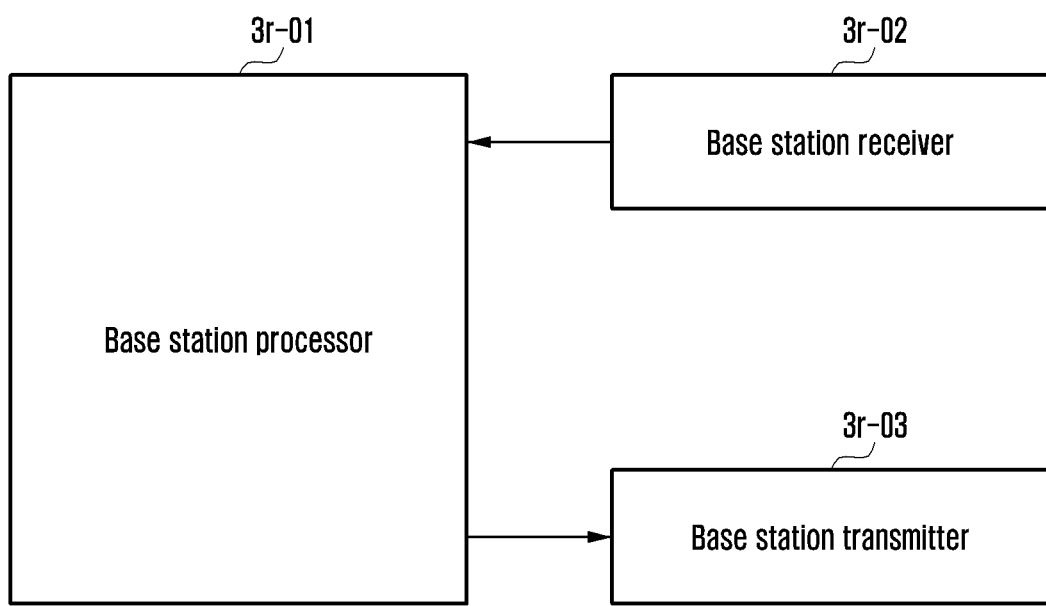
FIG. 3R illustrates a block diagram of a structure of a base station transceiver according to embodiments of the present disclosure.

In order to perform the above-described embodiments of the present disclosure, a transmitter, a receiver, and a processor of the terminal and the base station are each illustrated in FIGS. 3Q and 3R. The transmitting and receiving method of a base station and a terminal for the cell initial connection and paging in the 5G communication system is shown. To perform this, the transmitter, the receiver, and the processor of the base station and the terminal may each be operated according to according to the embodiments.

FIG. 3Q illustrates a block diagram detailing an internal structure of a terminal according to an embodiment of the present disclosure. As illustrated in FIG. 3Q, the terminal of the present disclosure may include a terminal processor 3q-01, a receiver 3q-02, and a transmitter 3q-03.

The terminal processor 3q-01 may control a series process to operate the terminal 1500 according to embodiments of the present disclosure as described above. For example, the terminal operation can be controlled differently according to different numerologies according to embodiments of the present disclosure, for example, configuration items for the subcarrier spacing and the like. Also, the control signal and the data signal can be transmitted/received according to the cell initial connection and paging procedure of the present disclosure. The terminal receiver 3q-02 and the terminal transmitter 3q-03 are collectively referred to as a transceiver. The transceiver may transmit/receive a signal to/from the base station. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the terminal processor 3q-01 and transmit the signal output from the terminal processor 3q-01 through the radio channel.

FIG. 3R illustrates a block diagram of an internal structure of the base station according to some embodiments of the present disclosure. As illustrated in FIG. 3R, the base station of the present disclosure may include a base station processor 3r-01, a receiver 3r-02, and a transmitter 3r-03.

The base station processor 3r-01 may control a series process to operate the base station according to some embodiments of the present disclosure as described herein. For example, the base station operation can be controlled differently according to different numerologies, for example, configuration items for the subcarrier spacing and the like. In addition, according to the cell initial connection and paging procedure of the present disclosure, it is possible to perform scheduling for uplink/downlink control channels and data channels and indicate configuration information to the terminal.

The base station receiver 3r-02 and the base station transmitter 3r-03 are collectively referred to as a transceiver. The transceiver may transmit/receive a signal to/from the terminal. The signal may include control information and data. To this end, the transceiver may include an RF transmitter that up-converts and amplifies a frequency of the transmitted signal, an RF receiver that low-noise-amplifies the received signal and down-converts the frequency, or the like. Further, the transceiver may receive a signal through a radio channel and output the received signal to the base station processor 3r-01 and transmit the signal output from the base station processor 3r-01 through the radio channel.

Although the present disclosure has been described with an exemplary embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving measurement gap configuration information configuring a measurement gap offset, a measurement gap length, and a measurement gap period;
   receiving channel state information (CSI) configuration information;
   identifying a measurement gap based on the measurement gap configuration information wherein the measurement gap is configured for evolved universal terrestrial radio access (EUTRA) and new radio (NR) which are associated with dual connectivity supported in the communication system;
   identifying a valid downlink time resource for a CSI measurement based on the CSI configuration information, wherein the valid downlink time resource does not fully overlap with the measurement gap and wherein the valid downlink time resource includes at least one symbol which does not overlap with the measurement gap; and
   performing the CSI measurement based on the valid downlink time resource.

2. The method of claim 1, wherein the measurement gap is identified based on the measurement gap offset, the measurement gap length, and the measurement gap period configured by the measurement gap configuration information.

3. The method of claim 1, wherein the measurement gap occurs in a radio frame and a subframe satisfying a condition including:

SFN mod $T$=FLOOR(the measurement gap offset/ 10);

the subframe=the measurement gap offset mod 10; and $T$=the measurement gap period/10, where the SFN is a system frame number of the radio frame, the FLOOR is a flooring function, and the mod is a modulo operation.

4. The method of claim 1, further comprising measuring a radio link quality of at least one cell during the measurement gap.

5. The method of claim 2, further comprising performing an uplink transmission in a time resource which is a part of a normal time resource and occurs immediately after the measurement gap, and
   wherein the normal time resource is configured as 14 number of symbols.

6. The method of claim 1, wherein the CSI configuration information includes information associated with a mapping of a channel state reference signal (CSI-RS).

7. The method of claim 1, wherein a mapping of a CSI-RS in the valid downlink time resource does not overlap with the measurement gap, and the CSI measurement is performed based on the CSI-RS.

8. A method performed by a base station in a communication system, the method comprising:
transmitting measurement gap configuration information configuring a measurement gap offset, a measurement gap length, and a measurement gap period;
transmitting channel state information (CSI) configuration information and
receiving a result of a CSI measurement associated with a valid downlink time resource,
wherein the valid downlink time resource is associated with the CSI configuration information,
wherein the valid downlink time resource does not fully overlap with a measurement gap associated with the measurement gap configuration information, and the valid downlink time resource includes at least one symbol which does not overlap with the measurement gap, and
wherein the measurement gap is configured for evolved universal terrestrial radio access (EUTRA) and new radio (NR) which are associated with dual connectivity supported in the communication system.

9. The method of claim 8, wherein the measurement gap occurs in a radio frame and a subframe satisfying a condition including:

SFN mod $T$=FLOOR(the measurement gap offset/ 10);

the subframe=the measurement gap offset mod 10; and $T$=the measurement gap period/10, where the SFN is a system frame number of the radio frame, the FLOOR is a flooring function, and the mod is a modulo operation.

10. The method of claim 8, wherein an uplink transmission is received in a time resource which is a part of a normal time resource and occurs immediately after the measurement gap, and
wherein the normal time resource is configured as 14 number of symbols.

11. A terminal in a communication system, the terminal comprising:
a transceiver; and
a controller coupled with the transceiver configured to:
receive measurement gap configuration information configuring a measurement gap offset, a measurement gap length, and a measurement gap period,
receive channel state information (CSI) configuration information,
identify a measurement gap based on the measurement gap configuration information, wherein the measurement gap is configured to for evolved universal terrestrial radio access (EUTRA) and new radio (NR) which are associated with dual connectivity supported in the communication system,
identify a valid downlink time resource for a CSI measurement based on the CSI configuration information, wherein the valid downlink time resource does not fully overlap with the measurement gap and wherein the valid downlink time resource includes at least one symbol which does not overlap with the measurement gap, and
perform the CSI measurement based on the valid downlink time resource.

12. The terminal of claim 11, wherein the measurement gap is identified based on the measurement gap offset, the measurement gap length, and the measurement gap period configured by the measurement gap configuration information.

13. The terminal of claim 12, wherein the measurement gap occurs in a radio frame and a subframe satisfying a condition including:

SFN mod $T$=FLOOR(the measurement gap offset/ 10);

the subframe=the measurement gap offset mod 10; and $T$=the measurement gap period/10, where the SFN is a system frame number of the radio frame, the FLOOR is a flooring function, and the mod is a modulo operation.

14. The terminal of claim 11, wherein the controller is further configured to measure a radio link quality of at least one cell during the measurement gap.

15. The terminal of claim 11, wherein the controller is further configured to perform an uplink transmission in a time resource which is a part of a normal time resource and occurs immediately after the measurement gap, and
wherein the normal time resource is configured as 14 number of symbols.

16. The terminal of claim 11, wherein the CSI configuration information includes information associated with a mapping of a channel state reference signal (CSI-RS).

17. The terminal of claim 11, wherein a mapping of a CSI-RS in the valid downlink time resource does not overlap with the measurement gap, and the CSI measurement is performed based on the CSI-RS.

18. A base station in a communication system, the base station comprising:
a transceiver; and
a controller coupled with the transceiver configured to:
transmit measurement gap configuration information configuring a measurement gap offset, a measurement gap length, and a measurement gap period,
transmit channel state information (CSI) configuration information, and
receive a result of CSI measurement associated with a valid downlink time resource,
wherein the valid downlink time resource is associated with the CSI configuration information,
wherein the valid downlink time resource does not fully overlap with a measurement gap associated with the measurement gap configuration information, and the valid downlink time resource includes at least one symbol which does not overlap with the measurement gap, and
wherein the measurement gap is configured for evolved universal terrestrial radio access (EUTRA) and new radio (NR) which are associated with dual connectivity supported in the communication system.

19. The base station of claim 18, wherein the measurement gap occurs in a radio frame and a subframe satisfying a following condition including:

SFN mod $T$=FLOOR(the measurement gap offset/ 10);

the subframe=the measurement gap offset mod 10; and $T$=the measurement gap period/10, where the SFN is a system frame number of the radio frame, the FLOOR is a flooring function, and the mod is a modulo operation.

20. The base station of claim 18, wherein an uplink transmission is received in a time resource which is a part of a normal time resource and occurs immediately after the measurement gap, and wherein the normal time resource is configured as 14 number of symbols.

* * * * *

UNITED STATES PATENT AND TRADEMARK OFFICE
CERTIFICATE OF CORRECTION

| | | |
|---|---|---|
| PATENT NO. | : 11,902,076 B2 | Page 1 of 1 |
| APPLICATION NO. | : 17/409546 | |
| DATED | : February 13, 2024 | |
| INVENTOR(S) | : Yeo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 137 days.

Signed and Sealed this
Twelfth Day of August, 2025

Coke Morgan Stewart
*Acting Director of the United States Patent and Trademark Office*